(12) United States Patent
Miroshin et al.

(10) Patent No.: US 7,232,594 B2
(45) Date of Patent: Jun. 19, 2007

(54) POLARIZER AND LIQUID CRYSTAL DISPLAY ELEMENT

(75) Inventors: Alexandr Alexandrovich Miroshin, ulitsa Petrozavodskaya, 17, korpus 2, kv. 152, Moscow (RU); Sergei Vasilievich Belyaev, Dolgoprudny (RU); Ir Gvon Khan, Dolgoprudny (RU); Igor Nikolaevich Karpov, Moscow (RU); Nikolai Vladimirovich Malimonenko, Lobnya (RU); Elena Jurievna Shishkina, Moscow (RU); Georgy Nikolaevich Vorozhtsov, Moscow (RU)

(73) Assignees: Gosudarstvenny Nauchny Tsentr Rossiiskoi Federatsii "Niopik" (GNTS RF "Niopik"), Moscow (RU); Alexandr Alexandrovich Miroshin

( * ) Notice: Subject to any disclaimer, the term of this patent is extended or adjusted under 35 U.S.C. 154(b) by 0 days.

(21) Appl. No.: 10/864,461

(22) Filed: Jun. 10, 2004

(65) Prior Publication Data

US 2004/0265510 A1    Dec. 30, 2004

Related U.S. Application Data

(62) Division of application No. 09/367,543, filed on Oct. 6, 1999, now Pat. No. 6,767,594.

(51) Int. Cl.
*G02F 1/13363* (2006.01)
*G02B 1/08* (2006.01)
*G02B 5/30* (2006.01)

(52) U.S. Cl. ............... 428/1.31; 428/1.1; 534/577; 349/95; 349/96; 349/97; 349/106; 359/491; 359/619

(58) Field of Classification Search ............... 428/1.1, 428/1.31; 349/5, 9, 62, 95–97, 106, 108, 349/115, 118, 122, 117; 359/437, 490–491, 359/494–497, 502, 619–629; 534/577
See application file for complete search history.

(56) References Cited

U.S. PATENT DOCUMENTS 2,524,286 A    10/1950    Dreyer .................. 359/491

(Continued)

FOREIGN PATENT DOCUMENTS

JP    1-183602    1/1988

(Continued)

OTHER PUBLICATIONS

Miroshin et al., EP 0 961 138 A1, Dec. 1, 1999.*

(Continued)

*Primary Examiner*—Rena Dye
*Assistant Examiner*—Sow-Fun Hon
(74) *Attorney, Agent, or Firm*—Morgan Lewis & Bockius LLP

(57) ABSTRACT

The invention relates to light polarizers and devices for displaying information based on said polarizers, in particular to a liquid crystal indicating (LCI) element, and can be used on flat liquid-crystal displays, including those of the projection type, luminairs, optical modulators, matrix systems of light modulation, etc. The objective of the invention is to provide a highly efficient polarizer providing an improved brightness and color saturation of an LCI element based on such polarizer. This objective is to be attained by using, in manufacture of a polarizer and an LCI element based on such polarizer, at least one birefringent anisotropically absorbing layer having at least one refraction index that grows as the polarized light wavelength increases., i.e., having the abnormal dispersion. The use of said layer allows creation of polarizers of both the dichroic and interference types. Further, the use of said layer allows creation of a polarizer that provides, in a relatively simple design, conversion of practically all energy of a non-polarized radiation into the polarized radiation. The above-recited peculiarities of the claimed polarizer based on a birefrigent anisotropically absorbing layer having the abnormal dispersion allow creation of both a color and monochromatic LCI element distinguished for a higher brightness, color saturation, good angular characteristics and absence of shadows.

8 Claims, 9 Drawing Sheets

U.S. PATENT DOCUMENTS

| | | | | |
|---|---|---|---|---|
| 2,544,659 | A | | 3/1951 | Dreyer ........................ 359/491 |
| 3,522,985 | A | | 8/1970 | Rogers ........................ 359/487 |
| 3,528,723 | A | | 9/1970 | Rogers ........................ 359/497 |
| 3,941,901 | A | | 3/1976 | Harsch ........................ 427/108 |
| 5,126,880 | A | | 6/1992 | Wheatley et al. ............ 359/587 |
| 5,408,321 | A | | 4/1995 | Paulson, Jr. ................. 359/366 |
| 5,506,704 | A | * | 4/1996 | Broer et al. ................... 349/98 |
| 5,566,367 | A | | 10/1996 | Mitsutake et al. ........... 359/487 |
| 5,633,737 | A | * | 5/1997 | Tanaka et al. ................. 349/95 |
| 5,650,873 | A | | 7/1997 | Gal et al. ..................... 359/487 |
| 5,682,212 | A | * | 10/1997 | Maurer et al. ................... 349/5 |
| 5,712,024 | A | * | 1/1998 | Okuzaki et al. .......... 428/195.1 |
| 5,739,296 | A | * | 4/1998 | Gvon et al. .................. 534/577 |
| 6,028,703 | A | * | 2/2000 | Sekine et al. ................ 359/487 |
| 6,081,378 | A | * | 6/2000 | Romano et al. ............. 359/497 |
| RE38,305 | E | * | 11/2003 | Gunjima et al. ................ 349/9 |
| 6,767,594 | B1 | * | 7/2004 | Miroshin et al. ........... 428/1.31 |
| 6,784,961 | B2 | * | 8/2004 | Suzuki et al. ................ 349/117 |

FOREIGN PATENT DOCUMENTS

| | | |
|---|---|---|
| RU | 2017186 | 4/1991 |
| RU | 2013794 | 7/1992 |
| RU | 95113563/33 | 7/1995 |
| RU | 91557403/04 | 10/1995 |
| RU | 96107430/25 | 4/1996 |
| WO | WO 95/17691 | 6/1995 |
| WO | WO 95/17692 | 6/1995 |
| WO | WO/9701780 | 1/1997 |

OTHER PUBLICATIONS

Ouderkirk et al., WO 95/17691, Jun. 1995.*
"Use of Liquid Crystals in Current Technology" by Vistin, J. of All-Union Chem. Society, No. 2, 1983, pp. 22-28.
"Polarizers for Liquid Crystal Devices: The User's Viewpoint" by Perregaux, SPIE vol. 37, 1981, pp. 70-75.
Diffraction of Light, Chapter VIII, Huygens Principle and Utilisation Thereof, 3 pages.
L. K. Vistin, JHCA, 1983, vol. XXVII, Iss. 2, p. 141-148.
Polymer Science Dictionary, 2nd Ed. 1989, Chapman & Hall, 1997 Mark Alger, p. 43-44, 135.

* cited by examiner

POLARIZER AND LIQUID CRYSTAL DISPLAY ELEMENT

CROSS-REFERENCE TO RELATED APPLICATIONS

This application is a divisional of application Ser. No. 09/367,543 filed on Oct. 6, 1999, now U.S. Pat. No. 6,767,594, the entire application of which is incorporated herein by reference for all purposes.

FIELD OF THE INVENTION

This invention relates to optics, and in particular to light polarizers and a liquid-crystal indicating elements based thereon.

A light polarizer, that transforms the natural light into the polarized light, and a liquid-crystal display (LCD) element based thereon are of the necessary elements of the up-to-date devices for displaying information on liquid crystals (LC), monitoring systems and light blocking.

DESCRIPTION OF THE PRIOR ART

The polarizers presently used are polymer films oriented by the uniaxial stretching, and dyed in mass by organic dyes, or iodine compounds. As a polymer, polyvinyl alcohol (PVA) is mainly used. see, e.g. U.S. Pat. No. 5,007,942 (1991).

Polarizers based on PVA dyed with iodine have high polarization characteristics and are widely used in production of liquid-crystal indicators for screens, watches, calculators, personal computers, etc.

However, an high cost and a low thermostability of the polarizers based on PVA do not allow to use them in the mass-production consumer goods, in particular in manufacture of multi-layer glass and films for automotive industry, construction, architecture. This circumstance, in its turn, calls forth development of new type of polarizers.

Known is a polarizer being a substrate whereon applied is molecularly oriented layer of dichroic dye capable of forming the nematic phase. see U.S. Pat. No. 2,544,659 (1951) and Patent of Japan 1-183602(A)(1989).

Said polarizer has an higher thermostability as compared with the polarizer based on PVA, because the polarizer's molecularly-oriented films of the dye has an high thermostability and can be formed on such stable materials as, e.g., glass.

Among drawbacks of the polarizer according to U.S. Pat. No. 2,544,659 and Patent of Japan 1-183602 (A) should be mentioned, first of all, an insufficient polarizing capability and a low contrast.

It is known a polarizer with higher polarizing characteristics (see Application PCT WO 94/28073(1994) which comprises a substrate whereon there is applied a thin film 0.1–1.5 mcm thick of the molecularly oriented layer of water-soluble dyes being sulfo-acids or their inorganic salts of azo- and polycyclic compounds, or their mixtures of the general formula (I):

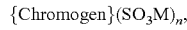

where: Chromogen is a chromophore system of a dye; $M-H^+$, $Li^+$, $Na^+K^+$, $Cs^+$, $NH_4^+$ which are capable of forming a stable lyotropic liquid-crystal phase, allowing to produce the stable lyotropic liquid crystals (LLC) and compositions based thereon.

To produce a polarizer according to application PCT WO 94/28073: on the substrate surface applied are LLC of a dye, and simultaneously the mechanical orientation with subsequent evaporation of a solvent takes place. Thereby on the substrate surface formed a thin film of the molecularly-ordered dye layer is—a polarizing coating (PC) capable of efficiently polarizing the light. But said polarizer has the polarization characteristics which are still insufficient for use in the high-resolution LC-devices.

Also known are polarizers "operating" owing to other physical phenomena, for example, owing to different reflectances of light having different polarizations. Polarizers of this type are referred to as the reflecting ones, therein used are phenomena of the light polarization both in incidence and reflection of light beams from surface of any dielectric materials at inclined angles close to Brewster angle, and at the normal (perpendicular to the surface) incidence and light reflection from the surface of birefringent materials. In that case an improvement of the polarizing properties is achieved through use of multi-layer design of reflecting polarizers.

Also known is a polarizer (see Application PCT WO 95/17691 (1995) comprising at least one birefringent layer having such thickness that therein realized is the interference extremum at output of an optical polarizer at least for one linearly-polarized light component. Such polarizer includes interleaved layers of two transparent (non-absorbing in the operating wavelength range) polymer materials, among which at least one of them is the birefringent one. Birefringence in said polymer material is formed when a film manufactured by uniaxial stretching of such material in the same direction 2–10 times. The other layer of polymer material, interleaved in layers with the birefringent layer, is the optically isotropic one. The ordinary refraction index of the birefringent layer is equal to the refraction index of the optically isotropic layer.

Principle of operation of the known polarizer is as follows. One linearly-polarized component of the non-polarized light, to which component corresponds the extraordinary (greater) refraction index of the birefringent layer, is essentially reflected from a multi-layer optical polarizer owing to a difference of refraction indices at boundaries of the birefringent layer and optically isotropic layer. When thickness of the layers is of the wavelength order, the light beams reflected from boundaries of the layers interfere with one another. When thickness of the layers and their refraction indices are appropriately selected, the optical travel difference between the waves reflected from boundaries of the layers is equal to an integer of wavelengthes, i.e the reflected waves' interference result will be the interference maximum resulting in their mutual intensification. In this case reflection of the linearly-polarized component of the non-polarized light, to which component corresponds the extraordinary (greater) refraction index of the birefringent layer, is intensified significantly.

The ordinary (small) refraction index of the birefringent layer is selected to be essentially equal to the refraction index of the optically isotropic polymer layer, i.e. there is no difference (abrupt changes) of the refraction indices at boundaries of the birefringent and optically isotropic polymer layers. Therefore, the other linearly-polarized component of the incident non-polarized light, to which component the ordinary (small) refraction index of the birefringent layer corresponds, passes through the multi-layer optical polarizer completely without any reflections.

Thus, when the non-polarized light is incident on a known polarizer, one linearly-polarized component is reflected, and the other linearly-polarized component passes through the polarizer, i.e. the light polarization takes place both for the passing and the reflected lights.

The polarizer known from application PCT WO 95/17691 is a combined one and further comprises a dichroic polarizer having a weak absorption and dichroism, being the optically positioned with a reflecting optical polarizer. The role played by the additional dichroic polarizer, the transmission axis of which is parallel to the transmission axis of the reflecting optical polarizer, is reduced to elimination of the external light reflections when the combined polarizer is operated for the "translucency".

One of the disadvantages of the known polarizer is a comparatively strong spectral dependence of its optical characteristics, i.e. dependence of the polarizing capacity and the reflection (and transmittance) index on the polarizable light wavelength. This disadvantage is caused by the circumstance that refraction indices in the used materials decrease as the polarized light wavelength increases.

The other disadvantage of the known polarizer according to Application PCT WO 95/17691 is the necessity to use a great number of the interleaving layers, which necessity is caused by the circumstance that the birefringence maximum value (difference between the ordinary and extraordinary refraction indices of a birefringent material) in transparent polymer materials is low and generally does not exceed 0.1–0.2. For this reason the reflection index from the layer boundaries is small, and for the purpose to obtain an high reflection as the whole from an optical polarizer, it is necessary to use a great number (100–600) of layers, application of which layers is an extremely difficult task and requires special precision equipment.

The second reason of the necessity to use a great number of layers in a polarizer in said reference is as follows. To polarize the light in a wide wavelength range in the multilayer coating, numerous pairs of interleaving layers or groups of pairs having different thicknesses for "tuning" of each pairs' group for the "own" wavelength within a wide spectrum range must be available.

Nonetheless, even when a great number of groups of pair layers, each of which is tuned for its own wavelength, is used, the optical characteristics of the known polarizer are significantly dependent on the polarized light wavelength.

It should be noted that the above-cited polarizers of both the dichroic and interference types are to utilize not more than 50% of the incident light energy.

While known are a polarizers that utilize more than 50% of the incident light energy.

Also known is a polarizer according to U.S. Pat. No. 3,522,985 (1970) implemented as at least one film of plate, whereon applied are:

a polarizing means differently focusing two pluralities of linearly-polarized, orthgonal to one another, light beams constituting the non-polarized light incident thereon;

means for changing polarization of at least one plurality of light beams of one polarization of two said components of the non-polarized light incident on the polarizer;

a means for collimation of the light outputted from a polarizer, implemented in the form of an array of cylindrical lenses.

The above-mentioned polarizing means consists of two pairs of dielectric layers, one layer of said pair being the birefringent one, the other being the optically isotropic one. Thereby said layers are interconnected by their appropriately moulded surfaces and thereby form a single-dimension array of identical cylindrical microlenses.

Between said pairs of said dielectric layers positioned is a continuous half-wave birefringent plate, the optical axis of which plate is at angle of 45° to the direction of geometric axes of said cylindrical lenses.

Said means for polarization changing is a sectioned birefringent phase-delaying plate, which is a half wave or quarter wave plate, parallel to the polarizer plane, and having the optical axis at angle of 45° to the direction of geometric axes of said cylindrical lenses. Downstream of said means, two outputted pluralities of beams become focused in the sections, or in the sections and intervals between sections of said sectioned birefringent phase-delaying plate, which results in such conversion of the polarization state of at least one plurality of said focused light beams of the same polarization, that all the light beams passed through said phase-delaying plates, acquire identical polarizations, and the energy transferred by them becomes practically equal to the energy of the non-polarized light incident on the polarizer.

In the polarizer according to U.S. Pat. No. 3,522,985, birefringent dielectric layers comprised by said polarizing means and means for changing polarization of at least one plurality of light beams of two linearly-polarized components of the non-polarized light incident on the polarizer, are implemented of polyethyleneterephthalate, or a similar polymer, molecularly oriented in a pre-determined direction.

Disadvantages of the polarizer according to U.S. Pat. No. 3,522,985 is a low efficiency of the outputted light polarization, caused by the following:

the capability to polarize only the portion of the incident light rays that is perpendicular to the polarizer plane;

use of the molecularly-oriented polyethyleneterephthalate and the like materials as the birefringent material.

Also known is a polarizer according to U.S. Pat. No. 5,566,367 (1996), comprising a means for converting the incoming non-polarized light into a plurality of identical light beams, a polarizing means for dividing the non-polarized light beams into the polarized passing and reflected light beams having different polarizations, a means for changing polarization of the light beams reflected from the polarizing means, and a reflecting means, which means directs the light beams outputted from the polarizer along essentially the same direction. In the known polarizer according to U.S. Pat. No. 5,566,367 a means dividing the non-polarized light beams into the polarized passing and reflected light beams, having different polarizations, includes a pair dielectric surfaces arranged at essentially inclined angles to the light beams axis (at the angles approaching the Brewster angle), and a means for changing polarization includes a half wave plate positioned between said surfaces. In this polarizer, a reflecting means includes a pair of dielectric surfaces arranged at essentially inclined angles to the light beams' axis (at the angles greater than the full internal reflection angle). This known polarizer has an high energy coefficient of converting the non-polarized light to the polarized one, i.e. practically all the energy of the non-polarized light is converted into the outputted polarized light, this polarizer also has a comparatively flat design.

The major disadvantages of the polarizer according to U.S. Pat. No. 5,566,367, as well as those of the above-mentioned polarizers, is a relatively low polarization efficiency, a low degree of the outputted light polarization, and—in certain cases—a difficult manufacture thereof As mentioned earlier, the above-mentioned polarizers can be used in various devices for displaying information, in particular for manufacture of liquid-crystal display (LCD) elements.

The most typical LCD element is a device implemented as a flat cell formed by two parallel glass plates, on the internal surfaces of which plates there applied are electrodes of an optically transparent conductive material, e.g. tin dioxide. Electrode-bearing surfaces of said plates are subjected to a special treatment providing a pre-determined homogeneous orientation of the LC molecules at the plates' surfaces and in the LC film volume. In case of the homogeneous orientation, big axes of the liquid-crystal molecules at the plates' surface are arranged in parallel to the orientation directions, which directions are usually selected to be mutually perpendicular. After a cell is assembled, it is filled with LC forming a layer 5–20 mcm thick, being an active medium and changing its optical properties (polarization plane rotation angle) when a voltage is applied thereto. A change of the optical properties is registered in the crossed polarizers, usually glued on the external surfaces of a cell. see L. K. Vistin, JHCA, 1983, vol. VII, iss. 2, p. 141–148.

Further, the display areas, across electrodes of which areas a voltage is not applied, transmit the light and appear to be of a light region, while the display areas under a voltage appear to be dark regions. To create a colour image, the LC element comprises an additional special layer dyed with organic or non-organic dyes and implemented in the form of pattern elements (character-synthesizing and game indicators), or in the form of an array of light filter of RGB or CMY types (matrix screens) that provide an appropriate dyeing of the light passing through a light filter element.

The polarizers presently used based on the polyvinyl alcohol films dyed with iodine vapours or dichroic dyes, have a low mechanical strength, and for this reason require special measures for protection against mechanical damages, which measures make LC-devices more complicated and expensive. A conventional polarizer based on PVA is a complex system comprising as much as 10 layers:

1. protective film
2. a weak adhesive
3. first support film
4. an adhesive layer
5. polarizing film
6. adhesive layer
7. second support film
8. an adhesive
9. silicon layer
10. substrate film When a polarizer is glued, a siliconized film is removed (layers 9 and 10), and in assembling of a LCD element the protective film having a glue (layers 1 and 2) is removed and can be replaced with a protective glass.

As the result, after a LCD element is assembled, it represents a device consisting of more than 20 layers. It should be noted that a damage to even one layers of a polarizer renders it unsuitable for manufacturing of a LCD element. see A. E. Perregaux, SPIE, Vol. 307, p. 70–75.

One the method for protecting polarizers against mechanical damages is their placement inside a cell. For this purpose, after the cell plates are manufactured and transparent electrodes are applied, a solution of a polymer, e.g. polyvnyl alcohol, that can comprise iodine or dichroic dye, is applied onto the plates. Then the polymer solution is subjected to a shearing force, using, for a example, a doctor blade, that is moved along the plates' surface. Thereupon the linear polymer molecules are arranged along the blade movement. After a solvent is removed, the so formed oriented PVA film comprising iodine or a dichroic dye can serve both as a polarizer and a LC alignment layer. Then the cell is assembled, filled with LC and sealed. The so made polarizer now is inside a cell and thus protected against external mechanical effects. see U.S. Pat. No. 3,941,901 (1976).

Drawbacks of said device are as follows:
a) A low thermal stability caused by use, for manufacture of such polarizer of polyvinyl alcohol or other vinyl polymers, and iodine—for dying;
b) Use for dyeing of polymer film of an iodine, which is soluble in LC, results an a lesser contrast and multiple rise of power consumption, which shortens the service life of such device.

More thermally stable and having an higher contrast is a known device according to Application for RF patent No. 96107430, B.I. No. 21 (1998), p. 84–85, wherein as the polarizers used is a thin film of the molecularly-oriented layer of a dichroic dye capable of forming a stable lyotropic liquid-crystal phase—a polarizing coating (PC). A PC can serve both as a polarizer and a matrix for homogeneous orientation of LC.

A LC cell is assembled in the standard way, of the so made plates and filled with a required liquid crystal and sealed.

An usual drawback of the devices of such type is a low brightness and an insufficient colour saturation of a produced image. One of the reasons of such drawback is use of dichroic light polarizers absorbing to 50–60% of the visible spectrum light, and use of the dyes additionally absorbing a portion of the light stream. To attain an high colour saturation in this case a greater brightness of a light source is needed, which is connected with an increased energy consumption by a display. An increased energy consumption results in losses of the LC displays' advantages as the energy-saving devices as compared with alternative devices for displaying information.

SUMMARY OF THE INVENTION

The objective of the invention is to provide polarizers of various types providing, with a relatively simple design, high polarization characteristics in a wide spectrum region.

The other objective of the invention consists in providing on the basis of said polarizers a liquid-crystal display (LCD) element having an higher brightness and colour saturation of an image.

The set objective is to be attained by using in manufacture of a polarizer and LCD element based thereon of at least one birefringent anisotropically absorbing layer having at least one refraction index growing as the polarizable light wavelength increases.

The distinguishing features of the invention is at least one birefringent anisotropically absorbing layer having at least one refraction index growing as the polarized light wavelength increases. This dependence is referred to as the abnormal dispersion resulting in a significant growth of value of at least one refraction index. This in its turn results in a significant growth of the birefringence value which can greatly exceed the similar value for the polymer materials of the prototype (0.2) and reach 0.7–0.8 for the birefringent anisotropically absorbing layer in the claimed polarizer.

At least one birefringent anisotropically absorbing layer according to the invention has at least one refraction index directly proportional with the polarizable light wavelength.

Use of such birefringent layer allows to manufacture polarizers of various types, including those of the "interference type", dichroic polarizers and polarizers using over 50% of the energy of the incident light.

One of the essential features of the claimed polarizer of the "interference type" is at least one birefringent layer having a thickness whereby the interference extremum is realized at output of a polarizer for at least one linearly-polarized light component. Thickness of the birefringent layer is selected also depending on the type of a material used for manufacture of the layer. Owing to such great value of birefringence, the necessary number of layers is dramatically diminished as compared with the known polarizers.

Furthermore, the dependence of the conditions to obtain the interference exrema (maximums and minimums) on the light wavelength is significantly lowered and, in the preferred embodiment is completely eliminated, which provides high polarization characteristics of a polarizer in a wide spectrum region.

Use of at least one birefringent anisotropically absorbing layer, though causing slight losses of light in a polarizer of the "interference type", but these losses are little, particularly in the layers less than 0.1 mcm thick, and the achieved result—provision of high polarization characteristics in a wide spectrum region when as little as 10 layers are used—compensates for these losses.

Here and hereinafter the notions of light and optical (polarizer) mean the electromagnetic radiation of visible, nearer ultraviolet and nearer infrared ranges of wavelengthes, i.e. the range from 250–300 nm to 1000–2000 nm (from 0.25–0.3 to 1–2 mcms).

Here and hereinafter the notion of the flat layer is cited exclusively for ready understanding. Without loss of the generality, also meant is a polarizer having layers of different shapes: cylindrical, spherical and other more complex shapes. Further, the proposed polarizer of the "interference type" can be embodied as both constructionally single and isolated, and as applied onto various substrates or between substrates.

Birefringent layers are referred to the layers having at least two different refraction indices: the extraordinary $n_e$ for one linearly-polarized light component, and the ordinary $n_o$ for the other orthogonal linearly-polarized light component. Value of $\Delta n = n_e - n_o$ is referred to as the refraction index anisotropy, or simply the optical anisotropy. Here and hereinafter it is assumed that the optical axes to which axes correspond the extraordinary and ordinary refraction indices are orthogonal and disposed in the layer plane. The optical axis to which the extraordinary refraction index $n_e$ corresponds, is emphasized in this or other manner. For example, this axis can be the drawing direction of a polymer material layer, or a director in an oriented nematic liquid crystal. Such birefringent layer in the sense of crystal optics corresponds to optically uniaxial plate cut out in parallel to the main axis. Here and hereinafter as an example considered are optically positive birefringent layers, wherein $n_e > n_o$. Without loss of the generality, all the inferences also apply to the optically negative birefringent layers, wherein $n_e < n_o$.

In a more general case, for example for the optically biaxial layers, there are three different refraction indices $n_x = n_e$, $n_y = n_o$, $n_z$. Refraction index $n_x$ corresponds to the direction of oscillations in the light wave, the direction parallel to the layer plane and directed along the emphasized in some manner direction X in the layer plane; $n_y$ corresponds to direction Y of oscillations in the light wave, also parallel to the layer plane, but perpendicular to the X direction; $n_x$ corresponds to direction Z of oscillations in the light wave, perpendicular to the layer plane. Depending on the method for manufacturing the birefringent layers and the type of the used materials, ratio or refraction indices $n_x$, $n_y$, $n_z$ can be different.

At least one birefringent anisotropically absorbing layer in the proposed polarizer can have one, two or as much as three refraction indices that grow as the polarized light wavelength increases.

The most preferable is use of a polarizer of the "interference type" according to the invention, wherein at least one birefringent anisotropically absorbing layer has at least one refraction index that is directly proportional to the polarizable light wavelength. For instance, if in formula $2dn_e = m\lambda$, where d is thickness of the birefringent anisotropically absorbing layer, m is the interference order corresponding to the interference maximum condition, the extraordinary index $n_e$ will be directly proportional to the light wavelength, i.e. $n_e = A\lambda$ (where A is the proportionality coefficient), then the wavelength "shortens", which means that the condition of the interference maximum in this case is satisfied for all wavelengthes, furthermore, for all orders of the interference, i.e. for all values of m. Further, when the same material has another thickness, independence from light wavelengthes can be similarly provided for the interference minimum condition. The direct proportionality of the refraction index to the light wavelength is a more strict requirement (condition) than simple growth of the refraction index as the polarizable light wavelength increases.

According to the invention a polarizer of the "interference type" is preferable in which polarizer at least one birefringent anisotropically absorbing layer has the maximal value of at least one refraction index being not less than 1.9. Thereby the necessary number of layers does not exceed 10, and the spectrum region having high polarization characteristics widens more than three times as compared with the prototype.

The carried-out experiments and assessments have demonstrated that also preferable is a polarizer wherein at least one birefringent anisotropically absorbing layer would have the maximum index of absorption not less than 0.1 in the operating wavelength range.

The optimal is a polarizer of the "interference type", wherein thicknesses of the birefringent anisotropically absorbing layers are selected such that to obtain at output of a polarizer the interference minimum for one linearly-polarized light component and, simultaneously, the interference maximum for other orthogonal linearly-polarized light component.

Actually, the peculiarity of the birefringent layers is the mere fact of existence of at least two different, in respect of their values, refraction indices, for instance, $n_x$ and $n_y$, corresponding to X and Y axes disposed in the layer plane. Owing to this fact, the layer thickness and the interference order (m number) can be selected such that at output of a polarizer will be obtained the interference minimum for one linearly-polarized component and, simultaneously, the interference maximum for the other orthogonal linearly-polarized light component. The interference minimum can correspond to the ordinary refraction index, whereby the interference maximum would be determined, accordingly, by the extraordinary refraction index. The reverse situation is also possible, when the interference minimum would correspond to the extraordinary refraction index, whereby the interference maximum will be determined, accordingly, by the ordinary refraction index.

Also preferable is a polarizer of the "interference type", comprising at least two layers, of which at least one of them is the birefringent anisotropically absorbing layer, and the other layer being the optically isotropic one, whose refraction index coincides with, or is maximally proximates to one of the birefringent layer indices. The difference between the other birefringent layer refraction index and the refraction index of the optically isotropic layer exceeds 0.2 and reaches 0.7–0.8.

In this version one linearly-polarized component of the incident non-polarized light to which component corresponds the extraordinary (greater) refraction index of the birefringent anisotropically absorbing layer, is essentially reflected from a multi-layer polarizer owing to the difference between refraction indices at the layers' boundaries. When thicknesses of layers and their refraction indices are appropriately selected, the optical travel difference between the waves reflected from boundaries of the same birefringent anisotropically absorbing layer constitutes an integer of wavelengthes, i.e. the result of their interference will be the interference maximum resulting in mutual intensification of the reflected waves. Thereby the optical thicknesses of the optically isotropic material layers can be both significantly greater than a wavelength, and be of wavelength order. As the result, reflection of the non-polarized light linearly-polarized component to which component the extraordinary (greater) refraction index of birefringent anisotropically absorbing layers corresponds, is intensified significantly.

The ordinary (small) refraction index of birefringent anisotropically absorbing layers coincide with, or maximally approaches the optically isotropic layer refraction index, i.e. there is no difference (abrupt changes) of refraction indices at the layers' boundaries. Thus the other linearly-polarized component of the incident non-polarized light, to which component the ordinary (small) refraction index of birefringent anisotropically absorbing layer corresponds, passes through a multi-layer polarizer completely, without any reflections.

The other version of the invention is a polarizer of the "interference type", comprising at least two different birefringent layers, of which at least one is a birefringent anisotropically absorbing layer, one refraction index of which coincides with, or is maximally proximates to one of the birefringent layer's indices, and the second refraction indices of the birefringent layer and the birefringent anisotropically absorbing layer differ from one another, the difference between the second indices being over 0.2.

The interference result to a great extent is influenced by the ratio of intensities, hence by amplitudes of electric fields of the interfering rays. It is known that the minimal intensity values in the interference minimum (equalling zero, in theory) can be obtained in the case of their equality. Therefore, it is reasonable to provide the maximum attainable equalization of amplitudes of the interfering rays for the interference minimum conditions, which ensures the maximal "blanking" of rays of the corresponding component of the nonpolarized light. To obtain the optimum result of interference for the interference maximum conditions, the reflection coefficients from each of the layers' boundaries must be increased.

Selection of techniques for manufacture of a polarizer according to the invention depends on the type of materials used for birefringent anisotropically absorbing layers and other layers, and is not important for the essence of the invention.

The characteristic feature of the invention is the fact that at least one birefringent anisotropically absorbing layer can be formed on the basis:

of at least one organic salt of a dichroic anionic dye having general formula (II):

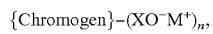

where Chromogen is a dye chromophore system; $X=CO$, $SO_2$, $OSO_2$, $OPO(O^-M^+)$; $M=RR'NH_2$; $RR'R''NH$; $RR'R''R\hat{\ }N$; $RR'R''P$, when R, R', R'', $R\hat{\ }=CH_3$, $ClC_2H_4$, $C_2H_5$, $C_3H_7$, $C_4H_9$, $C_6H_5CH_2$, substituted pkenyl or heteroaryl; $YH-(CH_2-CH_2Y)_m-CH_2CH_2$, $Y=O$, or NH, $m=0-5$; N-alkylpyridinium cation, N-alkylchinolinium cation, N-alkylimidazolinium cation, N-alkylthiazolinium cation, etc.; $n=1-7$;

or of at least one asymmetric mixed salt of a dichroic anionic dye with different cations of general formula (III):

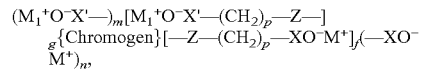

where:
Chromogen is a dye chromophore system; $Z=SO_2NH$, $SO_2$, CONH, CO, O, S, NH, $CH_2$; $p=1-10$; $f=0-9$; $g=0-9$; $n=0-9$, $m=0-9$, $n+f=1-10$; $m+g=1-10$; $X,X'=CO$, $SO_2$, $OSO_2$, $PO(O^-M^+)$; $M \neq M_1$, M, $M_1=H$; inorganic cation of the following type: $NH_4$, Li, Na, K, Cs, Mg, Ca, Ba, Fe, Ni, Co, etc.; organic cation of the following type: $RNH_3$, $RR'NH_2$, $RR'R''NH$; $RR'R''R*N$; $RR'R''R*P$, where R,R', R'', $R*$=alkyl or substituted alkyl of the following type: $CH_3ClC_2H_4$, $HOC_2H_4$, $C_2H_5$, $C_3H_7$, $C_4H_9$, $C_6H_5CH_2$, substituted phenyl or heteroaryl, $YH-(CH_2-CH_2Y)_k-CH_2CH_2-$, $Y=O$, or NH, $k=0-10$; heteroaromatic cation of the following type N-alkylpyridinium, N-alkylchinolinium N-alkylimidazolinium, N-alkythiazolinium etc.;

or of at least one associate of a dichroic anionic dye with surface-active cation and/or amphoteric surfactant of general formula (IV):

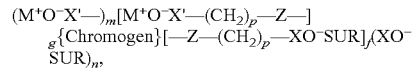

where Chromogen is a dye chromophore system; $Z=SO_2NH$, $SO_2$, CONH, CO, O, S, NH, $CH_2$; $p=1-10$; $f=0-4$; $g=0-9$; $n=0-4$, $m=0-9$, $n+f=1-4$; $m+g=0-9$; $X,X'=CO$, $SO_2$, $OSO_2$, $PO(O^-M^+)$; $M=H$; inorganic cation of the following type: $NH_4$, Li, Na, K, Cs, Mg, Ca, Ba, Fe, Ni, Co, etc.; organic cation of the following type: $RNH_3$, $RR'NH_2$, $RR'R''NH$; $RR'R''R*N$; $RR'R''R*P$, where R, R', R'', $R*$=alkyl or substituted alkyl of the following type: $CH_3ClC_2H_4$, $HOC_2H_4$, $C_2H_5-C_{10}H_{21}$, $C_6H_5CH_2$, substituted phenyl or heteroaryl, $YH-(CH_2-CH_2Y)_k-CH_2CH_2-$, $Y=O$, or NH, $k=0-10$; heteroaromatic cation of the following type N-alkylpyridinium, N-alkylchinolinium, N-alkylimidazolinium, N-alkylthiazolinium, etc.; $K'SUR^+$, $SUR=KSUR^+$, $K'SUR^+$, AmSUR, where: $KSUR^+$ and $K'SUR^+$ are surface-active cations, AmSUR is amphoteric surfactant;

or of at least one associate of a dichroic cationic dye with a surface-active anion and/or an amphoteric surface-active dye of general formula (V):

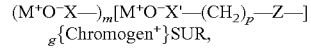

where Chromogen is a dye chromophore system; $Z=SO_2NH$, $SO_2$, CONH, CO, O, S, NH, $CH_2$; $p=1-10$; $g=0-1$; $m=0-1$; $m+g=1$; $X=CO$, $SO_2$, $OSO_2$, $PO(O^-M^+)$; $M=H$; inorganic cation of the following type: $NH_4$, Li, Na, K, Cs, Mg, Ca, Ba, Fe, Ni, Co, etc.; organic cation of the following type: $RNH_3RR'NH[2]_2$; $RR'R''NH$; $RR'R''R*N$; $RR'R''R*P$, where R, R', R'', $R*$=alkyl or substituted alkyl of the following type: $CH_3$, $ClC_2H_4$, $HOC_2H_4$, $C_2H_5-C_{10}H_{21}$, $C_6H_5CH_2$, substituted phenyl or heteroaryl, $YH-(CH_2-CH_2Y)_k-CH_2CH_2$, $Y=O$, or NH, $k=0-10$; heteroaromatic cation of the following type: N-alkylpyridinium, N-alkyl-chinolinium, N-alkylimidazolinium, N-alkylthiazolinium, etc.; $KSUR^+$ (surface-active cation), $SUR=ASUR^-$, AmSUR, where: $ASUR^-$ is surface active cation, AmSUR is amphoteric surfactant;

or at least of one associate of a dichroic cationic dye with a surface-active cation and/or amphoteric surfactant of general formula (VI):

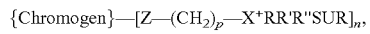

{Chromogen}—[Z—(CH$_2$)$_p$—X$^+$RR'R"SUR]$_n$, where Chromogen is a dye chromophore system; $Z=SO_2NH$, $SO_2$, $CONH$, $CO$, $O$, $S$, $NH$, $CH_2$; $p=1–10$; $X=N, P$; R, R', R"=alkyl or substituted alkyl of the following type: $CH_3$, $ClC_2H_4$, $HOC_2H_4$, $C_2H_5$, $C_3H_7$, $SUR=ASUR^-$, AmSUR, where: $ASUR^-$ is a surface-active anion, AmSUR is an amphoteric surfactant; $n=1–4$;

or of at least one water-insoluble dichroic dye and/or a pigment that do not contain ionogenic or hydrophilic groups;

or of at least one low-molecular thermotropic liquid-crystal substance being a dichroic dye or containing, as a component, a liquid-crystal and/or a dichroic dye other than liquid-crystal dye and vitrified in this or other manner, for example after application of a layer by curing using ultraviolet radiation;

or of at least on polymer material other than liquid-crystal one, with a controlled degree of hydrophilicity, dyed with a dichroic dye and/or an iodine compounds;

or of at least one polymer thermoptropic liquid-crystal and/or non-liquid crystal substance comprising solved in mass and/or chemically bonded with a polymer chain dichroic dyes, having thickness less than 0.2 mcm;

a or at least of one dichroic dye capable of forming a lyotropic liquid-crystal phase and having thickness less than 0.1 mcm;

or at least of one dichroic dye of the polymer structure and having thickness less than 0.1 mcm;

or at least of one water-soluble organic dye capable of forming a stable lyotropic liquid-crystal phase of general formula {Chromogen} $(SO_3M)_n$, where Chromogen is a dye chromophore system; $M—H^+$, a inorganic cation and having thickness less than 0.1 mcm;

or of their mixes.

At least one dichroic anionic dye of general formulas (II–IV) can be selected from the following:

dyes capable of forming a stable lyotropic liquid crystal phase, e.g. sulfo-acids of derivatives of indanthorne, sulfo-acids of derivatives of symmetric diphenyldiimides and dibenzimidazoles of naphthalene-1,4,5,8-, perylene- and antanthrone-3,4,9,10-tetracarboxylic acids, direct yellow lightfast O [4], etc;

direct dyes, e.g. benzopurpurene 4B (C.I. 448), C.I. direct orange 26, C.I. direct red 48 or 51, C.I. direct violet 88, C.I. direct blue 19, etc.;

active dyes (triazinic, vinylsulfonic or Protions T), for example, C.I. active red 1, C.I. active yellow 1, C.I. active blue 4, etc.;

acid dyes, for example various derivatives of bromaminic acid, acid bright-red anthraquinonic N8S, bright-blue anthraquinonic (C.I. 61585), acid green anthraquinonic N2S (C.I. 615890), acid bright-green anthraquinonic N4Zh, C.I. acid red 138, C.I. acid yellow 135, C.I., acid red 87, C.I., acid black 1, etc.

of the series of sulfo-acids of polycyclic dyes, e.g. asymmetric phenylimides and benzimidazoles of naphthalene-1,4,5,8-, perylene- and antanthrone-3,4,9,10-tetracarboxylic acids, disulfo-acids of derivatives of indigo, thioindigo or chinacrydone according to Application for RF patent 95117403 BI No. 26 (1997), p. 239 and other sulfo-acids based on the vat dyes and pigments.

At least one dichroic cationic dye of general formulas (V–VI) can be selected of the following:

luminescent dyes; polemethinic (cyaninic, hemicyaninic etc.) dyes; arylcarbonic dyes; heterocyclic derivatives of di- and triarylphenylmethanes, thiopyranenic, pyroninic, acridinic, oxazinic, thiazinic, xanthenic, azinic, etc. dyes.

At least one dichroic dye and/or pigment not containing ionogenic or hydrophilic groups can be selected from the following:

vat dyes; disperse dyes; anthraquinonic dyes; indigoid dyes; azo-compounds; perinonic dyes; polycyclic compounds; heterocyclic derivatives of anthrone; metal complex compounds; aromatic heterocyclic compounds; luminescent dyes.

For the purpose to provide necessary physical-mechanical, adhesive, equalizing, film-forming, etc. properties, at least one birefringent anisotropically absorbing layer of a polarizer, besides the above-mentioned dyes can further comprise a modifier, in capacity of which modifier, hydrophilic and hydrophobic polymers of various types can be used, including liquid crystal and hydrophobic polymers of various types, including liquid-crystal and silicon-organic polymers; plasticizers and varnishes, inclusive of silicon-organic varnishes, as well as non-ionogenic surfactants.

Use of a modifier also allows to decrease light scattering, which is possible due to the presence of microdefects in a birefringent anisotropically absorbing layer.

The above-discussed versions do not limit the possibility of using other materials for forming birefringent anisotropically absorbing layers for the proposed polarizer.

A birefringent anisotropically absorbing layer in the proposed polarizer can be both solid and liquid.

It should be noted that the above-mentioned materials can be used for forming a birefringent anisotropically absorbing layer for manufacturing not only a polarizer of the "interference type" but also for the below-claimed and based on other physical phenomena and LCD elements based thereon.

For manufacture of the proposed polarizer aqueous, water-organic and organic solutions of appropriate dyes (II–VI) that can be prepared by a gradual increase of concentration of the diluted solutions (e.g. by evaporating or membrane ultrafiltration), or by solving the dry dyes in a relevant solvent (water, a mix of water with alcohols, bipolar aprotic solvents of DMFA or DMSO types, cellosolves, ethylacetate and other water-miscible solvents) up to the necessary concentration.

Depending on the technique used for forming a layer dye solutions having concentration of 1 to 30% are used.

When the method according to U.S. Pat. No. 2,544,659 (1951) is used, it is advisable that on the preliminary rubbed in the required direction surface of a substrate the more diluted solutions will be applied, while when a layer is formed without preliminarily rubbing of a substrate using the mechanical orienting according to the technique of application PCT WO 94/28073(1994), more concentrated dye solutions, including the solutions forming a stable lyotiopic liquid-crystal phase, are used.

The mechanical ordering of stable LLC compositions based on dyes (II–VI) can be done by action of the forces causing the tension strain on meniscus created in time of the wedging-out detachment of one surface from the other, between which surfaces a LLC layer is distributed, or in time when a shearing force is applied, which can be done simultaneously with application of LLC on the substrate surface.

Orienting of LLC of the substrate surface under a shearing force can be executed when LLC is applied using a die or doctor blade, the latter can of the blade or cylindrical type.

Dye solutions (II–VI) can further contain, besides the water-miscible organic solvents, the non-ionogenic surfactants, binders and film-forming reagents, and as such the following can be used: polyvinyl alcohol, polyvinylpyrrolidone, polyacrylic acid and its esthers, polyacrylamide, polyethylene oxide and polyethylene glycols, polypropylene glycol and their copolymers, ethylic and oxypropylic esters of cellulose, sodium salt of carboxymethyl cellulose, etc. Further, to improve the stability, the dye solutions can comprise hydrotropic additives of the amides series, e.g. dimethylformamide, alkylamides of phosphoric acid, carbamide and its N-substituted derivatives, N-alkylpyrrolidone, dicyanamide, and also their mixtures and mixtures of amides and glycols.

Dyes (II–VI) can be also used for forming birefringent anisotropically absorbing layers and in combinations with inorganic salts of dichroic anionic dyes of general formula (I).

To produce the dyes' solutions (II–VI), a number of techniques can be utilized.

One technique consists in a sequential step-wise neutralization of diluted solutions of appropriate carboxylic, phosphonic acids or sulfo-acids of dichroic anionic dyes using different bases, in capacity of which the following can be used: metal hydroxides, aliphatic or heterocyclic amines or hydroxides of tetra-substituted cations of ammonium. The used acids of dyes are cleared beforehand from mineral salts, for example they are washed by hydrochloric acid, with subsequent drying at 100° C.

The other technique consists in heating of solutions ammonium salts of dichroic anionic dyes having a calculated quantity of the relevant base at the temperature not over 60° C., whereat the released ammonia volatiles, and an appropriate mixed salt is formed, wherein one of the cations will be the ammonium cation. Also can be used ordinary reactions of cation exchange using the ion-exchange resins, or the membrane technology.

The third universal technique, suitable for preparing asymmetrical salts of dichroic dyes containing organic cations, consists in exchange of various ions using the membrane technology techniques which simultaneously allow to purify the dichroic dye solutions.

To obtain associates of dichroic dyes comprising ionogenic groups, or their mixes with at least one mole of surface-active ions, or their mixes, a number of techniques can be used.

One of the techniques consists in neutralization of the diluted solutions of the respective acidic forms of dichroic anionic dyes using aliphatic or heterocyclic amines or hydroxides of tetrasubstituted ammonium cations containing, as one of substituents, a hydrocarbon radical with 8–18 carbon atoms. The used dye acids are beforehand purified of mineral salts, for example they are washed using hydrochloric acid with subsequent drying at 100° C.

The other technique consists in heating of solutions of ammonium salts of dichroic anionic dyes, having relevant surface-active bases, at the temperature not over 60° C., whereat the released ammonia volatiles, and an appropriate associate is formed. Also can be used ordinary reactions of cation exchange using the ion-exchange resins and the membrane technology.

The third method suitable to obtain associates of any dichroic dyes comprising ionogenic groups, or their mixtures with at least one mole of the surface-active ions, or their mixes, consists in exchange of various ions for the surface-active ions. The exchange can be done using the membrane technology techniques, which also allow simultaneous purification of associate solutions of dichroic dyes comprising ionogenic groups, or their mixes with at least one mole of surface-active ions, or their mixes, from undesired non-organic and organic impurities. Introduction of complexones, for example trylone B or "crown-ethers" of different types into a solution in the course of the membrane purification, allows to eliminate multi-valent cations (Ca, Cu, Al, etc.), which also can be a cause of formation of microparticles and a sediment.

Different techniques can be used for forming a polarizing coating from a water-insoluble dichroic dye and/or pigment not containing ionogenic or hydrophilic groups, or their mixes, which, as a rule, are not readily soluble in most organic solvents.

Thus, formation of polarizing coatings on the basis of the vat dyes, anthraquinonic derivatives, perynonic and polycycloquinonic compounds can be essentially carried out by the following methods:

Application on the substrate surface, with simultaneous orienting action, of solutions of non-organic and organic sulfuric acid ethers of the reduced forms of said dyes (of the vatsoles type), which can exist in the lyotropic liquid-crystal state. Thus formed oriented layer of sulfuric acid ethers is further subjected to oxidizing hydrolysis. Thereby the oriented layer of the dye that is already the water-insoluble one is formed upon the surface.

Application on the substrate surface, with simultaneous orienting action, of the reduced forms of said dyes (of the leuco-compounds type) in the form of solutions of various salts (non-organic and organic), which also can exist in the lyotropic liquid-crystal state. Thus formed layer is further subjected to chemical or electrochemical oxidation, whereby a layer of a dye that already water-insoluble is formed.

To produce a polarizing coating on the basis of the water-insoluble symmetric and asymmetric derivatives of diphenyldiimides and dibenzimidazoles of 3,4,9,10-perylenetetracarboxylic acid (PTCA), the appropriate derivatives of 1,1'-binaphthyl-4,4',5,5',8,8'-hexacarboxylic acid (BHCA) in the form of solutions of non-organic and organic salts, which can also exist in the lyotropic liquid-crystal state, can be used. In further chemical and electrochemical reducing treatment, or in the UV-radiation, derivatives of BHCA are cycled, forming the oriented layer of derivatives of PTCA.

Further technique also suitable for forming the polarizing coatings on the basis of pigments consists in application on the substrate surface, with simultaneous orienting action, of lyotropic liquid-crystal solutions of dichroic dyes and/or pigments in sulfuric acid or oleum of various concentrations. Formation of the water-insoluble oriented layer takes place in subsequent careful dilution of the acid by water, which dilution can be done when 100% humidity is created over the layer.

Formation of the birefringent layer on the substrate surface under action of a shearing force can be implemented by applying the solutions using a die or doctor blade, the latter can be of the knife or cylindrical type.

In forming a birefringent layer: magnetic, electromagnetic and electrostatic fields, that can be used in the cases when the application period is not limited, can be utilized, or for manufacture of a polarizing coating diluted solutions are used.

To obtain a birefringent layer on the basis of metal complex dyes, dyes can be metallized directly on the substrate surface. For this purpose, on the substrate preliminary applied is (e.g. by the directed deposition) the oriented layer of metal oxides, whereafter the surface is treated by solution of an appropriate dye. Thereby ultra-thin oriented layers of water-insoluble metal complex dyes, especially suitable for manufacturing the interference type of the claimed polarizer, can be produced.

A more universal technique for obtaining a birefringent layer on the basis of the water-insoluble dichroic dyes and/or pigments consists in preparation of special output forms obtained by dispersion of said dyes to produce anisometric particles not larger than 0.5 mcm, and having the length-diameter ratio not less than 20. For stabilization of such output forms used are various surfactants. On the basis of the so produced output forms, prepared are highly-concentrated (content of a dichroic dye and/or pigment, or their mixes, being not less than 10%) systems in different solvents, including water, in monomers or melts of polymers. Thereby the so produced systems can exist also in the liquid-crystal state. When such highly-concentrated systems are applied to the substrate surface, with simultaneous orienting action and with subsequent relevant treatment, produced is a birefringent anisotropically absorbing layer. In case the solvent is removed (by evaporation or dilution with subsequent washing), formed is a polarizing coating consisting mainly of a dichroic dye and/or pigment. In the case a monomer or a molten polymer is used, thicker (to 5 mcm) polarizing coatings are formed.

The application method selection is determined also by the type of a substrate, that can be a solid, flat, spherical or cylindrical, transparent or reflecting surface of an organic or inorganic glass, silicate glass bearing a deposited semiconductor layer, silicon plates bearing the deposited aluminium layer.

To form birefringent anisotropically absorbing layers, the following standard method can be used: application by roller, doctor blade in the form of a rotating cylinder, application with a slit die, and other methods. To this end a standard equipment for applying various coatings can be used, for example units of varnish-paint industry, and also printing equipment of various types, inclusive of flexography units.

In certain cases, after application the applied layer is dried so that solvents will be eliminated. In other cases, for example for the thermoplastic polymer materials and vitrifying materials, the applied layer is cooled after application.

Other methods that can be used for obtaining birefringent anisotropically absorbing layers of the materials that form the liquid-crystal phase in the course of their application consist in application of such material according to U.S. Pat. No. 2,524,286 on the substrate prepared beforehand for orienting the liquid-crystal phase. One of these techniques is the unidirectional rubbing of a substrate or a thin polymer layer applied thereon prior to such rubbing—known and utilized for orienting the thermotropic low-molecular liquid-crystal mixes in manufacture of LC-displays.

Another technique for obtaining birefringent anisotropically absorbing layers is the known technique of photo-orientation of layer, applied in this or other manner, by irradiating the same by the linearly-polarized ultraviolet light.

For application of birefringent anisotropically absorbing layers from thermotropic polymer materials, extruders can be used, including those having a number of flat dies and allowing to apply at one run several layers of different polymer materials of the required thickness.

The above-discussed materials, methods of their preparation and techniques for forming on their basis of birefringent anisotropically absorbing layers can also be used in manufacture of polarizers of other types and LCD elements described below in the proposed invention.

The proposed polarizer of the interference type can be embodied both in the combined form, i.e. operated both for "reflection" and "transmission", and for operation only for "reflection". In these case the embodiment version is a polarizer comprising at least one light-reflecting layer. The light-reflecting layer can be a metallic one. Application of the light-reflecting layer also permits to select the optimum, for the interference, reflection factors from the polarizer boundaries.

In manufacture of a polarizer, the first layer to be applied onto a substrate can be both the light-reflecting layer (a partially or completely reflecting mirror), and a birefringent anisotropically absorbing layer.

The reflecting layer can be made both of a metal, and in the form of multi-layer dielectric mirrors of interleaving layers of materials having an high and low refraction indices.

Metallic coatings are sufficiently simply applied, for example, by thermal evaporation in vacuum, but thereby in such coatings, absorption of light takes place, which diminishes transmission (reflection) of a polarizer. To obtain the reflecting metallic coatings, aluminium (Al), silver (Ag) and other metals can be used.

In case of multi-layer dielectric mirrors, there is $n_o$ light absorption therein, but the process of their application is rather complex and arduous. $TiO_2$, $MgO$, $ZnS$, $ZnSe$, $ZrO_2$, cryolite and polymers as the materials having an high refraction index can be used for these coatings, and as the materials having a low refraction index the following can be used: $SiO_2$, $Al_2O_3$ $CaF_2$, $BaF_2$ $MgF_2$ AlN, BN, or polymers.

For application of the reflecting layer onto a substrate or a polarizer, the following standard methods can be used, for example, thermal evaporation in vacuum, application in pairs with subsequent thermal treatment, magnetron sputtering.

As the substrate material whereon a polarizer operating for "translucency" and, possibly, for "reflection" can be applied, any materials transparent in the operating wavelength range, can be used, for example quartz, glass, polymer and other.

As the substrate material whereon a polarizer operating only for "reflection" can be applied, along with the materials transparent in the operating wavelength range, for example quartz, glass, polymers, other any materials opaque in the operating wavelength range, for example metals, semiconductor materials, glass ceramic, plastics and other can be used.

Use of said birefringent anisotropically absorbing layer having an unspecified thickness, i.e. the thickness whereat the interference extremum at output of polarizer at least for one linearly-polarized light component is not realized, allows also to create a polarizer of the dichroic type.

A birefringent anisotropically absorbing layer is the oriented in a certain direction molecularly-ordered dye layer, wherein planes of molecules and the dipole moments lying therein are homogeneously oriented relative to the direction which is determined either by the surface anisotropy, or by the mechanical orientation direction.

Principle of operation of said polarizer is based on that the non-polarized light in passing through said layer is partially absorbed by the dye chromophore system. Thereby passes only that portion of the light waves wherein the electromagnetic field electric component oscillations direction is perpendicular to the optical transition dipole moment (FIG. 4).

It should be noted that depending on the used dye, the claimed polarizer is capable of providing polarization not only in the visible portion of spectrum, but also in the UV-region, as well as in the nearer IR-region. In case of use of dichroic dyes having absorption only in the UV-region, the birefringent layer can be used as the phase-delaying layers.

The essential distinguishing feature of a polarizer of the dichroic type according to the invention is the circumstance that at least one birefringent anisotropically absorbing layer is formed of dyes (II–VI) and/or of a water-insoluble dichroic dye and/or pigment not containing ionogenic or hydrophilic groups.

Use of said dyes allows to:
improve the polarization characteristics and make an highly-efficient faultless polarizer, which, in contrast to the known polarizer of application PCT WO 94/28073 (1994) has, apart from a low conductivity, a controlled capacity for LC orientation;
make a polarizer exhibiting, apart from good dielectric properties, an high resistance to moisture effects;
broaden assortment of the dyes suitable for manufacture of highly-efficient polarizers.

As distinct from the dyes used for manufacture of the polarizer known from application PCT WO 94/28073 (1994), use of said dyes (II–VI) allows to regulate the hydrophobic-hydrophilic balance in molecules of a dichroic dye, which is of a great importance for creating the lyotropic liquid-crystal (LLC) phase. Thus, creation of a certain hydrophobic-hydrophilic balance is one of the conditions to create the over-molecular aggregates of such dye molecules, whereby when a certain concentration of such aggregates is reached, a solution transits into the ordered liquid-crystal state. When a solution is applied in the LLC state one the substrate surface, with simultaneous orienting action, a birefringent anisotropically absorbing layer can be formed, wherein planes of the dichroic dye molecules' chromophore systems and the optical transition dipole moments lying thereon are oriented relative to the direction that can be determined either by the surface anisotropy, or the action effected by magnetic or electromagnetic fields.

A particular strong influence effected upon the hydrophilic-hydrophobic balance is seen when at least one ion of the organic ions (dyes II–VI) is used. Owing to this circumstance, stable lyotropic liquid-crystal phases can be obtained also for the dye solutions which in the form of inorganic, symmetric salts or acids are not capable of forming the LLC phase.

For example, as the result of condensation of dyes with a SUR formed are associates having the SUR properties and the peculiarity to be aggregated with formation of micelles (aggregates), including the anisometric forms.

Depending on the number of iogenic groups, on the molar ratio and the type of the surface-active ion, a molecule of a dichroic dye can be both the hydrophilic (polar) component, and perform the function of the hydrophobic component of a SUR. Thus, in the presence of two ionogenic groups in a dichroic dye molecule, when said dye is condensed with one mole of the surface-active ion, formed is a surface-active associate, wherein the hydrophilic portion directly associated with the dye molecule. When a dichroic dye with one ionogenic group with one mole of amphoteric SUR is subjected to condensation, there will be produced an associate, wherein the dye molecule will be in the hydrophobic portion. Below will be given examples of different combinations of various types of dyes having different types of the surface-active ions and surfactants. As the result of such condensation there will be formed the associates having the surface-active properties and the peculiarity to aggregate with formation of micelles (aggregates), including those of the anisometric form. The dichroic dye molecules can be arranged thereby both at the periphery, and inside aggregates or micelles.

In case the dye molecules are arranged internally, on the surface of the birefringent anisotropically absorbing layer there will be located SUR hydrocarbon radicals which are a good orientant for a liquid-crystal. By varying the radical structure, the orienting capacity of PC can be modified, which is important for manufacture of LCD of different types.

The presence of the low-motion organic ions in the polarizing coatings of the claimed optical polarizer results in a low conductivity, which in its turn lowers the energy consumption and thereby prolongs service life of the liquid-crystal devices.

Surface-active properties also provide a good wettability and adhesion of LLC compositions, after of application of which compositions on the substrate surface, after drying, produced are faultless homogeneous PCs, having the thickness variety not exceeding 5%.

Use of associates of dichroic dyes (IV–VI) comprising ionogenic groups, or their mixes with at least one mole of the surface-active ions, or their mixes, allows to control the hydrophobic-hydrophilic balance in a dichroic dye molecule, which is important for creation of the lyotropic liquid-crystal phase. Thus, creation of a certain hydrophobic-hydrophilic balance is one of the condition for forming the over-molecular aggregates of such dye molecules, whereby when said aggregates reach a certain concentration, the solution transits into the ordered liquid-crystal state.

One of the peculiarities of the associates based on the dichroic dyes having the surface-active ions is the capability to increase, owing to the solubilization phenomenon, the solubility of the water-insoluble dyes in water and aqueous-organic media, which allows to obtain a polarizer, wherein at least one birefringent anisotropically absorbing layer additionally contains a solubilized dichroic dye. Depending on the structure, the dipole moment of the solubilized dye optical transition can either coincide with the associated dye optical transition dipole moment, or situated at a certain angle thereto. This depends both on the surface-active ion structure, and molar ratio of dye:SUR in an associate.

Apart from its action effected upon the hydrophobic-hydrophilic balance, the nature of an organic ion and, in particular, of a surfactant effects a strong influence upon solubility of associates in different solvents, which in its turn influences the size of aggregates and the process of formation of the LLC phase.

Thus, variation of two factors, i.e. the hydrophobic-hydrophilic balance and solubility of the dichroic dye associates containing the ionogenic groups, or mixes thereof, with at least one mole of an organic ion and/or surface-active ions, or their mixes, allows to control both the formation process and type of the LLC phase. The molecular ordering degree also depends, in its turn, on the above-described circumstance and, hence, the polarization parameters of the PC formed after a LLC composition is applied on the substrate surface, with subsequent removal of a solvent.

Absence of ions in the birefringent anisotropically absorbing layer on the basis of a water-insoluble dichroic dye and/or pigment not containing the ionogenic or hydrophilic groups, or mixes thereof, provides high dielectric properties of the claimed polarizer, which results in lowering of the energy consumption, thereby extending service life of the liquid-crystal devices.

Use of the water-insoluble dichroic dyes or pigments for formation of a birefringent anisotropically absorbing layer, apart from a low conductivity provides an high resistance to effects of moisture. Further, manufacture of the claimed polarizer does not require any synthesis of special dyes or pigments, for the commercially avaliable dyes and pigments can be used.

Use of the birefringent anisotropically absorbing layer formed of dyes (II–VI) and/or water-insoluble dichroic dye and/or pigment not containing the ionogenic or hydrophilic groups, or mixes thereof, allows to produce a thermally stable and lightfast polarizer:

wherein at least one birefringent anisotropically absorbing layer is formed upon the substrate surface in the form of a film or plate of organic and inorganic materials;

which as the substrate comprises a birefringent plate or film, at least one birefringent anisotropically absorbing layer being formed at angle of 45° to the main optical axis of said plate or film.

wherein at least one birefringent anisotropically absorbing layer comprises at least two fragments of unspecified form, which are completely different from one another in respect of colour and the polarization axis direction;

which further comprises at least one birefringent anisotropically absorbing layer containing at least two fragments of an unspecified shape that are different from one another in respect of colour and the polarization axis direction;

which further comprises, between birefringent anisotropically absorbing layers, the layers of transparent colourless or dyed materials.

which further comprises the alignment layer formed of inorganic materials and/or various polymer materials.

which further comprises the light-reflecting layer;

wherein the light-reflecting layer is metallic one.

For manufacturing a polarizer wherein at least one birefringent anisotropically absorbing layer comprises at least two fragments of an unspecified shape, which are different in respect of colour and/or the polarization axis direction, the following technique can be used: using a printing method (flexo-stenciling, relief or gravure) on a layer, having the homogeneous polarization vector, applied is a pattern in the form of a water-insoluble varnish of the necessary form. After the varnish is hardened, the exposed layer is washed by an appropriate solvent (water, or a mix of water with an organic solvent). Then the other layer is again applied on the substrate, which layer is of a different colour and the polarization vector than the fixed birefringent layer made of said varnish. Then a layer of varnish of the necessary form is applied once again whereby the previous pattern remains exposed. After hardening and subsequent washing a polarizing pattern is produced, said pattern having portions of different colours and the polarization vector direction.

Using different techniques of the multi-roller printing, multi-colour polarizing patterns can be applied according to "roll-to-roll" technique.

Use of various glues instead of a varnish allows to manufacture a polarizer in the form of self-gluing polarizing films. Application of a glue layer on a birefringent anisotropically absorbing layer in the form of a pattern, with subsequent transfer of the birefringent anisotropically absorbing layer on any surface, can be used both in manufacture of LC indicators with the external arrangement of polarizers, and for different kinds of protection of trademarks or for obtaining diverse colour effects, for example, in advertising. In case of manufacture of a polarizer according to the glue technique, the reverse transfer technique is also possible: application of a glue layer of a necessary form on the required surface, application of a film bearing the applied thereon birefringent anisotropically absorbing layer on a glue, and detachment. A birefringent anisotropically absorbing layer corresponding only to the glue layer form will be removed from the film surface to a required surface.

Use of dyes (II–VI) and/or water-insoluble dichroic dye and/or pigment not containing the ionogenic or hydrophilic groups, or mixes thereof, allows to realize the technique of layer-by-layer application of birefringent anisotropically absorbing layers. As a result, a polarizer consisting of several applied one upon another birefringent anisotropically absorbing layers, each consisting of several fragments of an unspecified shape that can be different in respect of colour and the polarization vector direction, can be produced.

The next layer of the same dye or of other one can be applied directly on the previous layer, or on the intermediate layer of a transparent material, which can be either colourless or dyed. Thereby the next layer polarization vector direction can be varied in an unspecified manner relative to the direction of axes of polarization of the previous layer.

When the polarized light plane is rotated in a polarizer, brightening of some regions and dyeing of the other ones (in case of monochromatic polarizers, wherein different portions of the same colour have different polarization vector direction) can occur. In case of use of different dyes, in rotation of the polarized light plane, either vanishing of the dyed in different colours pattern (in the case when regions of different colours have the same polarization vector direction), or sequential vanishing of portions of different colours that differ form one another in respect of the polarization vector, will occur. The above-recited examples of polarizers are of an interest in the aspect of creating special colour effects (advertising, show-business), for protection of trademarks and securities.

The substrate surface, in forming a birefringent anisotropically absorbing layer can be further modified using different sub-layers, including the optically active ones, for example the light-reflecting, in particular, diffusion-reflecting, birefringent or phase-delaying layers. Thus a polarizer is produced, characterized in that between the substrate and polarizing coating additionally comprised is a light-reflecting layer which can serve also as the conductive layer.

When a quarter-wave birefringent plate or film, for example of a polyvinyl aclohol or polyethyleneterephthalate are used as the substrate, and when the birefringent anisotropically absorbing layer is applied at angle of 45° to the main optical axis of the substrate, a circular polarizer can be produced (FIG. 5, a and b is the direction of the ordinary and extraordinary rays, respectively, and n is the polarizing layer polarization vector direction). Thickness of the birefringent film must meet the following requirement:

$$d(n_e - n_o) = \lambda/4 + m\lambda/2,$$

where d is thickness of a polymer film; $n_o$ and $n_e$ are the ordinary and extraordinary refraction indices; $\lambda$ is wavelength; m is an integer.

When the birefringent anisotropically absorbing layer is formed on polymer films (polyethyleneterephthalate, polycarbonate, tiracetyl cellulose, other transparent film materials), polarizers in the form of flexible polarizing films, including self-gluing films, can be obtained.

For manufacture of the claimed polarizer, different glues, including polyvinylbutyral, can be used for producing various types of laminated structures, for example triplex glasses or multi-layer films, which is of an interest for automotive industry and architecture.

As seen in Tables 1–3, polarizers of the dichroic type according to the invention apart form a low conductivity, exhibit an high resistance to effects of moisture and an higher dichroic ratio as compared with the polarizer according to application PCT WO 94/28073 (1994).

Further, the claimed polarizers have homogeneous properties across their area, one of criteria of which properties is different thickness of the birefringent anisotropically absorbing layer, not exceeding 5%.

TABLE 1

Characteristics of light polarizers based on organic salts of dichroic anionic dyes of general formula (II)

| No. | Dye | M | n | Thickness variance, % |
|---|---|---|---|---|
| 1 | Direct yellow, lightfast O | $(OHCH_2CH_2)_3NH$ | 7 | 5 |
|   |   | $HN_4$* | 7 | 15 |
| 2 | Mixture of disulfo-acids of dibenzimidazoles of naphthalene-1,4,5,8-tetracarboxylic acid | N-methylpyridinium | 2 | 5 |
|   |   | $NH_4$* | 2 | 18 (significant scattering) |
| 3 | 3-chlorindanthrone-4,4'-disulfo-acid | $(OHCH_2CH_2OCH_2CH_2)_3NH$ | 2 | 3 |
|   |   | $NH_4$* | 2 | 10 |
| 4 | Acid bright-red anthraquinonic N8S | $(C_2H_5)_4N$ | 2 | 5 |
|   |   | $NF_4$* | 2 | 15 (scatters light) |
| 5 | C.I. direct red 48 | N-ethylamidazolinium | 2 | 5 |
|   |   | Na* | 2 | 15 |
| 6 | C.I. active yellow 1 | N-methylthiazolinium | 2 | 5 |
|   |   | Na* | 2 | 15 |
| 7 | C.I. acid yellow 1 | $NH_2(CH_2CH_2NH)_2CH_2CH_2NH_3$ | 1 | 5 |
|   |   | $NH_4$* | 1 | 15 |
| 8 | C.I. direct blue 19 | $[OH(CH_2CH_2O)_3CH_2CH_2]_2NH_2$ | 2 | 5 |
|   |   | $NH_4$* | 2 | 15 |
| 9 | Mixture of sulfoacids of dibenzimidazoles of perylene-3,4,9,10-tetracarboxylic acid | $C_6H_5CH_2(CH_3)_3P$ | 2 | 5 |
|   |   | $NH_4$* | 2 | 10 |
| 10 | C.I. direct violet 88 | $CH_3(C_3H_7)NH$ | 2 | 5 |
|   |   | $NH_4$ | 2 | 15 |
| 11 | Acid bright blue anthraquinonic | N-ethylchinolinium | 2 | 5 |
|   |   | $NH_4$ | 2 | 15 |
| 12 | C.I. direct violet 56 | $C_6H_5(CH_3)NH_2$ | 2 | 5 |
|   |   | Na* | 2 | 20 |
| 13 | C.I. active blue 4 | N-ethylthiazolinium | 2 | 5 |
|   |   | Na* | 2 | 18 |
| 14 | C.I. direct yellow 73 | $[OH(CH_2CH_2O)_5CH_2CH_2]_2NH_2$ | 4 | 5 |
|   |   | $NH_4$* | 4 | 15 |
| 15 | Disulfoacid of dimethyl chinacridone | $(C_4H_9)_3(CH_3)P$ | 2 | 5 |
|   |   | $NH_4$* | 2 | 10 |
| 16 | Disulfoacid of thioindigo | $NH_2(CH_2CH_2NH)_4CH_2CH_2NH_3$ | 2 | 5 |
|   |   | $NH_4$* | 2 | 15 |
| 17 | Mixture of disulfoacids of dibenzimidazoles of naphthalene-1,4,5,8-tetracarboxylic acid + 3-chlorindanthrone-4,4'-disulfoacid | $(OHCH_2CH_2OCH_2CH_2)_3NH$ | — | 5 |
|   |   | $NH_4$* | — | 15 |
| 18 | Mixture of disulfoacids of dibenzimidazoles of naphthalene-1,4,5,8-tetracarboxylic acid + 3-chlorindanthrone-4,4'-disulfoacid + mixture of dibenzimidazoles of perylene-3,4,9,10-teracarboxylic acid | $C_6H_5CH_2(CH_3)_3P$ | — | 5 |
|   |   | $NH_4$* | — | 18 |

*known polarizer according to application PCT WO 94/28073 (1994)

TABLE 2

Characteristics of light polarizers based on asymmetrical mixed salts of dichroic anionic dyes of general formula (III)

| No. | Dye | Formula | Dichroic ratio $D_I/D_{II}$ |
|---|---|---|---|
| 1 | Direct yellow lightfast O | f = g = 0; X = X' = $SO_2$<br>M = $(OHCH_2CH_2)_3NH$; n = 3;<br>$M_1$ = $NH_4$; m = 3; | 15.0 |
|   |   | (I)*, M = $NH_4$; n = 6; | 10.0 |
| 2 | Mixture of disulfoacids of dibenzimidazoles of naphthalene-1,4,5,8-tetracarboxylic acid | f and g = 0, X = X' = $SO_2$; n = 1,<br>M = $(OHCH_2CH_2OCH_2CH_2)_2NH_2$;<br>$M_1$ = $NH_4$; m = 1 | 16.0 |
|   |   | (I)*, M = $NH_4$; n = 2 | 10.0 |
| 3 | 3-chlorindanthrone 4,4'-disulfoacid | f and g = 0, n = 1; X = X' = $SO_2$, M = Cs;<br>m = 1; $M_1$ = $NH_4$, | 35.0 |
|   |   | (I)*, M = $NH_4$, n = 2 | 23.0 |
| 4 | C.I. direct yellow 73 | f and g = 0; X = $SO_2$, n = 2; M = N-methylpyridinium;<br>m = 2; X' = CO, $M_1$ = $NH_4$ | 14.0 |
|   |   | (I)*, M = $NH_4$, n = 4 | 8.0 |
| 5 | Trisulfo-acid of thioindigo (crimson) | f and g = 0, X = X' = $SO_2$; M = octylammonium;<br>n = 1;<br>$M_1$ = Na; m = 2; | 16.0 |
|   |   | (I)*, M = $NH_4$, n = 3 | 0 |
| 6 | Mixtures of disulfoacids of dibenximidazoles of per[i]ylene-3,4,9,10-tetracarboxylic acid | f and g = 0, n = 1; X = X' = $SO_2$; M = N-methylthiazolinium;<br>m = 1; $M_1$ = $NH_4$, | 17.0 |
|   |   | (I)*, M = $NH_4$, n = 2 | 10.0 |
| 7 | Acid bright-blue anthraquinonic | f and g = 0; n = 1; X = X' = $SO_2$;<br>M = $(NH_2CH_2CH_2NHCH_2CH_2)_2NH_2$;<br>m = 1; $M_1$ = $NH_4$; | 18.5 |
|   |   | (I)*, M = $NH_4$, n = 2 | 3.0 |
| 8 | C.I. 43320 acid bright-blue | n = m = 0; X = X' = $SO_2$; Z = NH, p = 1;<br>M = $(OHCH_2CH_2)_3NH$; f = 1; $M_1$ = $NH_4$;<br>g = 1 | 19.0 |
|   |   | (I)*, M = $NH_4$, n = 2 | 2.0 |
| 9 | Active bright-violet IT | f = 0; n = 2; X = $SO_2$; M = $NH_4$; m = 0;<br>Z = $SO_2$, p = 2; X = $OSO_2$; $M_1$ = K; g = 1 | 15.0 |
|   |   | (I)*, M = $NH_4$, n = 3 | 2.0 |
| 10 | Active bright light blue 2KT | f = 0; n = 1; X = $SO_2$; M = $(OHCH_2CH_2)_3NH$;<br>m = 0; g = 1; Z = $SO_2$; p = 2; X = $OSO_2$;<br>$M_1$ = $NH_4$; (I)*, M = $NH_4$, n = 3 | 16.0 |
|   |   |   | 5.0 |
| 11 | Active yellow 13–181 | n = 0; f = 1; Z = $SO_2NH$, p = 2; X = X' = $OSO_2$;<br>M = $(OHCH_2CH_2)_3NH$; m = 0; g = 1;<br>$M_1$ = $NH_4$; (I)*, M-$NH_4$, n = 2 | 14.0 |
|   |   |   | 3.5 |
| 12 | C.I. 14865 acid black 3 M | f and g = 0, X = X' = $SO_2$; $M_1$ = N-methylthiazolinium; n = 1; (I)*, M = $NH_4$<br>m = 1; | 15.0 |
|   |   | (I)*, M = $NH_4$, n = 2 | 3.0 |

*a polarizer known from application PCT WO 94/280073 (1994)

TABLE 3

Characteristics of light polarizers based on associates of dichroic dyes containing ionogenic groups with surfactants, of general formulas (IV–VI)

| No | Dye | Formula | Conductivity × $10^{-10}$ $ohm^{-1} cm^{-1}$ |
|---|---|---|---|
| 1 | Direct yellow lightfast O | (IV), SUR - dodecyl ammonium,<br>X,X' = $SO_2$; n = 1;<br>M = $NH(C_2H_4OH)_3$; m = 6 | 0.1 |
|   |   | (I)*, m = 7; M = $NH_4$ | 15.0 |
| 2 | Disulfoacid of indigo (blue) | (IV), SUR-decyltrimethyl ammonium cation; X, X' = $SO_2$; n = 1; M = Na; m = 1; | 0.5 |
|   |   | (I)*, M = $NH_4$, m = 2 | 10.0 |
| 3 | Trisulfoacid of thioindigo (crimson) | (IV), SUR = decylpyridinium cation;<br>X,X' = $SO_2$;; n = 1;<br>M = N-methylpyridinium; m = 2; | 0.05 |
|   |   | (I)*, M = $NH_4$, m = 2 - PC cannot be obtained | — |

TABLE 3-continued

Characteristics of light polarizers based on associates of dichroic dyes containing ionogenic groups with surfactants, of general formulas (IV–VI)

| No | Dye | Formula | Conductivity × $10^{-10}$ $ohm^{-1} cm^{-1}$ |
|---|---|---|---|
| 4 | C.I. direct orange 138 | (IV), SUR-octyltrimethyl ammonium cation; X,X' = $SO_2$; n = 1 M = $NH(C_2H_4OH)_3$; m = 1; | 0.04 |
|   |   | (I)*, M = $NH_4$, m = 2, n = 0 | 13.0 |
| 5 | C.I. active yellow 1 | (IV), SUR-dodecyl ammonium cation; X = X' = $SO_2$; n = 1; M = $NH(C_2H_4OH)_3$; m = 1; | 0.05 |
|   |   | (I)*, M = $NH_4$, m = 2; n = 0 | 15.0 |
| 6 | C.I. acid yellow 135 | (IV), triethanolaminic salt of SUR-dodecyldimethyl aminoacetic acid; Z = O; p = 2; X = $OSO_2$; n = 1; m = 0; | 0.5 |
|   |   | (I)*, M = $NH_4$, m = 1, n = 0 | 20.0 |
| 7 | C.I. direct yellow 73 | (IV), SUR-dodecylimidazolinium cation; X = $SO_2$, n = 2; X' = CO, M = Ba, m = 2; | 0.5 |
|   |   | (I)*, M = $NH_4$, m = 4, n = 0 | 20.0 |
| 8 | C.I. active bright-violet IT 73 | (IV), SUR-cetyltrimethyl ammonium cation; Z = NH, p = 1, X = $SO_2$, f = 1, n = 0; X' = $SO_2$, M = Cs' g = 1; m = 0 | 0.3 |
|   |   | (I)*, M = $NH_4$, m = 2, n = 0 | 25.0 |
| 9 | C.I. 63320 acid bright-blue | (IV), SUR-dodecylimidazolinium cation; Z = $SO_2$, p = 2, X = $OSO_2$, f = 1, n = 0; X' = $SO_2$, M = Na, m = 2; g = 0, | 0.7 |
|   |   | (I)*, M = $NH_4$, m = 3, n = 0 | 20.0 |
| 10 | C.I. 50315 acid dark-blue | (V), SUR-octylsulfate; g = 0, m = 2; X = $SO_2$, M = $NH_4$; | 1.0 |
| 11 | C.I. 44025 acid green Zh | (V), SUR-dodecylsulfonate; g = 0; m = 2; X = $SO_2$, M = $NH_4$; | 0.5 |
| 12 | C.I. basic blue 41 | (VI), SUR-2-hydroxy-3-(dodecyltrimethyl ammonium)-propanesulfate, triethanol aminic salt; n = 1 | 0.5 |
| 13 | C.I. basic blue 4 | (VI), SUR-2-(dimethyloctylamidopropylammonium)ethanesulfate, N-methylpyridinium; n = 1 | 0.2 |
| 14 | Methylene blue | (VI), SUR-dimethyldodecyl amonium of acetic acid, triethanolaminic salt of; n = 1 | 0.5 |
| 15 | C.I. Basic 22 | (VI), SUR-octyldimethyl ammonium ethane sulfate, ammonium salt; n = 1 | 1.0 |

*the polarizer known according to application PCT WO 94/28073 (1994).

It should be noted that the above-mentioned polarizers of both the dichroic and interference types based on the birefringent anisotropically absorbing layers having at least one refraction index growing as the wavelength increases, assume the utilization of not more than 50% of the incident light energy.

Use of the birefringent layer having the abnormal dispersion also allows to produce a polarizer that provides conversion of practically entire energy of a non-polarized radiation source into the polarized radiation.

The proposed polarizer of said type includes:
a polarizing means for dividing a plurality of non-polarized light beams, that constitute the light incident on a polarizer, to the same plurality of identical pairs of the differently polarized light beams, and
a means for changing the polarization of at least one plurality of identically polarized light beams comprised by said plurality of pairs of the differently polarized light beams.

Said polarizing means implemented in the form of the focusing optical elements, each consisting of at least one birefringent anisotropically absorbing layer adjacent to at least one optically isotropic layer, is optically registered with said means for polarization changing implemented in the form of a sectioned translucent birefringent plate.

For simplicity, said polarizer will be referred to as the polarizer based on the transmissive type polarizing means.

The characteristic feature of this polarizer is also the use, in said polarizing means, of at least one birefringent anisotropically absorbing layer having at least one refraction index growing as the polarizable light wavelength increases.

Said focusing optical element of the claimed polarizer can be implemented in the form of a zone plate, which in its turn can be implemented in the form of an amplitude zone plate, wherein the even zones comprise at least one birefringent anisotropically absorbing layer adjacent to at least one optical isotropic layer, and the odd zones are manufactured of an optically isotropic material.

A phase zone plate can serve as the other version of the zone plate of the claimed polarizer.

A phase zone plate can have at least one refraction index changing at least along one of the directions, inclusive of that along the plate.

At least one refraction index of a phase zone plate can change in the direction along the plate plane according to a certain rule, including a non-monotonic change.

The means for changing polarization of the claimed polarizer can also comprise a sectioned translucent birefringent anisotropically absorbing layer having at least one refraction index growing as the polarizable light wavelength increases.

At least one refraction index of at least one birefringent anisotropically absorbing layer in a polarizer based on a polarizing means of the transmissive type can be directly proportional to the polarizable light wavelength.

At least one birefringent anisotropically absorbing layer of the claimed polarizer can have a thickness whereat the interference extremum at output of a polarizer at least for one linearly-polarized light component is realized. Thereby thickness of at least one birefringent anisotropically absorbing layer satisfies the condition of obtaining, at output of an optical polarizer, the interference minimum for one linearly-polarized component of the passing light and the interference maximum for other orthogonal linearly-polarized component of the passing light.

For manufacture of the claimed polarizer, layers are selected such that refraction index of the optically isotropic layer will coincide with, or be maximally proximate to one of indices of the birefringent layer.

Preferable is a polarizer characterized in that the means for changing polarization is implemented in the form of a sectioned translucent half-wave birefringent plate or a layer having sections disposed in focuses or outside focuses of focusing optical elements.

When in the polarization changing means, used is an <<achromatic>> half wave or quarter-wave (for circular polarization) plate, wherein a phase delay (or travel difference) is an half or quarter of the wavelength, the polarization change, when light passes through such plate, takes place at all wavelengths of the operating range.

Another version is a polarizer, characterized in that the polarization changing means is implemented in the form of a sectioned translucent birefringent plate having sections in the form of quarter wave plates disposed outside focuses of the focusing optical elements, and having sections in the form of plates determining a phase difference between the ordinary and extraordinary rays, that is different by $\pi$ from the phase difference determined by said sections in the form of quarter-wave plates disposed in focuses of the focusing optical elements.

The means for changing polarization of the claimed polarizer can be implemented in the form of a sectioned translucent polymerized planar layer of a liquid crystal having the twist structure, wherein the liquid crystal optical axis within thickness of said layer is rotated by angle of 90°, with sections disposed in focuses or outside focuses of the focusing optical elements.

The claimed polarizer can be implemented in the form of a film or plate comprising said polarizing means in the form of focusing optical elements having different focal power for each polarized component of the non-polarized light incident upon the polarizer, and optically registered with said means for changing polarization of at least one plurality of identically polarized light beams. Said focusing optical elements can be in the form of the volume (bulk) or phase collecting lenses, or various kinds of them known from the zone plate optics. see G. S. Landsberg, Optics, rev. and suppd. 5th ed., <<Nauka>> publishers, Moscow, 1976.

A version of the claimed polarizer, for which the wavelength region where the abnormal dispersion is observed, differs from the operating wavelength range, is a polarizer comprising at least one birefringent anisotropically absorbing layer, representing a plurality of volume (bulk) or phase lenses. In this case, by use of appropriate dyes for forming said lenses, it is possible to create a polarizer providing polarization in the IR-region too.

It should be noted that the focusing optical elements can have not only the form of lenses, but be the form of mirrors, and combined ones.

A distinguishing feature of the invention is the use, for manufacture of a polarizer, of at least one birefringent anisotropically absorbing layer having the abnormal dispersion, comprised by a polarizing means and implemented in some embodiments of means for changing polarization for at least one polarized light component.

For forming said birefringent anisotropically absorbing layer having the abnormal dispersion, the materials and techniques used for the above-claimed polarizers of the interference and dichroic types can be utilized.

The above-discussed versions do not limit the possibility of using other materials for forming birefringent layers for the proposed optical polarizer.

Selection of the techniques to apply an oriented birefringent material depends on the used material and is not important for the essence of the invention. The polarizing layers of a birefringent material according to the invention can be not only the flat ones, but can be the focusing ones, for example in the form of lenses and/or mirrors.

Photolithography techniques can be used for creating sectioned birefringent layers. For application of thermotropic polymer materials, extruders, including those having a great number (10–100) of flat dies and allowing to apply many layers of the required thickness of different polymer materials at one run, can be used.

The final result of any used techniques must be an oriented layer of a birefringent material having, apart from refraction indices that vary at different axes, the dichroism too, with optimum values of absorption indices.

Principle of operation of the claimed polarizer can be described as follows. A non-polarized light ray is incident on a first flat surface of a polarizer in the form of a film or plate comprising a polarizing means applied thereon. Said non-polarized light ray, passing through the polarizing means in the form of focusing optical elements having different focal power for each polarized component of the incident non-polarized light, is divided into a plurality of pairs of the differently polarized light beams. The resulting plurality of pairs of the differently polarized light beams is, at the same time, the two pluralities of the polarized light beams, wherein, in each of them, the light is polarized identically for all the beams comprised by said plurality. Further, one of these pluralities of light beams comprised by said plurality of pairs of differently polarized light beams can have the form of, for example, parallel light beams linearly-polarized in the same plane, and the other plurality of light beams can be in the form, for example, of the light beams linearly-polarized in the plane that is orthogonal to the polarization plane of the first plurality of the beams convergent in focuses of the focusing optical elements, which (focuses) are regularly arranged on a second flat surface of a polarizer, which second surface comprises an applied thereon means for changing polarization of at least one plurality of the identically polarized light beams in the form of a sectioned translucent birefringent plate. At least one plurality of the identically polarized light beams, passing through said polarization changing means disposed on the second surface of the polarizer, changes its polarization such that state of its polarization will be identical with polarization state of the other plurality of the also identically polarized light beams, that also passed through the second boundary of the polarizer. As the result, both said pluralities of the light beams leaving the polarizer based on a polarizing means of transmissive type, become polarized identically, and further both these pluralities of said light beams coming out of the polarizer transfer the light energy amounting to at least over 50% of the energy of the light incident on the light polarizer, and essentially in the same direction.

The other kind of the claimed polarizer providing conversion of more than 50% of all the energy of a non-polarized radiation into the polarized one, is a polarizer based on a polarizing means of the reflecting type.

Said polarizer is implemented in the form of at least one film or plate, whereon applied are a means for converting the incoming non-polarized light into a plurality of identical light beams, a polarizing means for dividing the non-polarized light beams into the polarized passing and reflected light beams having different polarization, and a means for changing polarization and direction of the light beams reflected from the polarizing means.

A distinguishing feature of the claimed polarizer is a polarizing means comprising at least one birefringent anisotropically absorbing layer having at least one refraction index growing as the polarizable light wavelength increases, or a birefringent layer having the constant, across the layer thickness, directions of the optical axes or a birefringent layer having directions of the optical axes that change across the layer thickness according to a certain rule.

Depending on the type of the used birefringent layer, division of the non-polarized light beams can be done either as into the linearly-polarized passing and reflected with orthogonal polarizations light, or into the circularly polarized passing and reflected, having opposite signs of the polarization rotation, light.

The means for changing polarization and direction of the reflected light beams of the claimed polarizer can comprise a sectioned metallic mirror.

Preferable is a polarizer whose polarizing means includes at least one birefringent anisotropically absorbing layer or a birefringent layer having constant, across the layer thickness, optical axes, and where upstream of the sectioned metallic mirror a quarter-wave plate is positioned.

Also preferable is a polarizer comprising at least one birefringent anisotropically absorbing layer having at least one refraction index that grows as the polarizable light wavelength increases.

Also preferable is a polarizer wherein the wavelength region, where the anisotropic absorption of the birefringent layer is observed, and thus the condition of the abnormal dispersion is met, coincides with the wavelength operating range.

The most preferable is the use of birefringent anisotropically absorbing layers with at least one refraction index that is directly proportional with the polarizable light wavelength.

The polarizer according to the invention can comprise as at least one birefringent anisotropically absorbing layer a layer formed of materials used for manufacturing the claimed polarizer of the interference type.

The above-discussed versions do not limit the use of other materials for forming birefringent anisotropically absorbing layers for the proposed polarizer.

A birefringent anisotropically absorbing layer in the proposed polarizer can be both a solid and liquid one.

For manufacture of a birefringent layer having the constant, across the layer thickness, directions of the optical axes, polymer films oriented by uniaxial or biaxial stretching, transparent (not absorbing the light) in the operating wavelength range polymer films can be used.

An example of birefringent layers having the direction of the optical axis changing across the layer thickness according to a certain rule, is layers of cholesteric liquid crystals. In such layers the optical axis corresponding to the long axes of the stick-shaped molecules and, accordingly, to a greater refraction index, is rotated in the mental motion across the thickens remaining to be parallel to the layer plane. The distance across the thickness, whereat the optical axis makes the full rotation at 360° is referred to as the cholesteric spiral pitch. Direction of the optical axis rotation can be both clockwise and such spiral is referred to as the right one, and counter-clockwise, and such spiral is referred to as the left one. Such structure (texture) of a birefringent layer of cholesteric liquid crystals is referred to as the planar one, or the Grandjean texture. The main optical properties of a birefringent layer of cholesteric liquid crystals of the planar texture are as follows:

1. When the light is incident on the layer, there is a region of selective reflection of the light, the spectrum position of which region is proportional to the cholesteric spiral pitch.
2. The spectrum width of the light selective reflection region is proportional to the refraction index anisotropy (i.e. the difference between the ordinary and extraordinary refraction indices).
3. Within the light selective reflection region, one circularly polarized component of non-polarized light, direction of which component coincides with the cholesteric spiral rotation direction, is reflected completely, the other circularly polarized component of the non-polarized light, direction of which component is opposite to the cholesteric spiral rotation direction, passes through the layer completely.

Thus the planar texture cholesteric liquid crystal layer is a circular polarizer of the reflecting type for both the passing and reflected lights. Such layer can serve as, or can be included into a polarizing means for dividing the non-polarized light beams into the passing and reflected light beams having different polarizations. When necessary, the known quarter-wave plate can be used for converting the circular polarizations into the linear ones.

Preferable is a polarizer according to the invention, where the polarizing means comprises at least one layer of a cholesteric liquid crystal.

More preferable is a polarizer according to the invention comprising at least one layer of the cholesteric liquid crystal manufactured of a polymer cholesteric liquid crystal.

At least one layer of the cholesteric liquid crystal has across its thickness a gradient of the cholesteric spiral pitch and, as the result, can have the spectrum width of the light selective reflection band not less than 100 nm.

The polarizing means of the reflecting type can comprise at least three layers of cholesteric liquid crystals having the light selective reflection band in three different spectrum ranges.

The means for converting the incoming non-polarized light into a plurality of identical light beams can be implemented in the form of a system of microlenses or microprisms focusing the light beams coming thereto in the direction towards the interior of the polarizer. In particular, a microlens system can be implemented in the form of positive cylindrical microlenses entirely covering the polarizer surface.

Selection of techniques for manufacture of a polarizer according to the invention depends on the materials to be used for the birefringent layers, and is not important for the invention essence.

For forming, on the surface of the proposed polarizer, a polarizing coating comprising at least one birefringent layer, the following standard methods can be used: lamination of the preliminarily oriented by stretching polymer films, application of the used materials in the liquid state by a roller, doctor blade, blade in the form of a non-rotating cylinder, application using a slit die, and other methods. In some cases, after a layer is applied, it is dried to remove solvents. In other cases, for example for thermoplastic polymer materials and vitrifying materials, the applied layer is cooled after application.

The other techniques that can be used to obtain birefringent layers of the materials that form, when applied, the liquid crystal phase, consist in applying such material onto a substrate prepared beforehand for orientation of the liquid crystal phase. see U.S. Pat. No. 2,524,286 (1950). One of these techniques is an uni-directional rubbing of a substrate, or rubbing of a thin polymer layer applied thereon beforehand, which is known and used for orienting thermotropic low-molecular liquid crystal mixes in manufacture of LC-displays.

Another technique for obtaining birefringent layers is the known technique of photo-orientation of the preliminarily applied in this or other manner layer using irradiation thereof by the linearly-polarized ultra-violet light.

For applying birefringent layers of thermotropic polymer materials extruders can be used, inclusive of the extruders having a number of flat dies and allowing to apply several layers of different polymer materials of the required thickness at one run.

For manufacture of a layer of cholesteric liquid crystals of the planar texture, the following materials can be used: cholesterol esters, nematic liquid crystals doped with optically active compounds, so called chiral nematics wherein the optically active center is chemically connected with molecules of a nematic liquid crystal, polymer cholesteric liquid crystals, lyotropic cholesteric liquid crystals of, for example, polypeptides and cellulose ethers.

The manufactured layers can be both liquid and solid. Curing of layers can be done be lowering a temperature, by evaporation of a solvent, polymerization, including photo-induced polymerization.

As the means to convert the incoming non-polarized light into a plurality of identical light beams, a system of microlenses, both the volume and flat Fresnel lenses, as well as the other means for focusing light beams, a system of microprisms in the form of volume prisms of, for example, the triangular shape, or flat prisms having, for example, the distributed across the thickness and surface refraction index, and also other means for deflecting the light rays.

For manufacture of a system of microlenses or microprisms, the moulding, casting techniques can be used, for example filling the preliminarily prepared depressions of the desired shape in a polymer film with a polymer material having a greater refraction index; photo-induced polymerization, and other techniques.

For applying a sectioned metallic mirror, the following standard methods can be used: thermal evaporation in vacuum, application in vapours with subsequent thermal treatment, magnetron sputtering, and other methods. For application of a mirror, aluminium (Al), silver (Ag), and other metals can be used.

Principle of operation of the claimed polarizer based on a polarizing means of the reflecting type will be disclosed in description of the specific examples of this polarizer.

As it is mentioned above, the above-claimed polarizers can be used in various devices for displaying information, in particular for manufacture of liquid-crystal display elements, including flat displays.

The objective of the invention is to provide improved brightness and colour saturation of the images produced by a liquid-crystal display element.

This objective is to be attained by use of liquid-crystal display element (LCD), comprising a layer of liquid crystal disposed between a first and second plates, at least on one of said plates located are electrodes and a polarizer that includes at least one birefringent anisotropically absorbing layer having at least one refraction index that grows as the polarizable light wavelength increases.

For forming said layer, the same materials and techniques as for the above-claimed polarizers, are used.

An high quality of an image is to be provided by a LCD element comprising at least one polarizer of the interference type having high polarization characteristics.

The claimed LCD element can further, on one plate, comprise a diffusion reflection layer, which layer is simultaneously an electrode, and at least one birefringent anisotropically absorbing layer being located directly on the reflecting layer, or on a dielectric sub-layer applied on the reflecting coating.

The other version of the LCD element is characterized in that on one of the plates, an additional layer of colour elements is formed between the polarizer and the plate.

The polarizer of the claimed LCD element can further comprise at least one layer that reflects the light at least partially. Said light-reflecting layer can be made of a metal.

At least one birefringent anisotropically absorbing layer of at least one polarizer of the claimed LCD element can be implemented in the form of elements that differ from one another in the aspect of the phase delay and/or the polarization axis direction.

One polarizer of the claimed LCD element comprises at least two birefringent anisotropically absorbing layers of different colours with mutually perpendicular direction of the polarization axes, applied one upon the other, or on at least one intermediate layer separating them; and on the other plate the polarizer comprises at least one birefringent anisotropically absorbing layer of gray colour having the polarization axis coinciding with the polarization axis direction of one of the birefringent anisotropically absorbing layers on the first plate.

Use of the polarizer based on the polarizing means of the reflecting type, utilizing more than 50% of the non-polarized light, provides an high brightness and reduces the amount of power consumed by the LCD element.

The proposed LCD element comprises a liquid crystal layer positioned between the first and second plates, where at least on one of said plates electrodes and the polarizer are positioned. At least one polarizer comprises:

a polarizing means for dividing a plurality of non-polarized light beams of the light incident upon the polarizer into the same plurality of identical pairs of the differently polarized light beams, which means is implemented in the form of focusing optical elements, each of which comprising at least one birefringent anisotropically absorbing layer having at least one refraction index that grows as the polarizable light wavelength increases and is adjacent to at least one optically isotropic layer; said polarizing means being optically registered with a means for changing polarization of at least one of the identically polarized light beams comprised by said plurality of pairs of the differently polarized light beams.

At least one birefringent anisotropically absorbing layer of the focusing optical element of the claimed LCD element can be implemented in the form of a plurality of the bulk or phase lenses.

The focusing optical element of the claimed LCD element can be implemented in the form of a zone plate.

A kind of a zone plate is an amplitude zone plate, whose even zones comprise at least one birefringent anisotropically absorbing layer adjacent to at least one optically isotropic layer, and the odd zones being implemented of an optically isotropic material.

The other kind of a zone plate is a phase zone plate.

The means for changing polarization of the LCD element can comprise a sectioned translucent birefringent anisotropically absorbing layer having at least one refraction index that grows as the polarizable light wavelength increases. The polarization changing means can be implemented in the form of a sectioned translucent half-wave birefringent plate, or a layer having sections disposed in focuses or outside the focuses of the focusing optical elements.

The polarization changing means of the polarizer of the claimed LCD element can be implemented in the form of a sectioned translucent birefringent plate having sections in the form of quarter-wave plates disposed outside the focuses of the focusing optical elements, and having sections determining a phase difference between the ordinary and extraordinary rays, differing by $\pi$ from the phase difference determined by said sections in the form of quarter-wave plates disposed in focuses of the focusing optical elements.

The polarization changing means of the claimed LCD element can be implemented in the form of a sectioned translucent polymerized planar layer of a liquid crystal having the twist texture, with the rotation of the liquid crystal optical axis within the thickness of said layer by angle of 90°, with sections disposed in focuses or outside focuses of the focusing optical elements.

The polarization changing means of the claimed LCD element can be implemented in the form of a sectioned translucent achromatic birefringent plate.

An increased brightness and a lower power consumption are also provided by the LCD element using the polarizer based on a polarizing means of the reflecting type.

The proposed LCD element comprises a liquid crystal layer disposed between a first and second plates, at least on one of which plates positioned are electrodes and a polarizer. At least one polarizer is implemented in the form of at least one film or plate, whereon applied are: means for converting the incoming non-polarized light into a plurality of identical light beams, a polarizing means for dividing the non-polarized light beams into the polarized passing and reflected light beams having different polarizations, which means comprises at least one birefringent anisotropically absorbing layer having at least one refraction index that grows as the polarizable light wavelength increases, or a birefringent layer having the constant, across the layer thickness, directions of the optical axes, or a birefringent layer having the optical axes directions that change across the layer thickness according to a certain rule, and a means for changing polarization and direction of the light beams reflected from the polarizing means.

The means for changing polarization and direction of the reflected light beams of the claimed LCD element can comprise a sectioned metallic mirror.

The polarizing means of the LCD element can comprise at least one birefringent anisotropically absorbing layer or a birefringent layer having the constant across the layer thickness directions of the optical axes, and having a quarter-wave plate upstream of the sectioned metallic mirror.

The polarizing means of the claimed LCD element can comprise, as at least one birefringent layer having the optical axes directions that change across the layer thickness according to a certain rule, at least one layer of a cholesteric liquid crystal that can be manufactured of a polymer cholesteric liquid crystal.

At least one layer of a cholesteric liquid crystal can have, across the thickness, a gradient of the cholesteric spiral pitch, and, as the result, a spectrum width of the light selective reflection band of not less than 100 nm.

The polarizing means can comprise at least three layers of cholesteric liquid crystals having the light selective reflection bands in three various spectrum ranges.

The means for converting the incoming non-polarized light of the polarizer of the claimed LCD element can be implemented in the form of a system of microlenses or microprisms that focus the light beams coming out of them in the direction towards the interior of the polarizer.

A system of microlenses can be implemented in the form of positive cylindrical microlenses that entirely cover the polarizer surface.

On a first surface of a film or plate the polarizer of the claimed LCD element can comprise a system of microlenses and a sectioned metallic mirror optically registered with said system of microlenses, and on a second surface of a film or plate it can comprise at least one layer of a cholesteric liquid crystal.

The polarizer of the claimed LCD element on the first surface of a film of plate can comprise a system of microlenses, a sectioned metallic mirror optically registered with said system of microlenses, and a quarter wave plate; and on the second surface the polarizer further comprises at least one birefringent anisotropically absorbing layer or a birefringent layer having the constant, across the layer thickness, directions of the optical axes.

The polarizer on the first surface of a film or a plate can also comprise a sectioned metallic mirror, and on the second surface of film or plate applied are, sequentially, a system of microlenses optically registered with sections of the metallic mirror, and at least one layer of a cholesteric liquid crystal.

Preferable is a LCD element whose polarizer on the first surface of a film or plate comprises a sectioned metallic mirror and a quarter-wave plate, and on the second surface of a film or plate sequentially applied are a system of microlenses optically registered with sections of the metallic mirror and at least one birefringent anisotropically absorbing layer or a birefringent layer having the constant, across the layer thickness, directions of the optical axes.

The polarizer of the claimed LCD element can comprise at least two laminated films or plates; on the external surface of the first film or plate applied is a first system of microlenses, on the internal surface of the first or second film or plate applied is a sectioned metallic mirror, and on the external surface of the second film or plate additionally applied is the second system of microlenses optically registered with sections of the metallic mirror and with the first system of microlenses; and at least one layer of a cholesteric liquid crystal.

Preferable is a LCD element whose polarizer comprises at least two laminated films or plates; on the external surface of the first film or plate applied is a first system of microlenses, on the internal surface of the first or second film or plate applied are a sectioned metallic mirror and a quarter-wave plate, on the external surface of the second film or plate additionally applied are the second system of microlenses optically registered with sections of the metallic mirror and with the first system of microlenses, and at least one birefringent anisotropically absorbing layer or a birefringent layer having the constant, across the layer thickness, directions of the optical axes.

Preferable is a LCD element whose polarizer comprises at least two laminated films or plates; on the external surface of the first film or plate applied is a system of microprisms, on the internal surface of the first or second film or plate applied is a sectioned metallic mirror optically registered with the system of microprisms, on the external surface of the second film or plate applied is at least one layer of a cholesteric liquid crystal.

Preferable is a LCD element whose polarizer comprises at least two laminated films or plates, on the external surface of the first film or plate applied is a system of microprisms, on the internal surface of the first film or plate sequentially applied are a sectioned metallic mirror optically registered with the system of microprisms, and a quarter-wave plate; on the external surface of the second film or plate applied is at least one birefringent anisotropically absorbing layer or a birefringent layer having the constant, across the layer thickness, directions of the optical axes.

Preferable is a LCD element whose at least one polarizer further comprises an alignment layer formed of inorganic materials or on the basis of polymer materials.

The alignment layer can be formed both on the birefringent anisotropically absorbing layer, and between the substrate and said layer.

Another version is a LCD element, characterized in that at least on one of the plates at least one birefringent anisotropically absorbing layer of at least one polarizer is disposed on a transparent electrode, or between the plate and the electrode, or on a dielectric film covering the transparent electrode, or between the layer that orients the liquid crystal and a dielectric sub-layer that covers the electrode, or on the on the back of the plate.

Preferable is a LCD element, characterized in that on one plate formed is a diffusion-reflection coating that can simultaneously serve as an electrode, and at least one birefringent anisotropically absorbing layer being disposed directly on the reflecting coating or on a dielectric sublayer applied on the reflecting coating, or between the alignment layer and the other layers applied on the reflecting coating.

At least one birefringent anisotropically absorbing layer used in all above-cited versions of the LCD element can have at least one refraction index that is directly proportional to the polarized light wavelength.

At least one birefringent anisotropically absorbing layer of at least one polarizer in all above-cited versions of the LCD element can have a thickness whereat the interference extremum at output of the polarizer at least for one linearly-polarized light component is realized.

Thickness of at least one birefringent anisotropically absorbing layer of at least one polarizer in all above-cited versions of the LCD element can satisfy the condition of obtaining the interference minimum at output of the polarizer for one linearly-polarized light component and the interference maximum for the other orthogonal linearly-polarized light component.

At least one polarizer in all above-cited versions of the LCD element comprising at least two layers, comprises, as at least one of them, a birefringent anisotropically absorbing layer, and the other layer is the optically isotropic one whose refraction index coincides with, or maximally proximate to one of the indices of a birefringent layer.

At least one polarizer in all the above-cited versions of the LCD element comprising at least two birefringent layers, comprises, as at least one of them, the anisotropically absorbing layer, one refraction index of which layer coincides with, or maximally proximate to one of the indices of the birefringent layer, and the second refraction indices of the birefringent layer and the birefringent anisotropically absorbing layer differ from one another.

By varying the used dyes in a LLC composition LC-devices with different colour including the gray one, can be created. The gray colour can be also obtained by the layer-by-layer application of a birefringent anisotropically absorbing layer of yellow, red and blue colours when they are formed on plates of a dish.

Use of an associate of dichroic dyes comprising ionogenic groups with at least one mole of an organic, particularly surface-active ion for forming a birefringent anisotropically absorbing layer provides a good orienting capability of a polarizer when it is disposed inside a LCD element, whereby the necessity to apply additional alignment layers is avoided. By varying the structure of an organic ion, the orienting and wetting capabilities of solutions in manufacturing polarizers can be changed, which is important for manufacturing LCD elements of various types.

Further, the presence of low-motion organic ions in polarizing coatings provides a low conductivity, which in its turn lowers the energy consumption, thus extending service life of liquid crystal devices. Thereby the necessity to apply additional insulating layers when polarizers are disposed internally is avoided.

Variety of the colour arrangements of the claimed LCD element is provided by using the most different dyes, for example those of (II–VI) formulas, for manufacture of polarizers.

Use of the interference polarizers based on birefringent anisotropically absorbing layers provides an high brightness and homogeneity across the surface of the claimed LCD element, as well as good angular characteristics and the absence of shadows in operation for the reflection.

An increased brightness of a LCD element with simultaneous lowering of the energy consumption is achieved by a polarizer utilizing more than 50% of the incident light energy.

Use of the above-mentioned materials for forming birefringent anisotropically absorbing layers provides the possibility to manufacture both monochromatic and colour LCD elements and displays based thereon.

To attain an high brightness and contrastness of the image in the proposed device intended for manufacturing the high-resolution displays, additional orienting and brightening layers can be used alongside with birefringent anisotropically absorbing layers.

Use of the claimed polarizers based on birefringent anisotropically absorbing layers does not exclude the use of conventional film-based polarizing films, in particular iodine polarizers based on PVA. For example, combination of the internal polarizer on the $1^{st}$ plate having a iodine-based reflecting or transmissive polarizer glued onto the external side of the second plate, allows to create a device having an high image brightness and contrast and not requiring an additional glass usually used to protect a polarizer glued onto the external side of a first glass.

Further, using a polarizer based on birefringent anisotropically absorbing layers, LC display elements with the external arrangement of polarizers can be manufactured. For this purpose, birefringent anisotropically absorbing layers are applied on a transparent isotropic polymer film, whereafter the so produced film polarizer is glued onto the external side of the plates. It should be noted that the LC device produced in this way comprises much less layers as compared with the LC device having conventional polarizers based on the PVA films.

BRIEF DESCRIPTION OF DRAWINGS

A polarizer of the interference type according to the invention is illustrated by certain examples of the specific embodiment as shown in FIGS. 1–3.

Figure 4:
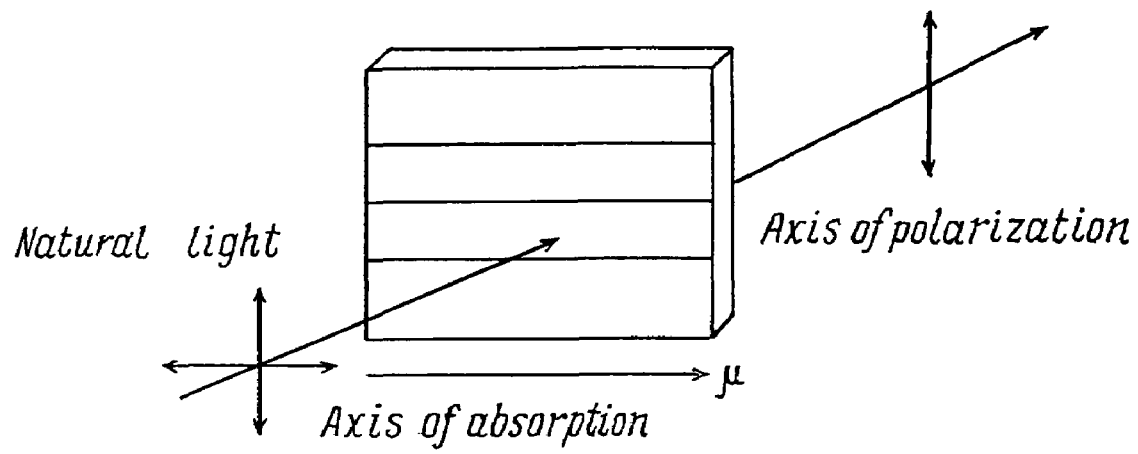
Figure 5:
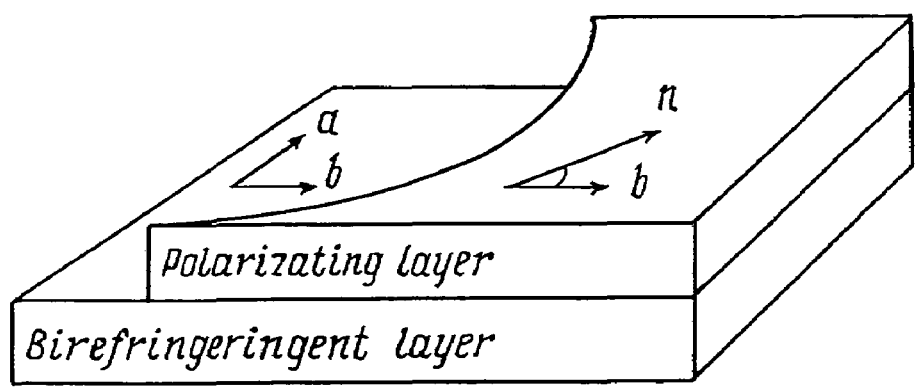

A polarizer of the dichroic type and a circular polarizer based thereon are represented in FIGS. 4–5.

A polarizer based on a polarizing means of the transmissive tape according to the invention is illustrated by specific examples of a particular embodiment shown in FIGS. 6–12.

Figure 6:
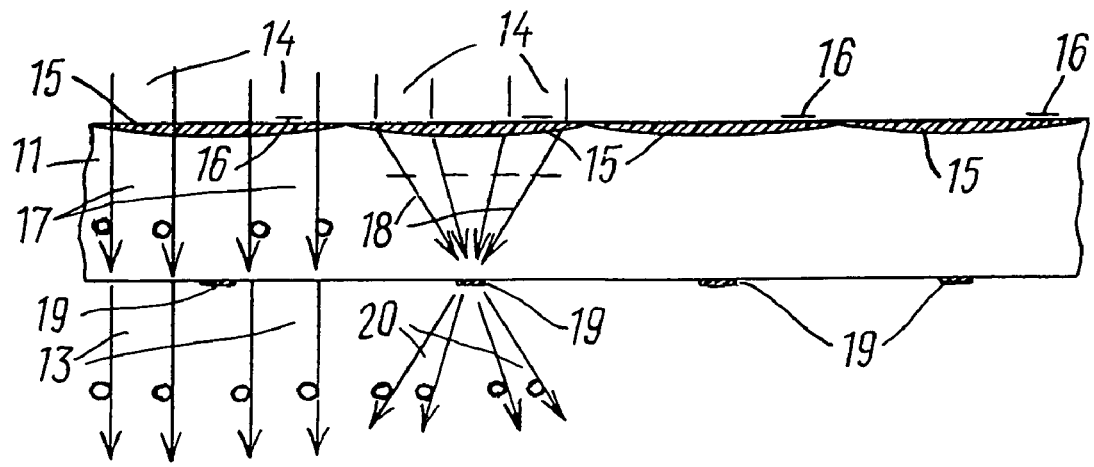

FIG. 6 schematically shows a cross section of one version of the proposed polarizer implemented in the form of one film, on whose surface applied is the following: a polarizing means in the form of volume lenses made of birefringent anisotropically absorbing material, and a means for changing polarization of polarized light beams in the form of a sectioned translucent birefringent plate, sections of which plate are disposed in focuses of said volume lenses.

Figure 7:
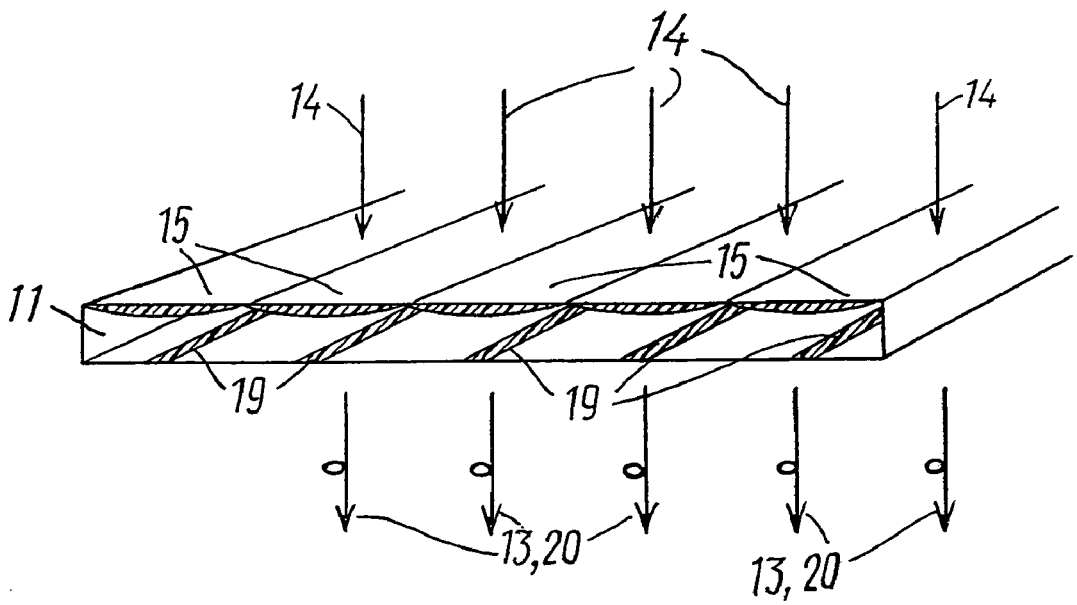

FIG. 7 schematically shows a general view of the proposed polarizer according to FIG. 6.

Figure 8:
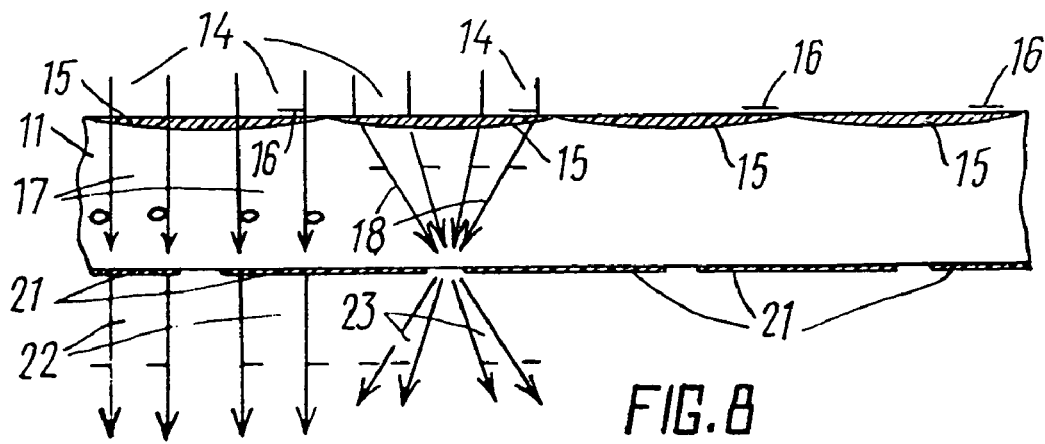

FIG. 8 schematically shows a cross-section of one of versions of the proposed polarizer implemented in the form of one film, on the surface of which film applied are: a polarizing means in the form of said volume lenses, and a means for changing polarization of the polarized light beams, implemented in the form of a sectioned translucent birefringent plate whose sections are disposed outside focuses of said volume lenses.

Figure 9:
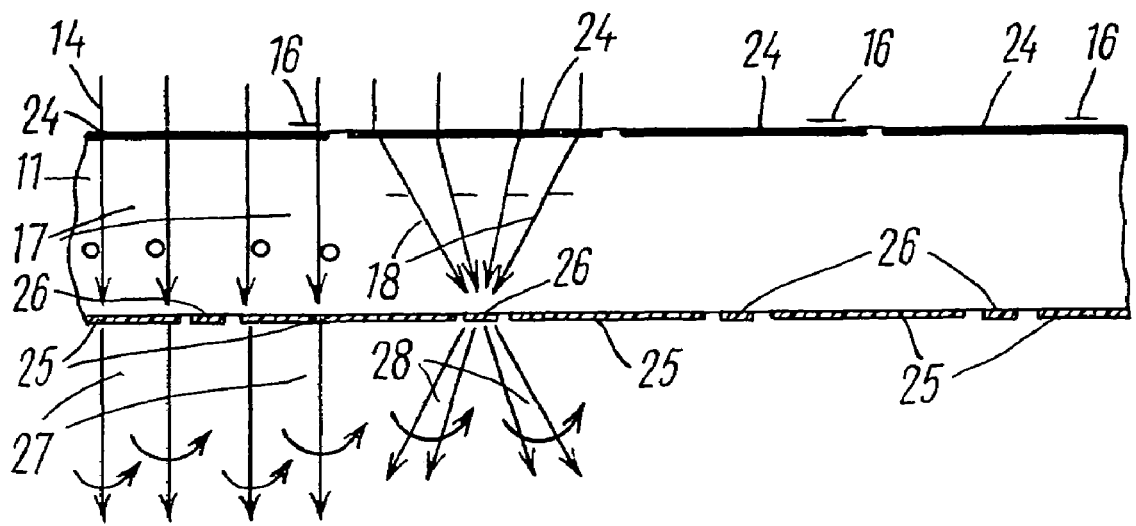

FIG. 9 schematically shows a cross-section of a version of the proposed polarizer in the form of one film, on the surface of which film applied are: a polarizing means in the form of amplitude zone plates made of interleaving layers of birefringent and optically isotropic materials, and a means for changing polarization of the polarized light beams implemented in the form of a sectioned translucent birefringent plate having sections in the form of quarter-wave plates disposed outside focuses of said amplitude zone plates and sections determining the phase difference between the ordinary and extraordinary rays, differing by $\pi$ from the phase difference determined by said sections in the form of quarter-wave plates disposed in focuses of said amplitude zone plates.

Figure 10:
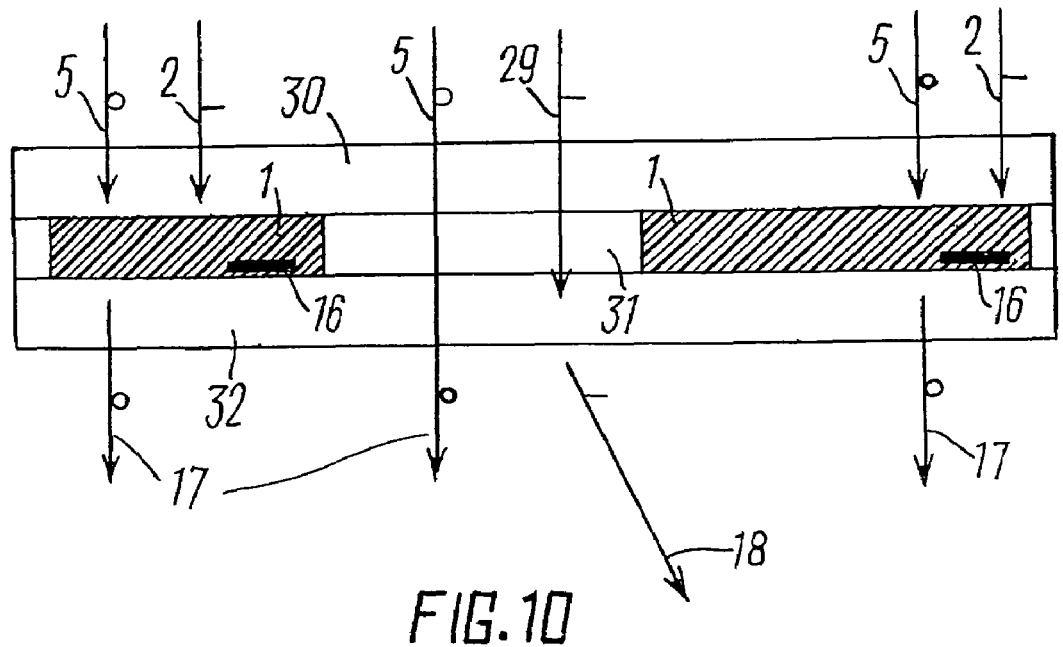

FIG. 10 presents a cross section of one of the possible designs of an amplitude zone plate used in the version of the proposed polarizer according to FIG. 9.

Figure 11:
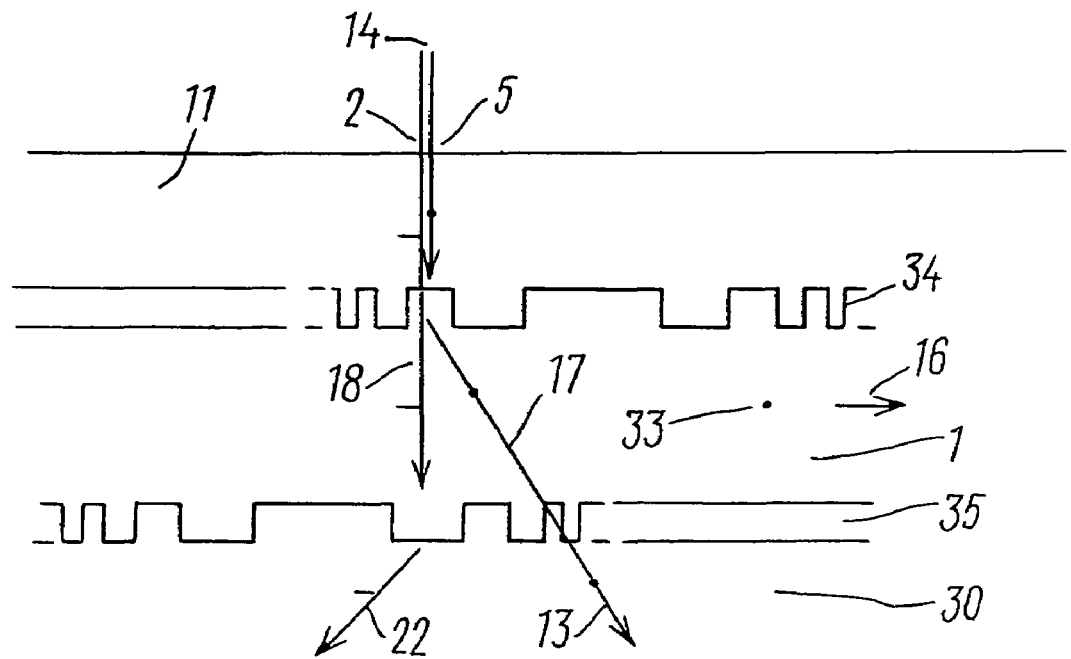

FIG. 11 shows a cross section of a phase zone plate made of three layers, one of which is birefringent anisotropically absorbing one, and two other are optically isotropic with different refraction indices: one index is equal to the ordinary refraction index of a birefringent layer, the other being equal to the extraordinary one. Boundaries of these layers have a surface profile allowing them, when said ratios of the refraction indices exist, to play the role of arrays of identical phase zone plates capable of focusing the rays that are linearly-polarized in mutually orthogonal planes. These arrays of phase zone plates are shifted with respect to one another by an half width of one such zone plate.

Figure 12:
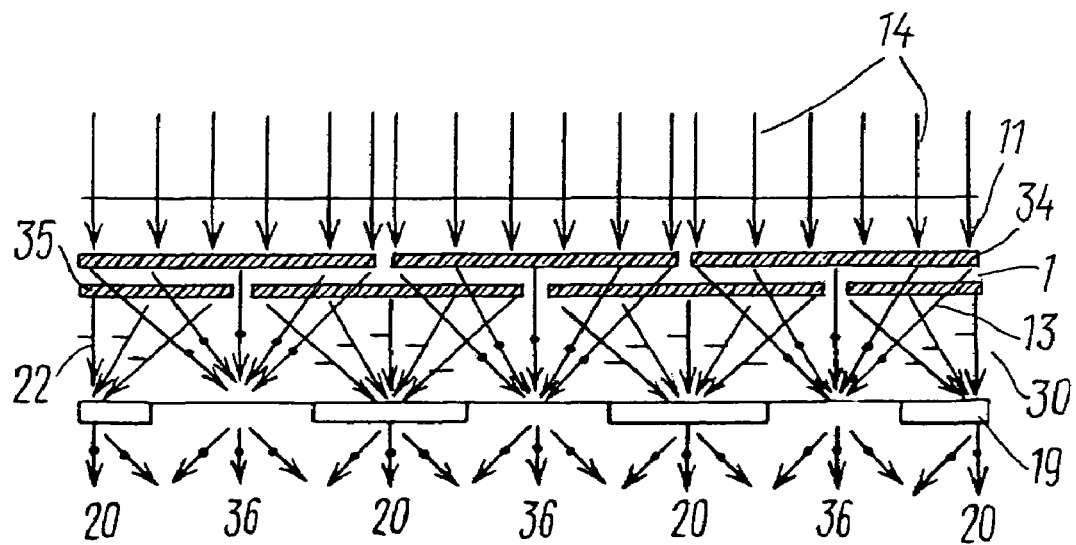

FIG. 12 shows a cross section of a version of the proposed polarizer in the form of a film, on the surface of which film applied are: a polarizing means in the form of phase zone plates of the interleaving birefringent anistropically absorbing and optically isotropic materials, the design of which plates is shown in FIG. 11, and a means for changing polarization of the beams of the polarized light implemented in the form of a sectioned translucent birefringent plate, whose sections are disposed in focuses of said volume lenses.

A polarizer based on a polarizing means of the reflecting type according to the invention is illustrated by specific examples of the particular embodiment shown in FIG. 13–21.

Figure 13:
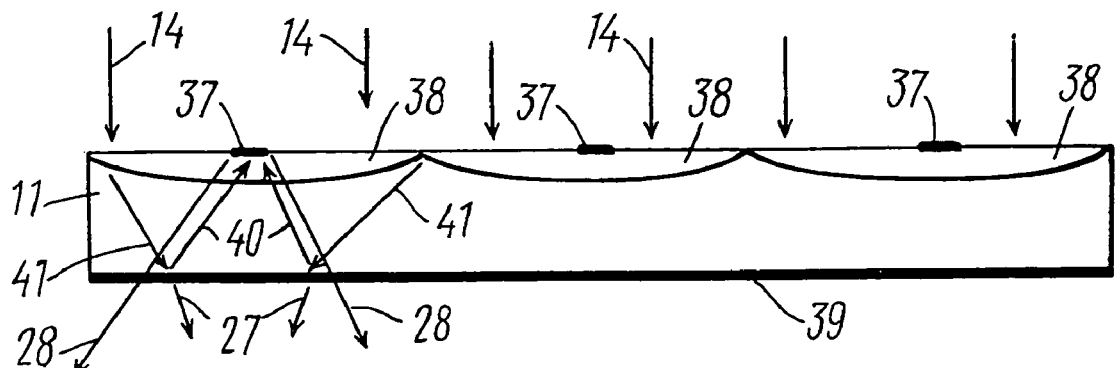

FIG. 13 schematically shows a cross section of the proposed polarizer, characterized in that it is implemented in the form of one film or plate, on a first surface of which film or plate applied is a system of microlenses and a sectioned metallic mirror, on a second surface thereof applied is a polarizing means including at least one layer of a cholesteric liquid crystal.

Figure 14:
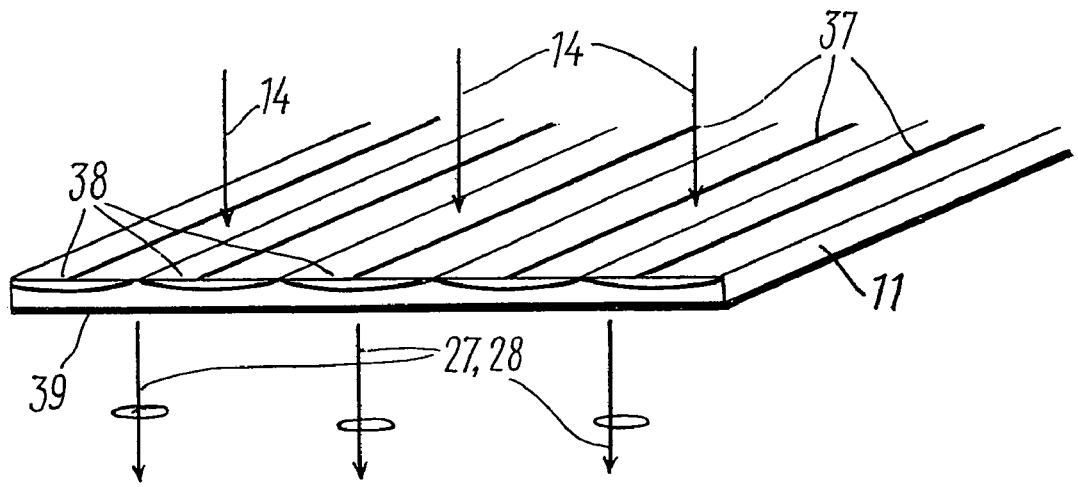

FIG. 14 schematically shows a general view of the proposed polarizer according to FIG. 13.

Figure 15:
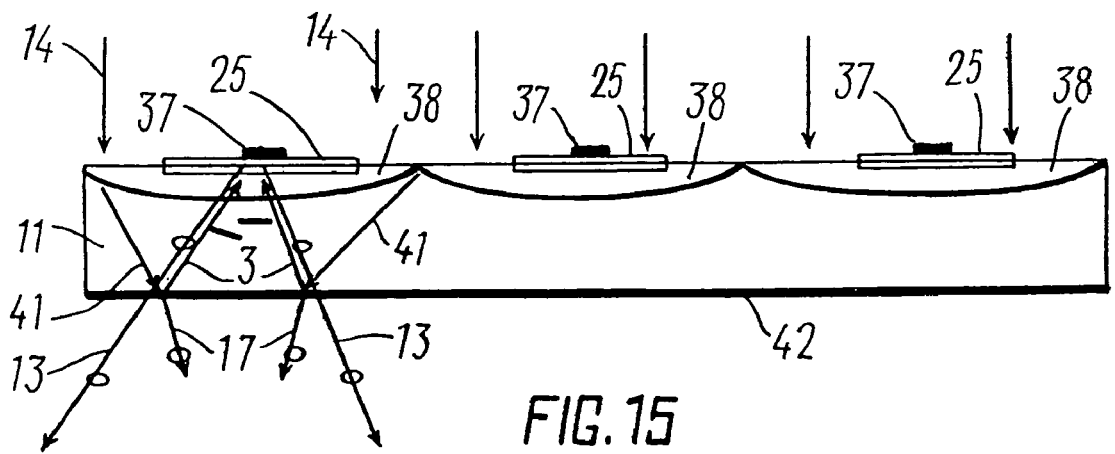

FIG. 15 schematically shows a cross section of the proposed polarizer, characterized in that the same is implemented in the form of one film or plate, on a first surface of which film or plate applied are a system of microlenses, a sectioned metallic mirror and a quarter-wave plate, and on a second surface thereof applied is a polarizing means including at least one birefringent layer having the constant, across the layer thickness, directions of the optical axes.

Figure 16:
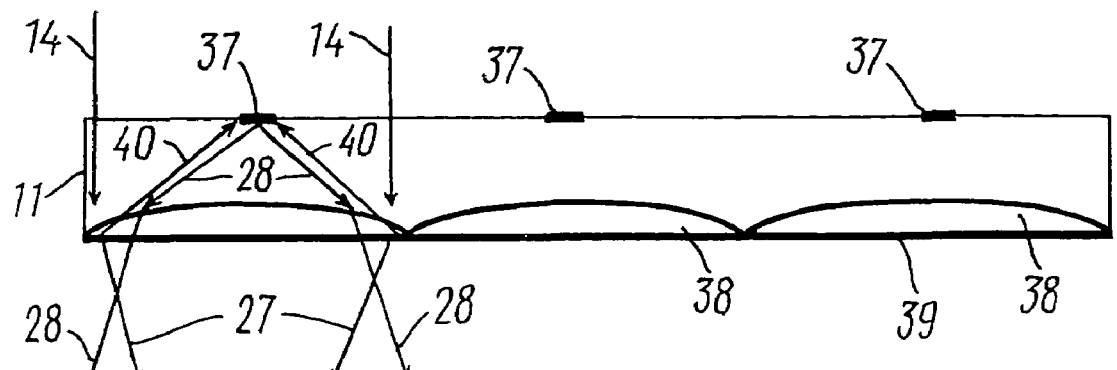
Figure 17:
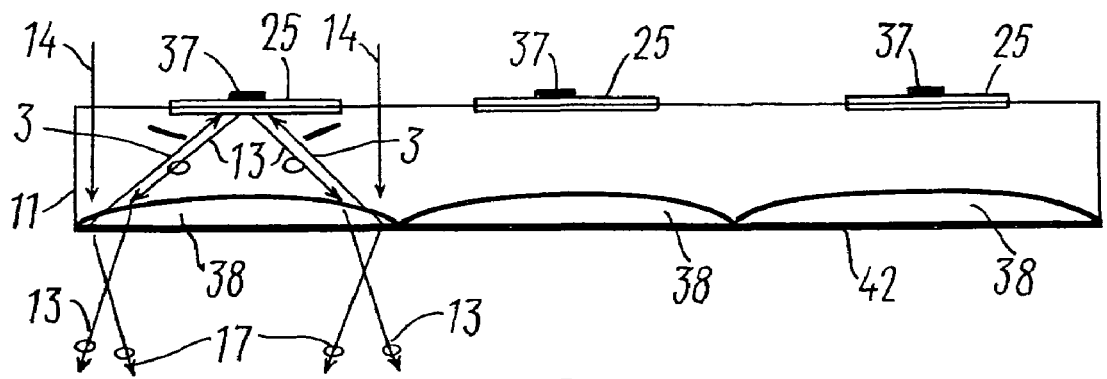

FIGS. 16 and 17 schematically show a cross section of the proposed polarizer, characterized in that the same is implemented in the form of one film or plate, on a first surface of which film or plate applied is a sectioned metallic mirror, and on a second surface thereof applied is a polarizing means and a system of microlenses.

Figure 18:
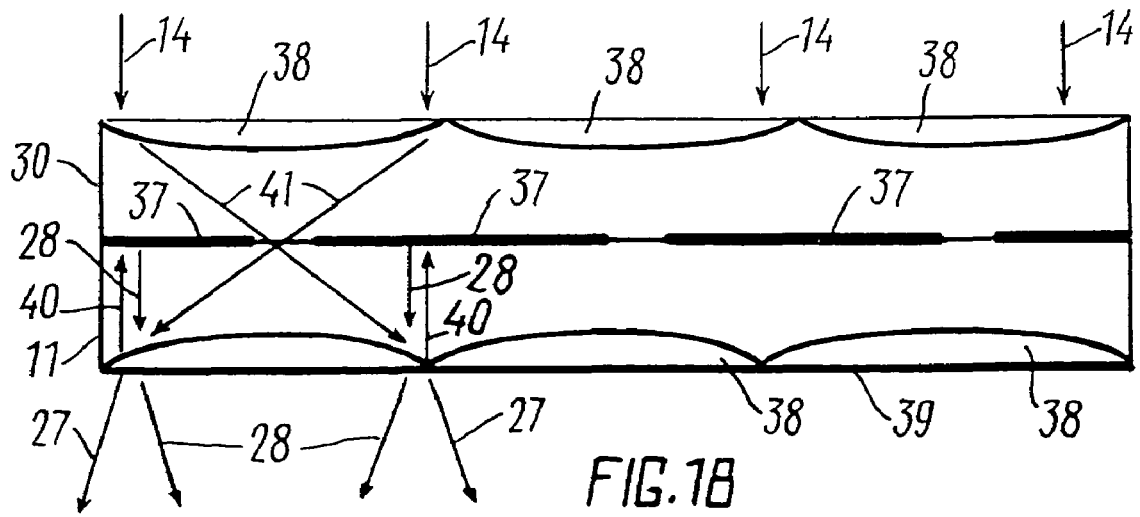
Figure 19:
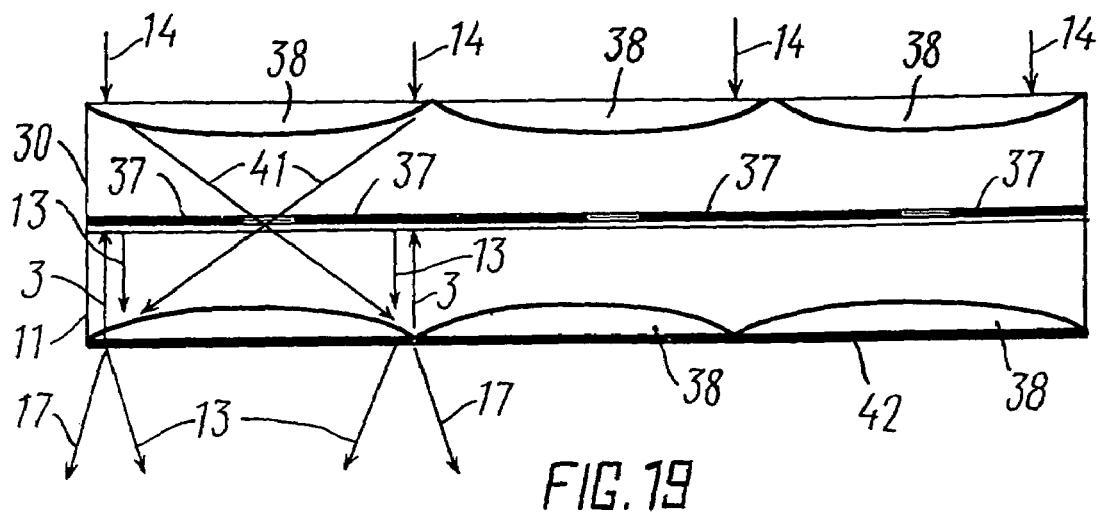

FIGS. 18 and 19 schematically show a cross section of versions of the proposed polarizer implemented in the form of two laminated films or plates, on whose external surfaces applied are a polarizing means and two systems of microlenses, and on the internal surfaces thereof applied is a sectioned metallic mirror 37.

Figure 20:
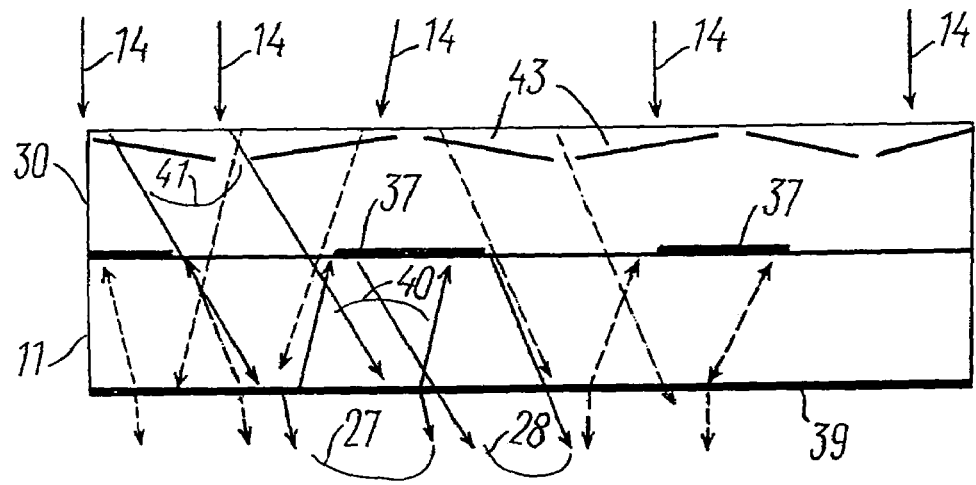
Figure 21:
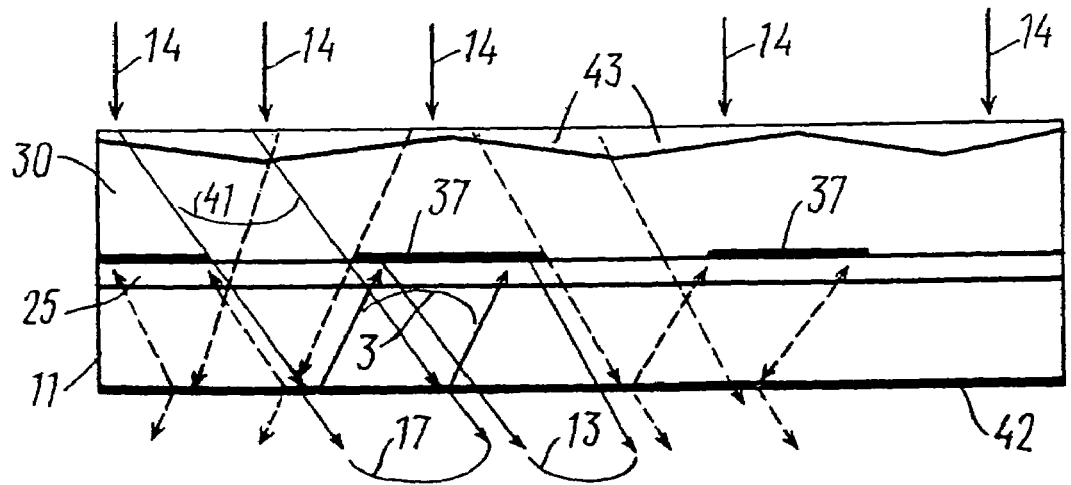

FIGS. 20 and 21 schematically show a cross section of versions of the proposed polarizer implemented in the form of two laminated films or plates, on whose external surfaces applied are a polarizing means and a system of microprisms, and on the internal surfaces thereof applied is a sectioned metallic mirror 37.

Examples of the claimed LCD elements in the most typical configurations are shown in FIGS. 22–27.

Figure 22:
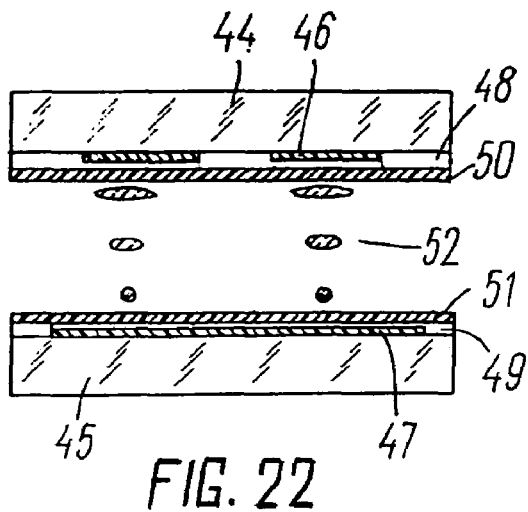
Figure 23:
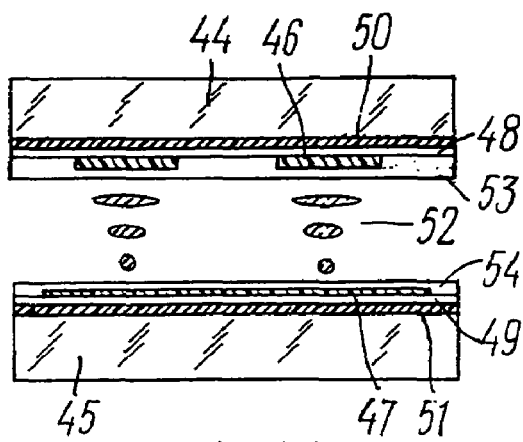
Figure 24:
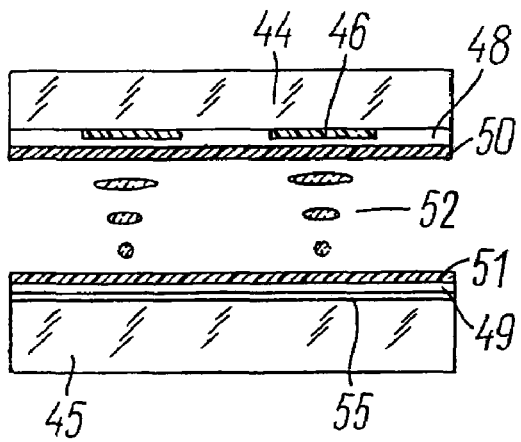
Figure 25:
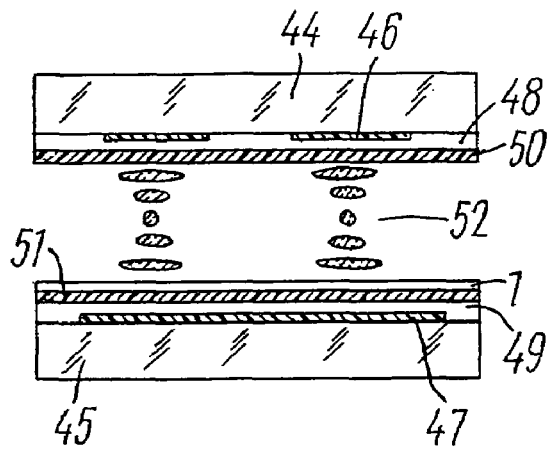
Figure 26:
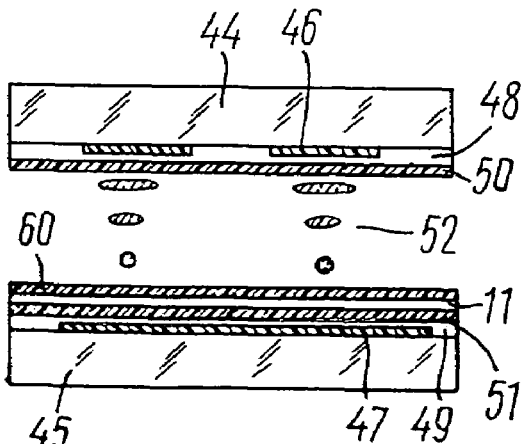
Figure 27:
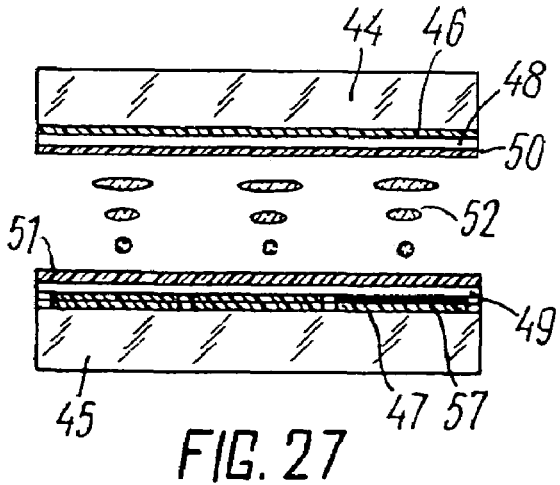

FIG. 22 schematically shows an element of the transmissive type based on a conventional twist-nematic;

FIG. 23 schematically shows LCD element of the transmissive type based on a conventional twist-nematic, having other arrangement of the polarizing layer and electrodes;

FIG. 24 schematically shows a LC indicator of the reflecting type based on a conventional twist-nematic; and FIG. 25 schematically shows a LC indicator of the transmissive type based on a supertwist-nematic;

FIG. 26 schematically shows a LC indicator comprising the colour-switching effect, and FIG. 27 schematically shows a matrix colour LC indicator.

DESCRIPTION OF THE PREFERABLE
EMBODIMENTS OF THE CLAIMED
POLARIZED AND A LIQUID CRYSTAL
DISPLAY ELEMENT.

A Polarizer of the Interference Type

Figure 1:
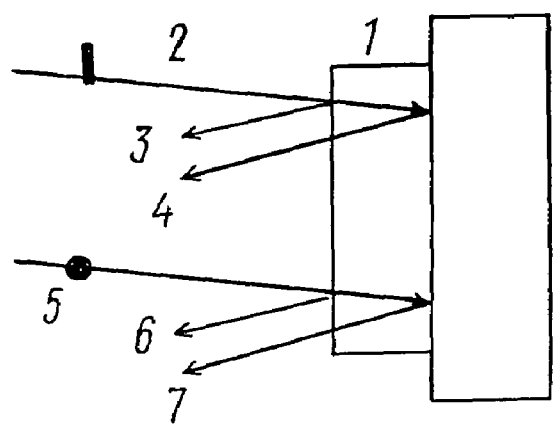
FIG. 1 schematically shows a one-layer polarizer of the reflecting type according to the invention.

FIG. 1 shows a diagram of a one-layer polarizer of the reflecting type according to the invention, comprising birefringent anisotropically absorbing layer 1, said polarizer is characterized in that both its refraction indices (extraordinary $n_e$ and ordinary $n_o$) are proportional to the polarized light wavelength. In the most simple version, layer 1 is adjacent from two sides to air. In more complex versions, on one of its surfaces applied is a light-reflecting coating. Layer 1 can be applied also on a substrate, and be, for example, of a transparent glass (shown in Fig. by phantom line).

Operation of the proposed polarizer of the reflecting type can be explained as follows. The non-polarized light consists of two linearly-polarized components 2 and 5, the polarization planes of which components are mutually perpendicular (these two components are conventionally separated in FIG. 1 for illustrative purposes and better understanding). Component, 2 polarized in parallel to the optical axis of birefringent anisotropically absorbing layer 1, is partially reflected from the boundary of layer 1, thus forming ray 3. A partial reflection of light of the boundary of interface between layer 1 and the medium takes place due to a jump (difference) of refraction index at said boundary. For a partial reflection of light, a light-reflecting coating additionally applied on layer 1 can be used. The other portion of energy of component 2, having passed through birefringent anisotropically absorbing layer 1, is reflected from the second boundary of layer 1, and passes through layer 1 once again, thus forming ray 4. The reflected rays 3 and 4 are polarized in the same way as component 2.

Thickness of layer 1 is selected such that the optical difference of travel $\Delta_e$ for rays 3 and 4, that corresponds to a greater refraction index $n_e$, will be equal to an odd number of the polarized light half-waves, $\Delta_e=\lambda/2+m\lambda$, where $\lambda$ is the light wavelength, m is the interference order. In the case when media at both sides of layer 1 are transparent (non-absorbing) and have refraction indices that are less than those of layer 1, then the optical difference of travel is $\Delta_e=2dn_e+\lambda/2$, where d is thickness of layer, and value $\lambda/2$ is a phase jump in reflection from the first boundary as from a more optically dense medium. In this case, the result of interference of rays 3 and 4 is their mutual attenuation, and in the optimum version—their complete blanking. The complete blanking of rays 3 and 4 is achieved when intensities (amplitudes) of rays 3 and 4 are identical or proximate in respect of their value, which can be achieved by an appropriate selection of reflectances from boundaries of layer 1, for example, owing to an additionally applied light-reflecting coating. The light-reflecting coating can be a metallic or dielectric one, of the one-layer, or multi-layer type. When the condition of proportionality of the extraordinary refraction index of birefringent anisotropically absorbing layer 1 to light wavelength $(n_e\sim\lambda)$ is met, then equality $\Delta_e=2dn_e+\lambda/2=\lambda/2+m\lambda$ will be met for the whole range of the operating light wavelength range, which provides high polarization characteristics in a wide spectrum region.

The other linearly-polarized component 5, polarized perpendicularly to the optical axis of birefringent anisotropically absorbing layer 1, is partially reflected from the first boundary of layer 1, thus forming ray 6. The other portion of component 5, having passed through layer 1, is reflected from the second boundary of layer 1, passes layer 1 once again, thus forming ray 7. The reflected rays 6 and 7 are polarized in the same way as incoming component 5. The result of interference of rays 6 and 7 is their mutual intensification, i.e. the interference maximum, for the optical difference of travel between them, $\Delta_o$ that corresponds to the ordinary (small) refraction index $n_o$, is an integer of wavelengths $\Delta_o=2dn_o+\lambda/2=\lambda/2+m\lambda$ (phase jump $\lambda/2$ when ray 6 is reflected from the first boundary of layer 1 also occurs for this component). When the condition of proportionality of the ordinary refraction index of birefringent anisotropically absorbing layer 1 to light wavelength $(n_e\sim\lambda)$ is met, then equality of $\Delta_o=2dn_o+\lambda/2=m\lambda$ will be met for the whole range of the operating light wavelengths, which means elimination of the spectral dependency of the polarizer's polarization characteristics.

Thus, in a wide spectrum range, as the result of interference, the total reflection of component 2, polarized in parallel to the quick axis of layer 1 of a birefringent material, is much smaller than reflection of component 5 that polarized perpendicularly to the quick axis of layer 1.

Also possible realization of the reverse situation when as the result of the interference, the total reflection of component 2 polarized in parallel to the optical axis of layer 1 of birefringent material 1 is much greater than reflection of component 5 polarized perpendicularly to the optical axis of layer 1. This situation can take place when thickness of layer 1 is selected such that the optical difference of travel $\Delta_e$ for rays 3 and 4, corresponding to the extraordinary (greater) refraction index $n_e$, is an even number of the polarized light half-waves $\Delta_e=m\lambda$. In this case the result of the interference of rays 3 and 4 is the interference maximum, i.e. their mutual intensification. Further, the optical difference of travel $\Delta_o$ for rays 6 and 7, corresponding to the ordinary (small) refraction index $n_o$ is an odd number of the polarized light half-waves $\Delta_e=\lambda/2+m\lambda$. In this case the result of the interference of rays 6 and 7 is the interference minimum, i.e. their mutual attenuation. Now, as the result of the interference, the total reflection of component 2, polarized in parallel to the optical axis of layer 1 of a birefringent material, is much greater than reflection of component 5, polarized perpendicularly to the optical axis of layer 1 of a birefringent material.

Figure 2:
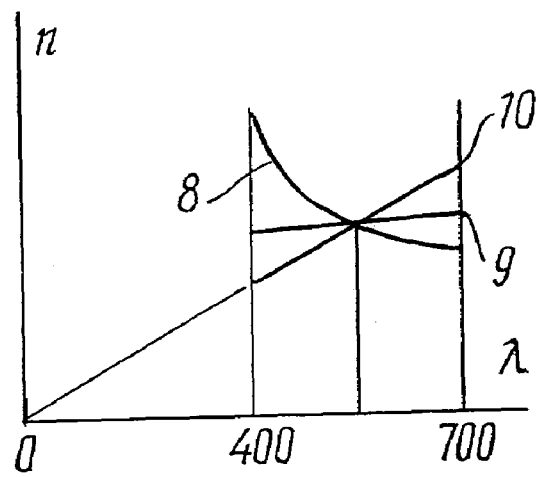
FIG. 2 schematically shows kinds of dependencies of the refraction index of layers in polarizers on the light wavelength.

FIG. 2 schematically shows dependencies of the refraction index of layers in polarizers on the visible light wavelength, i.e. in the region of 400–700 nm. Curve 8 corresponds to the polarizer according to the prototype, wherein the refraction index of layers decreases as the light wavelength increases. Such dependency in optics referred to as the normal dispersion, and is characteristic for transparent materials. Curve 9 corresponds to the polarizer according to the invention, wherein at least one refraction index of layers grows as the light wavelength increases. Such dependency in optics is referred as to the abnormal dispersion, and for the purpose to realize such dependency a polarizer must be designed in a special way. The carried-out experiments and analyses have shown that for this purpose preferable is a polarizer, characterized in that at least one birefringent anisotropically absorbing layer has the maximal absorbtion index not less than 0.1 in the operating wavelength range. Here, as in optics, absorbtion index of the manufactured layer k is determined (see also GOST standard 7601-78) as a coefficient at the virtual portion in the universal refraction index of a manufactured layer of a material $Z=n-ik$. Curve 10 corresponds to a preferable version of a polarizer according to the invention, characterized in that at least one birefringent anisotropically absorbing layer has at least one refraction index directly proportional to the polarizable light wavelength at least at a certain range of the operating wavelength. The direct proportionality of the refraction index to the light wavelength is a more strict requirement (condition), than a usual growth of refraction index as the light wavelength increases. High polarization characteristics in a wide spectrum region are provided in a polarizer that is characterized in that the refraction index grows as the polarized light wavelength increases but in a certain range of the operating wavelength, and at all wavelengths.

It should be noted that the wavelength range wherein the anisotropic absorption takes place and, consequently, the abnormal dispersion is observed, can coincide and not coincide with the wavelength operating range. For the claimed polarizers of the interference type, preferable is a wavelength operating range, wherein the abnormal dispersion is observed, i.e. at least the refraction index grows as the light wavelength increases.

Figure 3:
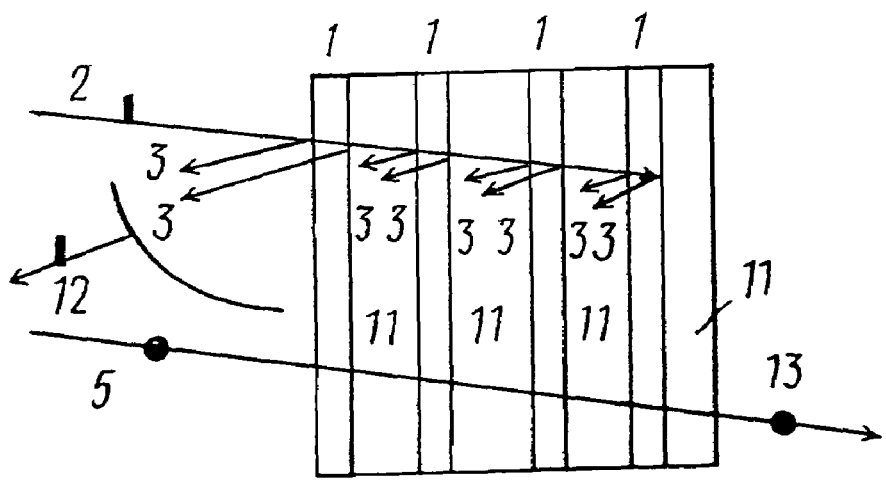
FIG. 3 schematically shows a multi-layer polarizer according to the invention.

FIG. 3 schematically shows a multi-layer polarizer according to the invention, comprising 4 birefringent anisotropically absorbing layers 1, characterized in that the extraordinary refraction index $n_e$ of these layers grows as the polarized light wavelength increases. Said layers 1 are applied as interleaved with four layers 11 of an optically isotropic material, the ordinary refraction index $n_o$ of a birefringent material coinciding with, or being proximate to refraction index $n_i$ of the optically isotropic material. The birefringent anisotropically absorbing layers 1 can be implemented as being identical, or of different materials, being different, for example, in respect of spectrum ranges, within which ranges the extraordinary refraction index $n_e$ grows as the wavelength increases.

Operation of the proposed polarizer can be explained as follows. A non-polarized light consists of two linearly-polarized components 2 and 5, the polarization planes of which components are mutually perpendicular (these two components in FIG. 3 are conventionally separated for the illustrative purposes and better understanding). Component 2 that is polarized in parallel to the optical axis birefringent anisotropically absorbing layers 1, is partially reflected from boundaries of layers 1 and optically isotropic layers 11, thus forming rays 3. The reflected rays 3 are polarized in the same way as incoming component 2.

Thickness of layers 1 is selected such that the result of interference of all rays 3 is the interference maximum, i.e their mutual intensification. The reflectance thereby reaches 98–99.9%, which means that linearly-polarized component 2 is practically completely reflected from a polarizer, forming ray 12. When a more rigorous, than simple increase, condition is satisfied, namely the condition of the direct proportionality of the extraordinary refraction index of birefringent anisotropically absorbing layers 1 to the light wavelength $(n_e-\lambda)$, the interference maximum condition will be met for the whole operating wavelength range.

To the other non-polarized light component 5, that is linearly-polarized perpendicularly to the optical axis of layers 1, corresponds the ordinary refraction index no of layers 1, being equal to refraction index $n_i$ of the optically isotropic layer $(n_o=n_i)$. In this case there is $n_o$ any reflection from boundaries of layers 1 and 11, and linearly-polarized component 5 passes through a multi-layer polarizer completely, without any reflections, thus forming ray 13. Reflection of component 5 from the external surfaces of a polarizer can be eliminated using the usual method of <<brightening>>, i.e. by applying on the external surfaces the isotropic layers having the optical thickness about a quarter of wavelength and refraction index of $n_o^{1/2}$.

As the result, the polarized light impinging upon a multi-layer polarizer is divided into two parts and transformed into linearly-polarized ray 12 that passes through a polarizer, and orthogonally polarized ray 13 reflected from a polarizer.

The above-discussed examples do not limit the possible versions of specific embodiments of the proposed polarizer.

Thus, in all the above-cited examples, provided are high polarization characteristics of a polarizer in a wide spectrum region, when not more than 10 layers are used.

A Polarizer of the Dichroic Tape

Principle of operation of the captioned polarizer is based on that the polarized light while passing trough said layer is partially absorbed by the chromophore system of a dye. Thereby passes only that portion of the light waves, wherein direction of oscillations of the electromagnetic field electric component is perpendicular to optical transition dipole moment (FIG. 4).

When a birefringent anisotropically absorbing layer is applied on a quarter-wave birefringent plate or a film at angle of 45° to the main optical axis of a substrate, a circular polarizer can be manufactured (FIG. 5, a and b are directions of the ordinary and extraordinary rays, respectively, n is the polarizing layer polarization vector direction). Thickness of a birefringent film must satisfy the following condition:

$$d(n_o-n_e)=\lambda/4+m\lambda/2,$$

where d is thickness of a polymer film; $n_o$ and $n_e$ are the ordinary and extraordinary refraction indices; $\lambda$ is wavelength; m is an integer.

A Polarizer Based on a Polarizing Means of the Transmissive Type

FIG. 6 schematically shows a cross section of one version of the proposed polarizer implemented in the form of one film 11, on the surface of which film applied are: a polarizing means in the form of volume lenses 15 made of a birefringent anisotropically absorbing material, and means for changing polarization of beams 18 of the polarized light, implemented in the form of a sectioned translucent half-wave birefringent plate, sections 19 of which plate are disposed in focuses of said volume lenses 15. The means for changing polarization of beams 18 of the polarized light can be also implemented in the form of a sectioned translucent polymerized birefringent layer of a liquid crystal having the twist structure, with rotation of the optical axis of the liquid crystal within thickness of said layer at angle of 90°, sections of which layer are also disposed in focuses of said volume lenses 15.

Operation of the proposed polarizer can be explained as follows (for better understanding, in FIG. 6 travel of rays of different polarizations 17 and 18, and, consequently, their extensions 13 and 20, is shown at the neighbouring elementary cells of the considered polarizer). Non-polarized light 14 is incident on a first surface of a polarizer, whereon volume lenses 15 are disposed. Passing through volume lens 15 made of a birefringent material—optical axis 16 being in the pattern plane and the ordinary refraction index being equal to refraction index of the isotropic material of film 11,—component 17 that is linearly-polarized perpendicularly to the pattern plane, having passed lens 15, does not undergo refraction at the boundary of interface of lens 15 and film 11, owing to which circumstance light beam 17, retaining the direction and shape of incident light beam 14, passes through the second boundary of film 11, thus forming parallel light beam 13, polarized perpendicularly to the pattern. Sectioned translucent half-wave birefringent plate practically does not affect polarization of parallel light beams 13, for the transverse dimensions of its sections 19 are selected as to be much smaller than those of volume lenses 15 (for example, the transverse dimensions of sections 19 of a half-wave plate are 10 mcm, and those of microlenses are 100–200 mcm). Passing through volume lens 15 made of a birefringent material—optical axis 16 being disposed in the pattern plane, and the extraordinary refraction index exceeding refraction index of the isotropic material of film 11—component 18 that is linearly-polarized in the pattern plane, having passed through lens 15, is focused on the second surface of film 11, where disposed is section 19 of the sectioned translucent half-wave birefringent plate, which section, when convergent light beam 18 passes therethrough, changes polarization of said beam, thus forming divergent light beam 20, that is linearly-polarized perpendicularly to the pattern plane. Such change of the polarization plane is caused by the known optical properties of a translucent half-wave birefringent plate having the optical axis directed at angle of 45° to the plane of polarization of the light incident thereto. Thus, as the result of operation of this polarizer energy of non-polarized light 14 is converted into energy of the outcoming highly polarized beams 13 and 20, having identical linear polarization, to an extent over 50%.

FIG. 7 schematically shows a general view of the proposed polarizer, a cross section of which polarizer is shown in FIG. 6. This polarizer is implemented in the form of a film or plate 11, on a first surface of which film or plate applied is a system of cylindrical microlenses 15 made of a birefringent material, and on a second surface of film or plate 11 applied is a means for changing polarization of the linearly-polarized light beam incident thereon, which means has the form of a system of strips 19 of translucent birefringent films, said system being optically registered with said system of cylindrical lenses 15. FIG. 7 also shows the travel of beam 14 of non-polarized light incident on polarizer, and the travel of direction-coincident beams 13 and 20 of light outcoming from the polarizer, which light is linearly-polarized in one plane.

FIG. 8 schematically shows a cross section of one version of the proposed polarizer implemented in the form of film 11, on the surface of which film applied are: a polarizing means implemented in the form of said volume lenses 15, and a means for changing polarization of beams 17 of polarized light implemented in the form of a sectioned translucent half-wave birefringent plate, sections 21 of which plate are disposed outside focuses of said volume lenses 15. The means for changing polarization of beams 17 of the polarized light can also be implemented in the form of a sectioned translucent polymerized birefringent layer of a liquid crystal having the twist structure, with rotation of the optical axis of the liquid crystal within thickness of said layer at angle of 90°, sections of which layer are disposed also outside focuses of said volume lenses 15.

Operation of the proposed polarizer can be explained as follows (for the sake of clarity, in FIG. 8 the travel of rays of different polarizations 17 and 18, and, consequently, their extensions 22 and 23, is shown at the adjacent elementary cells of the considered polarizer). Non-polarized light 14 is incident on a first surface of a polarizer, whereon volume lenses 15 are disposed.

Component 17, linearly-polarized perpendicularly to the pattern plane, passing through volume lens 15 made of a birefringent material—optical axis 16 being disposed in the pattern plane and the ordinary refraction index being equal to refraction index of the isotropic material of film 11—and having passed through said lens 15, does not undergo any refraction at the boundary of interface of lens 15 and film 11, so that light beam 17 retains the direction and shape of incident light beam 14. Passing through the second boundary of film 11, whereon sections 21 of the sectioned translucent half-wave birefringent plate are disposed, light beam 17 changes its polarization, thus forming parallel beam 22 of the light polarized in the pattern plane. Such change of the polarization plane is caused by the known optical properties of a translucent half-wave birefringent plate having the optical axis directed at angle of 45° to the plane of polarization of the light incident thereon. Intervals between sections 21 of the sectioned translucent half-wave birefringent plate do not practically affect polarization of parallel light beams 46, because the transverse dimensions of its sections 19 are selected as to be much smaller than those of volume lenses 15 (for example, the transverse dimensions of intervals between sections 19 of a half-wave plate are 10 mcm, and those of microlenses are 100–200 mcm). Passing through volume lens 15 made of a birefringent material—optical axis 16 being disposed in the pattern plane, and the extraordinary refraction index exceeding refraction index of the isotropic material of film 11, —component 18 that is linearly-polarized in the pattern plane, having passed through lens 15, is focused on the second surface of film 11, thus reaching the interval between two neighbouring sections 21 of the sectioned translucent half-wave birefringent plate and then leaving the polarizer in the form of divergent light beam 23 that is polarized, as beam 18, in the pattern plane. Thus, as the result of operation of this polarizer, energy of non-polarized light 14 is converted into energy of the outcoming highly polarized beams 13 and 20 having identical linear polarization, to an extent over 50%.

FIG. 9 schematically shows a cross section of one version of the proposed polarizer implemented in the form of film 11, on surface of which film applied are: a polarizing means in the form of amplitude zone plates 24 made of interleaving layers of the birefringent and optically isotropic materials, and a means for changing polarization of beams 17 and 18 of the polarized light implemented in the form of a sectioned translucent birefringent plate having sections 25 in the form of quarter-wave plates disposed outside focuses of said amplitude zone plates 24, and having sections 26 in the form of plates determining the phase difference between the ordinary and extraordinary rays, being different by λ from the phase difference determined by said sections 25 in the form of quarter-wave plates disposed in focuses of said amplitude zone plates 24.

Operation of the proposed polarizer can be explained as follows (for clarity, in FIG. 9 the travel of rays of different polarizations 17 and 18, and, consequently, the travel of their extensions 27 and 28, is shown on neighbouring elementary cells of the considered polarizer). Non-polarized light 14 is incident on a first surface of a polarizer, whereon disposed are amplitude zone plates 24. Linearly-polarized perpendicularly to the pattern plane component 17, passing through amplitude zone plate 24 made of interleaving layers of a birefringent anisotropically absorbing material and optically isotropic material—optical axis 16 of said birefringent material being disposed in the pattern plane, and its ordinary refraction index being equal to refraction index of said isotropic material, having passed zone plate, is not reflected in any way from boundaries of interface of interleaving birefringent and isotropic layers, so that light beam 17 continues to retain the direction and shape of incident light beam 14. Beam of light 17 that is linearly-polarized perpendicularly to the pattern plane, passing through the second boundary of film 11, whereon, outside the focus of said amplitude zone plate 24, disposed are sections 25 of the sectioned translucent quarter wave birefringent plate, changes its polarization, thus forming parallel beam 27 of the circularly polarized light. Thereby the translucent birefringent plate having sections 26, disposed in intervals between said sections 25 of the translucent quarter-wave birefringent plate, and determining the phase difference between the ordinary and extraordinary rays differing by $\pi$ from the phase difference determined by said sections 25 of the translucent quarter-wave birefringent plate, does not practically affect polarization of parallel light beams 27, because its transverse dimensions are selected to be much smaller than the transverse dimensions of amplitude zone plate 24 (for example, the transverse dimensions of birefringent plate 26 are 10 mcm, and the transverse dimensions of the amplitude zone plate are 100–200 mcm). Linearly-polarized component 18, that is polarized in the pattern plane, passing through amplitude zone plate 24 made of interleaving layers of the birefringent anisotropically absorbing and optically isotropic materials—the optical axis 16 of said birefringent material being disposed in the pattern plane, and the extraordinary refraction index thereof exceeding refraction index of said isotropic material,—having passed zone plate 24, is focused on the second surface of film 11, whereon disposed are the sections 26 of the translucent birefringent plate 11 determining the phase difference between the ordinary and extraordinary rays, differing by $\pi$ from the phase difference determined by sections 25 of the translucent birefringent plate, which sections are quarter-wave plates and when the convergent, linearly-polarized in the pattern plane, light beam 18 passes through them, they change its polarization, thus forming divergent beam 28 of the circularly polarized light of the same sign as the circularly polarized light in beam 27. Such change of the polarization plane of beams 17 and 18 is caused by the known optical properties of the appropriate translucent birefringent plates having the optical axis directed at angle of 45° to the plane of polarization of the light incident thereon. Thus, as the result of operation of the polarizer, energy of non-polarized light 14, is converted to an extent over 50%, into the energy of the outcoming highly polarized beams 27 and 28 having the identical circular polarization.

FIG. 10 shows a cross section of one of the possible designs of an amplitude zone plate used in the version of the proposed polarizer according to FIG. 9. In design of amplitude zone plate 24, cross section of which plate is shown in FIG. 10, used are regions 1 of a birefringent anisotropically absorbing material having refraction indices $n_o$ of the ordinary ray, and $n_e$ of the extraordinary ray, whose conventionally designated optical axes 16 are disposed in the pattern plane and positioned between layers of the optically isotropic material 30, 31 and 32, having refraction index $n_o$. Owing to this circumstance, said amplitude zone plate transmits, without changing the geometry of the beam and the intensity of the light, light beams 5 that are polarized perpendicularly to the pattern plane, forming at output of said amplitude zone plate a parallel light beam 17, linearly-polarized perpendicularly to the pattern plane, and transmits rays 29, delaying rays 2, both of them being linearly-polarized in the pattern plane, forming from rays 29, owing to diffraction, convergent beam 18 that is also linearly-polarized in the pattern plane. To provide the above-described operation of said amplitude zone plate, certain relationships must be maintained between refraction indices $n_e$, $n_o$, light wavelength $\lambda$, thickness of layer 1, as well as between thicknesses layers 30 and 32 that provide the absence of transmission of beams 2 linearly-polarized in the pattern plane by zones of said amplitude zone plate having portions 1 of layers made of a birefringent material owing to the phenomenon of interference in thin films. For example, for the case shown in FIG. 10, this relationship has the form of $2d_2n_e+\lambda/2=m\lambda$, where m is an integer referred as the interference order. Thus, at output from the amplitude zone plate formed are two light beams: the parallel one 17 and the convergent one 18, which beams have the linear polarization in two mutually orthogonal planes.

FIG. 11 shows a cross section of a phase zone plate made of three layers, one of which 11 is the isotropic layer and has refraction index $n_1$, the other layer 1 is the birefringent anisotropically absorbing one, having refraction index $n_1$ along axis 16 lying in the pattern plane, and $n_2 > n_1$ along axis 33 perpendicular to the pattern plane, and the following the latter layer 30 is the isotropic one, as the first one, but having refraction index $n_2$. Boundaries 11 and 1, as well as layers 1 and 30 have a surface profile allowing them—under the condition of meeting said relationships between their refraction indices—to serve as arrays of phase zone plates capable of differently focusing the rays linearly-polarized in the mutually orthogonal planes. These arrays of phase zone plates 34 and 35 are shifted with respect to one another by half-width of one such phase zone plate.

Operation of the phase zone plate shown in FIG. 11 can be explained as follows. A ray of non-polarized light 14 being a superposition of two linearly-polarized orthogonally to one another rays 2 and 5, having passed through flat surface of layer 11 and reached boundary 34 of layers 11 and 1 of the phase zone plate, passes therethrough and, in layer 1, is divided into two rays: ray 18 polarized in the pattern plane, and ray 17 polarized perpendicularly to the pattern plane. Further, owing to the fact that refraction index of isotropic layer 11 and refraction index birefringent layer 1 for the light wave polarized along axis 16 are identical, ray 2 that is also polarized along axis 16, passes through the phase zone plate having boundary 34 of layers 11 and 1, transforming itself into ray 18 directed similarly to ray 2, i.e. travelling perpendicularly to the polarizer plane and having the same polarization. For the reason that refraction index of isotropic layer 11 and refraction index of birefringent layer 1 for the light wave polarized along axis 33 are not identical, ray 5, polarized along axis 33, passes through boundary of layers 11 and 1 of the phase zone plate, transforming itself into ray 17 that is deflected from the direction of propagation of ray 5 to the focus of said phase zone plate. Further, ray 17 polarized perpendicularly to the pattern plane, continuing its, inclined to the layers' plane, propagation in layer 1, reaches another phase zone plate having boundary 35 between layers 1 and 30 and passes therethrough thereby transforming itself into ray 13 polarized, similarly to ray 17, perpendicularly to the pattern plane and propagating in layer 30 without changing the direction, i.e. along the direction of propagation of ray 17, because refraction index of isotropic layer 30 and refraction index of birefringent layer 1 for the light, polarized along axis 33 that is perpendicular to the pattern plane, are identical. For the reason that refraction index of isotropic layer 30 and refraction index of birefringent layer 1 for the light wave polarized along axis 16 are not identical, ray 18 polarized along axis 16 passes through boundary 35 of layers 1 and 30 of the phase zone plate, transforming itself into ray 22 that is deflected from the direction of propagation of ray 18 to the focus of the phase zone plate having boundary 35 between layers 1 and 30.

FIG. 12 schematically shows a cross section of a version of the proposed polarizer, whose polarizing means is implemented in the form of an array of phase zone plates 34 and 35, design of which plates is explained in FIG. 11. Rays 22 and 13 focused, respectively, by phase zone plates 35 and 34 are collected in focuses located on the output surface of the polarizer that is opposite to the surface whereon non-polarized light 14 is incident. On the output surface of the polarizer also disposed are the sections 19 of a sectioned translucent half-wave birefringent plate being a means for changing polarization of the linearly-polarized light beams, having the polarization plane disposed at angle of 45° to the direction of the optical axis of said half-wave plate. They change polarization of light beams 22 polarized in the pattern plane to the orthogonal polarization, converting them into light beams 20. Due to the action effected by said means for changing polarization, rays 20 and 36 that leave the polarizer become polarized identically, i.e. in this case—perpendicularly to the pattern plane. Thus, as the result of operation of the polarizer the energy of non-polarized light 14 is converted, to an extent exceeding 50%, into the energy of the outcoming highly polarized beams 20 and 36 having the linear polarization in the same plane.

The illustrated in FIG. 6–9 and 12 designs of means for dividing each of the non-polarized light beams into two linearly-polarized light beams having different mutually orthogonal linear polarizations, and designs of the means for changing polarization of at least one of said linearly-polarized light beams can be combined also in other possible versions.

Thus, the use of a birefringent material having at least one refraction index growing as the wavelength of the polarizable light increases, allows to create a polarizer that will provide conversion of more than 50% of all the energy of the non-polarized radiation into the polarized radiation, while having a relatively simple design being a film or plate, on surface of which film or plate applied is a polarizing means in the form of focusing optical elements implemented of said birefringent layer and optically registered with the applied on the film or plate surface a means for changing polarization implemented in the form of a sectioned translucent birefringent plate or a layer.

A Polarizer Based on a Polarizing Means of the Reflecting Type

FIG. 13 schematically shows a cross section of the proposed polarizer according to version 1 implemented in the form of one film or plate 11, on a first surface of which film or plate sequentially applied are a system of microlenses 38 and a sectioned metallic mirror 37 optically registered with said system of microlenses, and on the second surface thereof applied is a means 39 for dividing the non-polarized light beams into the polarized passing and reflected light beams, that includes at least one layer of a cholesteric liquid crystal.

Operation of the proposed polarizer can be explained as follows (for the sake of clarity, in FIG. 13 the travel of rays is shown in a simplified way, without taking into account the refraction at boundaries of different layers, and only for one microlens). Non-polarized light 14 is incident on a first surface of the polarizer and focused by microlenses to the direction inside the polarizer, forming light beams 41. A sectioned metallic mirror 37 does not practically shield the non-polarized light 14, because the transverse dimensions of its light-reflecting elements are selected to be much smaller than the transverse dimensions of microlenses (for example, the transverse dimensions of the light-reflecting elements are 10 mcm, and the transverse dimensions of microlenses are 100–200 mcm). The focused by lenses 38 light beams 41 reach means 39 for dividing the non-polarized light beams into the polarized passing and reflected light beams that include at least one layer of cholesteric liquid crystal. Thereby, approximately an half of the light energy of non-polarized light beams 41 is converted into the energy of passing light beams 27, for example with the right circular polarization (the direction of the circular polarization of the passing light beams is opposite to the sign of the spiral of the used cholesteric liquid crystal). The other half of the light energy of non-polarized light beams 41 is converted into the energy of the reflected light beams 40, in this case—with the left circular polarization (the direction of the circular polarization of the reflected light beams coincides with the sign of the spiral of the used cholesteric liquid crystal). The reflected light beams 40 having the left circular polarization are focused into a point on the light-reflecting elements of metallic mirror 37 (for this purpose, the focal distance, or in other words, focal power of microlenses 38 is selected properly). The reflected from metallic mirror 37 light beams 28 have the right circular polarization, i. e. the polarization that is opposite to polarization of light beams 30 that impinge on metallic mirror 37. Such change of polarization is caused by the known optical properties of a metallic mirror. Light beams 28, having the right circular polarization, pass through the layer of the cholesteric liquid crystal, without any change. Thus, as the result of operation of the polarizer, energy of non-polarized light 14 practically completely is converted into the energy of the outcoming polarized beams 27 and 28 having the identical circular polarization of an high degree.

For the purpose to broaden the operating wavelength range of the polarizer, the means for dividing the non-polarized light beams into the polarized passing and reflected light beams implemented in the form of at least one birefringent layer, includes at least three layers of cholesteric liquid crystals having bands of selective reflection of light in three different spectrum regions.

In the same, or another version of the polarizer having a broadened operating wavelength range, at least one layer of a cholesteric liquid crystal has across its thickness a gradient of the cholesteric spiral pitch and, as the result, can have the spectrum width of the light selective reflection band of not less than 100 nm.

Preferable is a polarizer, characterized in that at least one layer of a cholesteric liquid crystal is made of a polymer cholesteric liquid crystal.

To avoid energy losses of the circularly polarized light into the linearly-polarized one, outcoming from the polarizer, a quarter-wave plate can be additionally positioned at output of the polarizer.

FIG. 14 schematically shows a general view of the proposed polarizer, whose cross section is shown in FIG. 13. The polarizer is implemented in the form of one film or plate 11, on a first surface of which film or plate sequentially applied are a system of microlenses 38 and a sectioned metallic mirror 37 optically registered with said system of microlenses, and on a second surface thereof applied is means 39 for diving the non-polarized light beams into the polarized passing and reflected light beams, that includes at least one layer of a cholesteric liquid crystal. As the result of operation of the polarizer, energy of non-polarized light 14, practically completely, is converted into the energy of polarized beams 27 and 28 having the identical circular polarization.

FIG. 15 schematically shows a cross section of the proposed polarizer according to another version, implemented in the form of one film or plate 11, on a first surface of which film or plate applied are a system of microlenses 38 and sectioned metallic mirror 37 optically registered with said system of microlenses. Upstream of sectioned metallic mirror 37 positioned is a quarter-wave plate 25 that is sectioned, i.e. covering at least the entire surface of sectioned metallic mirror 37, as shown in FIG. 15, or non-sectioned, i.e. covering entirely the first surface of the polarizer. On the second surface of film 11 applied is means 42 for dividing the non-polarized light beams into the polarized passing and reflected light beams, including at least one birefringent layer having the constant, across the layer thickness, directions of the optical axes.

Operation of the proposed polarizer can be explained as follows (for the sake of clarity, in FIG. 13 the travel of rays is shown in a simplified way, without taking into account the refraction at boundaries of different layers, and only for one microlens). Non-polarized light 14 is incident on a first surface of the polarizer and focused by microlenses to the direction inside the polarizer, forming light beams 41. Sectioned metallic mirror 37 does not practically shield the non-polarized light 14, because the transverse dimensions of its light-reflecting elements are selected to be much smaller than the transverse dimensions of microlenses (for example, the transverse dimensions of the light-reflecting elements are 10 mcm, and the transverse dimensions of microlenses are 100–200 mcm). The focused by lenses 38 light beams 41 reach means 42 for dividing the non-polarized light beams into the polarized passing and reflected light beams that include at least one birefringent layer having the constant, across the layer thickness, directions of the optical axes. Thereby, approximately an half of the light energy of non-polarized light beams 41 is converted into the energy of passing light beams 17, having, for example, the linear polarization that is perpendicular to the pattern plane. The other half of the light energy of non-polarized light beams 41 is converted into the energy of the reflected light beams 3, in this case—with the linear polarization that is parallel to the pattern plane. The reflected light beams 3, having the linear polarization that is parallel to the pattern plane, pass through quarter-wave plate 25 and are focused into a point on the light-reflecting elements of metallic mirror 37 (for this purpose, the focal distance, or in other words, focal power of microlenses 38 is selected properly). The reflected from metallic mirror 37 and passed again through quarter-wave plate 25 light beams 13 have the linear polarization that is perpendicular to the pattern plane, i.e. is orthogonal to the linear polarization of light beams 7 that are incident on metallic mirror 37. Such change of the polarization is caused by the known properties of the combination of a quarter-wave plate and a metallic mirror. Light beams 13, having the linear polarization that is perpendicular to the pattern plane, pass without any change through the birefringent layer having constant, across the layer thickness, directions of the optical axes. Thus, as the result of operation of the polarizer the energy of non-polarized light 14 practically completely is converted into the energy of outcoming polarized beams 17 and 13 that have the identical high-degree linear polarization (in this case the polarization that is perpendicular to the pattern plane).

FIG. 16 schematically shows a cross section of the proposed polarizer, implemented in the form of one film or plate 11, on a first surface of which film or plate applied is a sectioned metallic mirror 37, and on the second surface of film sequentially applied are a system of microlenses 38, optically registered with sections of metallic mirror 37, and means 39 for dividing the non-polarized light beams into the polarized passing and reflected light beams, including at least one layer of a cholesteric liquid crystal.

Operation of the proposed polarizer can be explained as follows (for the sake of clarity, in FIG. 16 the travel of rays is shown in a simplified way, without taking into account the refraction at boundaries of different layers, and only for one microlens). Non-polarized light 14 passes through film 11 and system of microlenses 38, which system by focusing converts the incoming non-polarized light 14 into a plurality of identical light beams. These beams reach means 39 for dividing the non-polarized light beams into the polarized passing and reflected light beams, that includes at least one layer of a cholesteric liquid crystal. Sectioned metallic mirror 37 does not practically shield the non-polarized light 14, because the transverse dimensions of its light-reflecting elements are selected to be much smaller than the transverse dimensions of microlenses (for example, the transverse dimensions of the light-reflecting elements are 10 mcm, and the transverse dimensions of microlenses are 100–200 mcm). For this reason, approximately an half of the light energy of the non-polarized light beams, having passed through polarizing means 39, is converted into the energy of passing light beams 27, having, for example, the right circular polarization (the direction of the circular polarization of the passing light beams is opposite to the sign of the spiral of the used cholesteric liquid crystal). The other half of the light energy of the non-polarized light beams is converted into the energy of the reflected light beams 40, in this case—with the left circular polarization (the direction of the circular polarization of the passing light beams coincides with the sign of the spiral of the used cholesteric liquid crystal). Light beams 40, having the left circular polarization and reflected from polarizing means 39 and having passed once again the system of microlenses 38, are focused into a point on the light-reflecting elements of metallic mirror 37 (for this purpose, the focal distance, or in other words, focal power of microlenses 38 is selected properly). The, reflected from metallic mirror 37, light beams 28 have the right circular polarization, i.e. the polarization that is opposite to polarization of light beams 40 that are incident on metallic mirror 37. Such change of the polarization is caused by the known properties of a metallic mirror. Light beams 28, having the right circular polarization, pass without any change through a layer of cholesteric liquid crystal. Thus, as the result of operation of the polarizer, the energy of non-polarized light 14 practically completely is converted into the energy of outcoming polarized beams 27 and 28 that have the identical high-degree linear polarization.

A more preferable is a polarizer according to the invention, characterized in that at least one layer of a cholesteric liquid crystal has, across thickness, a gradient of the cholesteric spiral pitch and, as the result, can have the spectrum width of the light selective reflection band of not less than 100 nm.

FIG. 17 schematically shows a cross section of the proposed polarizer, implemented in the form of one film or plate 11, on a first surface of which film or plate applied is sectioned metallic mirror 37. Upstream of sectioned metallic mirror 37 applied is quarter-wave plate 25 that is sectioned, i.e. covering at least the entire surface of sectioned metallic mirror 37, as shown in FIG. 17, or is the non-sectioned one, i.e. covering entirely the first surface of the polarizer. On the second surface of the film sequentially applied are a system of microlenses 38 optically registered with sections of metallic mirror 37, and means 42 for dividing the non-polarized light beams into the polarized passing and reflected light beams, including at least one birefringent layer having the constant, across the layer thickness, directions of the optical axes.

Operation of the proposed polarizer can be explained as follows (for the sake of clarity, in FIG. 17 the travel of rays is shown in a simplified way, without taking into account the refraction at boundaries of different layers, and only for one microlens). Non-polarized light 14 passes through film or plate 11 and system of microlenses 38, which system by focusing converts the incoming non-polarized light 14 into a plurality of identical light beams. These beams reach means 42 for dividing the non-polarized light beams into the polarized passing and reflected light beams, that includes at least one birefringent layer having the constant, across the layer thickness, directions of the optical axes. Sectioned metallic mirror 37 does not practically shield the non-polarized light 14, because the transverse dimensions of its light-reflecting elements are selected to be much smaller than the transverse dimensions of microlenses (for example, the transverse dimensions of the light-reflecting elements are 10 mcm, and the transverse dimensions of microlenses are 100–200 mcm). For this reason, approximately an half of the light energy of non-polarized light beams, having passed through polarizing means 42, is converted into the energy of passing light beams 17, having, for example, the linear polarization that is perpendicular to the pattern plane. The other half of the light energy of the non-polarized light beams is converted into the energy of the reflected light beams 3, in this case—with the linear polarization that is parallel to the pattern plane. Light beams 3 reflected from polarizing means 42 and having passed once again the system of microlenses 38, pass through quarter-wave plate 25 and are focused into a point on the light-reflecting elements of metallic mirror 37 (for this purpose, the focal distance, or in other words, focal power of microlenses 38 is selected properly). The passed through quarter-wave plate 25, reflected from metallic mirror 37 and passed once again quarter-wave wave plate 25 light beams 13 have the linear polarization that is perpendicular to the pattern plane, i.e. is orthogonal to polarization of light beams 3 that are incident on metallic mirror 37. Such change of the polarization is caused by the known properties of the combination of a quarter-wave plate and metallic mirror. Light beams 13 having the linear polarization that is perpendicular to the pattern plane, pass without any change through the birefringent layer having the constant, across the layer thickness, directions of the optical axes. Thus, as the result of operation of the polarizer, the energy of non-polarized light 14 practically completely is converted into the energy of outcoming polarized beams 17 and 13 that have the identical high-degree linear polarization (in this case the polarization that is perpendicular to the pattern plane).

FIG. 18 schematically shows a cross section of the proposed polarizer of another version, implemented in the form of two, for example, laminated films or plates 11 and 30, on the external surface of which film or plate applied is a system of microlenses 38, on the internal surface of the first or second film or plate applied is sectioned metallic mirror 37, and on the external surface of the second film or plate sequentially applied are the second system of microlenses 38, optically registered with sections of metallic mirror 37 and with the first system of microlenses, and means 39 for dividing the non-polarized light beams into the polarized passing and reflected light beams, including at least one layer of a cholesteric liquid crystal.

Operation of the proposed polarizer can be explained as follows (for the sake of clarity, in FIG. 18 the travel of rays is shown in a simplified way, only for one microlens). Non-polarized light 14 passes through the first system of microlenses 38, which system converts the incoming non-polarized light 14 into a plurality of identical light beams 41 and focuses them on the places of the internal surface of the first film or plate that are not covered with sections of metallic mirror 37. After passing through the focus beams 41 pass through the second system of microlenses and reach means 39 for dividing the non-polarized light beams into the polarized passing and reflected light beams, that includes at least one layer of a cholesteric liquid crystal. Approximately an half of the light energy of the non-polarized light beams, having passed polarizing means 39, is converted into the energy of passing light beams 27, having, for example, the right circular polarization (the direction of the circular polarization of the passing light beams is opposite to the sign of the spiral of the used cholesteric liquid crystal). The other half of the light energy of the non-polarized light beams is converted into the energy of the reflected light beams 40, in this case—with the left circular polarization (the direction of the circular polarization of the reflected light beams coincides with the sign of the spiral of the used cholesteric liquid crystal). The left circular polarization light beams 40 reflected from polarizing means 39 and having passed once again the second system of microlenses 38, have the parallel rays, i.e. beams 40 are focused in the infinity (for this purpose, the focal distance, or in other words, focal power of microlenses 38 is selected properly). After being reflected from metallic mirror 37 light beams 40 are converted into light beams 28 that have the right circular polarization, i.e. the polarization that is opposite to the polarization of light beams 40 that are incident on metallic mirror 37. Such change of the polarization is caused by the known properties of a metallic mirror. Sectioned metallic mirror 37 practically completely reflects beams 40, i.e. no loss of the light energy takes place, because the transverse dimensions of the locations, wherein the light-reflecting elements are absent, are selected to be much smaller than the transverse dimensions of microlenses (for example, the transverse dimensions of such locations are 10 mcm, and the transverse dimensions of microlenses are 100–200 mcm). Light beams 28 having the right circular polarization and the parallel rays, pass through the second system of microlenses and the cholesteric liquid crystal layer without a change in the polarization and intensity state, but they are converted into convergent beams owing to passage through the second system of lenses. Thus, as the result of operation of the polarizer, the energy of non-polarized light 14 practically completely is converted into the energy of outcoming polarized beams 27 and 28 that have the identical high-degree circular polarization.

FIG. 19 schematically shows a cross section of the proposed polarizer according to another version, implemented in the form of two, for example, laminated films or plates 11 and 30. On external surface of the first film or plate applied is a first system of microlenses 38, on the internal surface of, for example, the first film applied is sectioned metallic mirror 37, whereon applied is a quarter-wave plate covering, if necessary all sections of metallic mirror 37 and, possibly, to simplify the used application technique, also the locations not covered by sections of metallic mirror 37. On the external surface of the second film or plate sequentially applied are the second system of microlenses 38, optically registered with sections of metallic mirror 37 and with the first system of microlenses, and means 42 for dividing the non-polarized light beams into the polarized passing and reflected light beams, including at least one birefringent layer having the constant, across the layer thickness, directions of the optical axes.

Operation of the proposed polarizer can be explained as follows (for the sake of clarity, in FIG. 19 the travel of the rays is shown in a simplified way, only for one microlens). Non-polarized light 14 passes through the first system of microlenses 38, which system converts the incoming non-polarized light 14 into a plurality of identical light beams 41 and focuses them on the locations of the internal surface of the first film that are not covered with sections of metallic mirror 37. After passing through the focus, beams 41 pass through the second system of microlenses and reach means 42 for dividing the non-polarized light beams into the polarized passing and reflected light beams, that includes at least one birefringent layer having the constant, across the layer thickness, directions of the optical axes. Approximately an half of the light energy of the non-polarized light beams, having passed polarizing means 42, is converted into the energy of passing light beams 17, having, for example, the linear polarization that is perpendicular to the pattern plane. The other half of the light energy of the non-polarized light beams is converted into the energy of the reflected light beams 3, in this case, having the linear polarization that is parallel to the pattern plane. Light beams 13, having passed through quarter-wave plate 25, reflected from metallic mirror 37 and having passed once again through quarter-wave plate 25, have the linear polarization that is perpendicular to the pattern plane, i.e. the polarization that is orthogonal to polarization of light beams 3 that are incident on metallic mirror 37. Such change of polarization is caused by the known optical properties of the combination of a quarter-wave plate and metallic mirror. Sectioned metallic mirror 37 practically completely reflects beams 3, i.e. no loss of the light energy takes place, because the transverse dimensions of the locations, wherein the light-reflecting elements are absent, are selected to be much smaller than the transverse dimensions of microlenses (for example, the transverse dimensions of such locations are 10 mcm, and the transverse dimensions of microlenses are 100–200 mcm). Light beams 13 having the linear polarization that is perpendicular to the pattern plane, pass through the birefringent layer having the constant, across the layer thickness, directions of the optical axes, without a change in the polarization and intensity state, but they are converted into convergent beams owing to passage through the second system of lenses. Thus, as the result of operation of the polarizer 14, the energy of non-polarized light 14 practically completely is converted into the energy of outcoming polarized beams 17 and 13 that have an high-degree identical linear polarization (which polarization in this case is perpendicular to the pattern plane).

FIG. 20 schematically shows a cross section of the proposed polarizer version, implemented in the form of two, for example, laminated films or plates 11 and 30. On the external surface of said film or plate applied is system of microprisms 43, on the internal surface of the first or second film or plate applied is sectioned metallic mirror 37 optically registered with system of microprisms 43. On the external surface of the second film or plate applied is polarizing means 39 for dividing the non-polarized light beams into the polarized passing and reflected light beams, including at least one layer of a cholesteric liquid crystal.

Operation of the proposed polarizer can be explained as follows (for the sake of clarity, in FIG. 20 the travel of rays is shown in a simplified way). Non-polarized light 14 passes through system of microprisms 43, which system converts the incoming non-polarized light 14 into a plurality of identical light beams 41, having parallel rays. Beams 41 are deflected from the perpendicular to the film plane by the left and right slopes of prisms 43 to the identical angles to the right and to the left, respectively (in this version refraction index of the microprism material is selected to be greater than that of the film material), and pass the locations in sectioned metallic mirror 37 not occupied by the light-reflecting elements of metallic mirror 37. Then the non-polarized beams reach polarizing means 39 for dividing the non-polarized light beams into the polarized passing and reflected light beams, that includes at least one layer of a cholesteric liquid crystal. Approximately an half of the light energy of the non-polarized light beams 41, having passed polarizing means 39, is converted into the energy of passing light beams 27, having, for example, the right circular polarization (the direction of the circular polarization of the passing light beams is opposite to the sign of the spiral of the used cholesteric liquid crystal). The other half of the light energy of the non-polarized light beams 41 is converted into the energy of the reflected light beams 40, in this case—with the left circular polarization (the direction of the circular polarization of the reflected light beams coincides with the sign of the spiral of the used cholesteric liquid crystal). Light beams 40 after being reflected from metallic mirror 37 are converted into light beams 28 that have the right circular polarization, i.e. the polarization that is opposite to the polarization of light beams 40 that are incident on metallic mirror 37. Such change of the polarization is caused by the known optical properties of a metallic mirror. Sectioned metallic mirror 37 practically completely reflects beams 40, i.e. no loss of the light energy takes place, because the transverse dimensions of the light-reflecting elements are selected to be equal to or slightly exceeding the transverse dimensions of beams 40. Light beams 28 having the right circular polarization pass through a layer of a cholesteric liquid crystal without a change in the polarization and intensity state. Thus, as the result of operation of the polarizer the energy of non-polarized light 14 practically completely is converted into the energy of outcoming polarized beams 27 and 28 that have the identical high-degree circular polarization.

System of microprisms 43 applied on the external surface of the first film can face with its vertexes to the direction that is external to the film. Microprisms can have other shape than the triangular one.

FIG. 21 schematically shows a cross section of the proposed version of a polarizer, implemented in the form of two, for example, laminated films or plates 11 and 30. On the external surface of the first film or plate applied is system of microprisms 43, on the internal surface of the first film or plate sequentially applied are sectioned metallic mirror 37 optically registered with system of microprisms 43, and a quarter-wave plate 25 that covers, if necessary, all sections of metallic mirror 37 and, possibly, to simplify the application technique, also covers the locations not covered by sections of metallic mirror 37. On the external surface of the second film applied is polarizing means 42 for dividing the non-polarized light beams into the polarized passing and reflected light beams, including at least one birefringent layer having the constant, across the layer thickness, directions of the optical axes.

Operation of the proposed polarizer can be explained as follows (for the sake of clarity, in FIG. 21 the travel of rays is shown in a simplified way). Non-polarized light 14 passes through system of microprisms 43, which system converts the incoming non-polarized light 14 into a plurality of identical light beams 41, having parallel rays. Beams 41 are deflected from the perpendicular to the film plane by the left and right slopes of prisms 43 to the identical angles to the right and to the left, respectively, and pass through the locations in sectioned metallic mirror 37 not occupied by the light-reflecting elements of metallic mirror 37. Then non-polarized beams reach polarizing means 42 for dividing the non-polarized light beams into the polarized passing and reflected light beams that include at least one birefringent layer having the constant, across the layer thickness, directions of the optical axes. Approximately an half of the light energy of the non-polarized light beams 41, having passed polarizing means 42, is converted into the energy of passing light beams 17, having, for example, the linear polarization that is perpendicular to the pattern plane. The other half of the light energy of non-polarized light beams 41 is converted into the energy of the reflected light beams 3, in this case having the linear polarization that is parallel to the pattern plane. Light beams 13 that passed through quarter-wave plate 25, reflected from metallic mirror 37 and passed once again through quarter-wave plate 25, have the linear polarization that is perpendicular to the pattern plane, i.e. the polarization that is orthogonal to polarization of beams 3 incident on metallic mirror 37. Such change of the polarization is caused by the known optical properties of the combination of a quarter-wave plate and metallic mirror. Sectioned metallic mirror 37 practically completely reflects beams 3, i.e. no loss of the light energy takes place, because the transverse dimensions of the light-reflecting elements are selected to be equal to or slightly exceeding the transverse dimensions of beams 3. Light beams 3 having the linear polarization that is perpendicular to the pattern plane pass through polarizing means 42, without a change in the polarization state and intensity.

Thus, as the result of operation of the polarizer, the energy of non-polarized light 14, practically completely, is converted into the energy of outcoming polarized beams 17 and 13 that have the identical high-degree linear polarization.

Other possible versions of a specific embodiment of the proposed polarizer are not limited by the examples described above.

Examples of the claimed LCD elements in the most typical configurations.

An LC indicator shown in FIG. 22 consists of two plates 44 and 45 that can be made of glass, plastic or other rigid or flexible transparent material. On the internal surfaces of these plates that face a layer of nematic liquid crystal 52, applied are transparent electrodes 46, 47. Over the transparent electrodes applied are insulation films 48, 49 of a polymer or other material that smoothens the surface profile and provides homogeneous properties for entire surface of a plate. Polarizing coatings 50, 51 are applied on these films and are oriented mutually perpendicularly by transmission axes on plates 44 and 45. The polarizing coatings themselves are orientants for molecules of this nematic liquid crystal.

FIG. 23 shows another version of the transmissive LC indicator, wherein on surface of plates 44 and 45 applied are first polarizing coatings 50, 51, protected by films 48, 49, and then transparent electrodes 46, 47 are positioned. Over the electrodes applied are films 53, 54 that orient the LC nematic. In this design, provided are smoothness of surface, that is required for the polarizing coating, and its insulation from the liquid crystal layer, which circumstance ensures that ions or molecules of other substances that can be contained in the polarizing coating will not reach said coating.

In the reflecting version of a LC indicator (FIG. 24), the second plate can be both of a transparent and opaque materials, for example, of a crystalline silicon. On this second plate light-reflecting layer 55 is formed. The reflecting layer can be obtained by application on an aluminium mirror of a polymer film comprising particles of an unspecified or certain shape having the refraction index other than that of a polymer, and by application of a polymer film comprising a suspension of an aluminium powder or other material that well reflects light, or by creating a surface profile on the plate surface, on which surface profile reflecting layer 55, for example an aluminium film, is applied afterwards. A surface profile can be formed by treatment of the surface by an abrasive material, by engraving, stamping, application of a polymer film containing particles of certain shape and size, or by the selective etching through a mask of the surface of the plate itself, or of the polymer film, or other material applied thereon. The aluminium film can also serve as a continuous electrode. By etching, using photolithography techniques, a narrow strip of aluminium according to a pre-determined contour 10–100 mcm in width, electrodes of the required configuration can be obtained, for example, matrices of rectangles for flat display matrix screens, thereby retaining the general reflecting background on the whole operation field of an indicator. A polarizing coating is applied directly on a reflecting coating, or on a smoothing and insulating sub-layer that is formed on a reflector.

If a reflecting layer for any reasons cannot be used as an electrode, or if it is made of a non-conductive material, in this case electrodes are applied on an insulating sub-layer or directly on a reflector. A polymer film, aluminium oxide, silicon oxide or other dielectric materials can be utilized as an insulating layer. In that case a polarizing coating can be applied both on a reflector and electrodes.

For the colour compensation in the transmissive version of LC indicators having a strongly twisted nematic 52, an additional anisotropic layer 1 having a pre-determined optical thickness and disposed in the second plate (FIG. 25) is further used. Said layer 1 can be located immediately on polarizing coating 51 or on layers 49, 47 or 54 (FIG. 23) applied thereon. An optically anisotropic layer is formed by application of a polymer film, or LC polymer, wherein molecules are oriented in a pre-determined direction under action of electromagnetic forces, or by mechanical tension when this layer applied, or after it is applied. Further, it is possible to use a photo-anisotropic material that allows to obtain anisotropic films, having a specified difference of the optical travel and direction of axes of a birefringent ellipsoid, by photo-polymerization of the film material by means of a polarized light. see Patent of RF No. 2 013 794 (1994).

In the reflecting version of a LC indicator with a supertwist-nematic, two additional optically anisotropic layers disposed on both plates between polarizers may be required. They can be applied directly on polarizing coatings or on layers applied thereon.

Using the photolithography or printing techniques for application of dyes, and using dyes of various colours, a polarizing layer having regions with different colours can be obtained, which advantage enhances the informational and ergonomic capabilities of an indicator.

According to the invention a LC cell can be provided with a light-switching feature; on one of the polarizing coating a neutral gray colour is applied, on the other one applied are two polarizing coatings 51 and 56 (FIG. 26)—directly one over the other, or through non-absorbing layer 11 that separates them. Thereby polarizing coatings 51 and 56 have different colours, and their polarization axes are mutually perpendicular.

Arrangement of polarizing elements inside a cell allows to realize also a colour version of a matrix LC indicator (FIG. 27). In one of the versions, a polarizing coating is applied directly on colour matrix 57 disposed on the matrix of transparent electrodes 47, or on sub-layer 49.

A colour matrix or pattern can be prepared by sputtering through a photoresist mask, with a selective dyeing of a polymer layer by an appropriate dye using the stencil-printing techniques, or by other printing methods. It can be appreciated that arrangement of a polarizer and a colour matrix relative to one another is not of the principal importance for the invention and is determined by technology factors of application of layers.

Principle of operation of a LC indicator having polarizing elements disposed inside a cell will be discussed by an example of the transmissive version of LC indicator based on twisted by 90° nematic (FIG. 22). A non-polarized light stream is incident on an indicator from the first plate side. This light, having passed through substrate 44, transparent electrode 46 and smoothing sub-layer 48, is polarized while passing through polarizing coating 50. If there is no voltage across the electrodes, the light passes through liquid crystal layer 52, thereby rotating its polarization plane by 90°, and passes, without attenuation, through the second polarizing layer, sub-layer 49, transparent electrode 47 and plate 45. Thereby the electrodes' region will appear to be light. When a voltage is applied to electrodes, the nematic twisted form, under action of the electric field, will transit into the homeotropic form, wherein the nematic optical axis is oriented perpendicularly to the plane of plates 44 and 45, and it stops to rotate the polarization plane of the light passing therethrough. It means that when light passes through the nematic layer, the determined by polarizer 50 direction of the light polarization direction will not change and at output of nematic 52 it will be perpendicular to the polarization direction of second polarizer 51. When light passes through polarizer 51, the light is absorbed, and this region will appear as dark. In the indicator regions having no electrodes, the twisted form of nematic will be always retained, and these regions always appear as light.

For the reason that when light is reflected, the direction of the flatly polarized light is not changed, in the reflecting type of indicators the operation principle will be the same as described above. The only difference is in that the light does not pass through substrate 45, but passes twice through all other elements.

In the case of LC indicator based on a supertwist-nematic (FIG. 25), the light, flatly polarized by first polarizer 50, passes through a supertwist-nematic and is converted into the elliptically polarized one. Thereby the light acquires a certain colour depending of the optical difference on of wavelength. The optically anisotropic layer compensates the colour of the light passing therethrough such that at output of a cell its becomes non-dyed, or vice verse, i.e. allows to produce a necessary dyeing owing to the initial orientation of the polarizing coating axes relative to one another, and the anisotropic layer and the thickness of the anisotropic layer. When a voltage is applied to the electrode elements, a liquid crystal is converted from the twisted state into the uniaxial state and stops to rotate the light polarization plane. For this reason the light passes therethrough without a change of the polarization plane direction. While passing through the anisotropic layer, the light acquires the circular or elliptical polarization, and after leaving the second polarizing layer has a colouring that is additional to the colouring of the turned-off state.

Operation of the light switch is explained in FIG. 26. After passing through first polarizing layer 50 the light in the turned-off mode passes through the nematic, having the polarization plane rotation of 90°, and passes through polarizing layer 56, whose axis is oriented perpendicularly to axis of the first polarizing coating 50, and absorbed by second layer of dichroic polarizer 51, whose polarization axis direction is perpendicular to axis of layer 56. When a cell is turned on, the light passage plane direction, while passing through a LC, does not change, and the light is absorbed by dichroic polarizer 56 and dyed in other colour.

In the case of matrix colour LCD element (FIG. 27), the light passes, when the element is turned off, through polarizer 50, through the LC, through second neutral polarizer 51, and is selectively absorbed by dye 57. The element thereby appears to be dyed in an appropriate colour. When the element is turned on, the light is polarized by polarizer 50, passes without a rotation of the polarization plane through the LC layer, and is blocked by polarizer 51. As the result, this element appears to be a dark one.

At least one polarizing coating used in any of the LC indicators designs shown in FIGS. 22–27 can be implemented in the form of a polarizer of the interference type.

In designs of the translucent LC indicators providing arrangement of polarizers on the external surface of transparent plates 44 and 45 (FIGS. 22, 23, 25–27) possible is the use of at least one polarizer that converts over 50% of the polarized light incident thereon into the one linear polarization light.

Thus, use of an high-efficiency polarizer comprising at least one birefringent anisotropically absorbing layer, having at least one refraction index that grows as the polarizable light wavelength increases, allows to manufacture both a colour and monochrome LC element, types of which element are not limited by the above-cited versions, and which is distinguished by an higher brightness, colour saturation, good angular characteristics and the absence of shadows.

Filed of Application of the Invention:

The claimed polarizer can be used in luminairs, optical modulators, matrix systems of light modulation, for protection of securities, trademarks, in production of polarizing films, glass, including laminated films and glass for automotive industry, construction, architecture, advertising, and also for production of consumer goods such as sun-glasses, shields.

The claimed liquid-crystal display element tan be used in means of the indicator technology of various purposes, for example in flat liquid-crystal displays, including those of the projection type.

The invention claimed is:

1. A polarizer comprising
a micro-lens array or micro-prism array as a means for converting an incoming non-polarized light into a plurality of identical non-polarized light beams;
a polarizing means dividing said plurality of non-polarized light beams into polarized transmitted and reflected light beams having different polarizations; and
a means for changing the polarization and the direction of the light beams reflected from said polarizing means, thereby substantially converting light beams from said means for changing of the polarization to the same polarization and direction as light beams transmitted through said polarizing means; wherein said means for changing of the polarization and direction of the light beams comprises a sectioned mirror, and said sectioned mirror is optically co-ordinated with said micro-lens array or micro-prism array;
wherein said means for polarizing comprises at least one birefringent and anisotropically absorbing layer, having a first refractive index that increases as the polarizable light wavelength increases at least for a certain range of wavelengths,
wherein at least one birefringent and anisotropically absorbing layer is formed from:
(i) at least one organic salt of a dichroic anionic dye having the general formula:

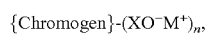

wherein {Chromogen} is a dye chromophore system wherein each X is CO, $SO_2$, $OSO_2$, $OPO(O^-M^+)$; and wherein each M is independently $RR'NH_2$;
$RR'R''NH$; $RR'R''R\hat{}N$ or $RR'R''P$, wherein each of R, R', R'', R$\hat{}$ is independetly $CH_3$, $ClC_2H_4$, $C_2H_5$, $C_3H_7$, $C_4H_9$, $C_6H_5CH_2$, a substituted phenyl or a heteroaryl, $YH-(CH_2-CH_2Y)_m-CH_2CH_2$ such that Y is O or NH and m=0–5, an N-alkylpyridinium cation, an N-alkylchinolinium cation, an N-alkylimidazolinium cation, or N-alkylthiazolinium cation;
wherein n=1–7;
(ii) at least one asymmetric mixed salt of a dichroic anionic dye with different cations having the general formula:

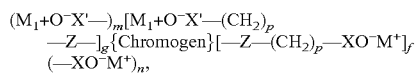

wherein {Chromogen} is a dye chromophore system;
wherein each Z is $SO_2NH$, $SO_2$, CONH, CO, O, S, NH, or $CH_2$;
wherein each p is independently from 1–10;
wherein each of f, g, n and m are independently 0–9, such that (n+f) and (m+g) are independently 1–10;
wherein each of X and X' are independently CO, $SO_2$, $OSO_2$, $PO(O^-M^+)$;
wherein $M \neq M_1$, and
wherein each of M and $M_1$ are independently H,
  an inorganic cation selected from the group consisting of $NH_4$, Li, Na, K, Cs, Mg, Ca, Ba, Fe, Ni and Co;
  an organic cation selected from the group consisting of $RNH_3$, $RR'NH_2$, $RR'R''NH$; $RR'R''R*N$ and $RR'R''R*P$, such that each of R, R', R'', R* are independently alkyl or substituted alkyl groups selected from the group consisting of $CH_3$ $ClC_2H_4$, $HOC_2H_4$, $C_2H_5$, $C_3H_7$, $C_4H_9$, $C_6H_5CH_2$, a substituted phenyl or heteroaryl group, $YH-(CH_2-CH_2Y)_k-CH_2CH_2$ such that each Y is independently O or NH and such that k=0–10; or
  a heteroaromatic cation selected from the group consisting of N-alkylpyridinium, N-alkylchinolinium, N-alkylimidazolinium, N-alkythiazolinium;
(iii) at least one associate of a dichroic anionic dye with surface-active cation and/or amphoteric surfactant having the general formula:

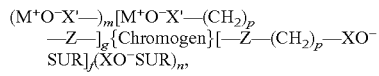

wherein {Chromogen} is a dye chromophore system;
wherein each Z is independently $SO_2NH$, $SO_2$, CONH, CO, O, S, NH, or $CH_2$;
wherein each p is independently from 1–10;
wherein each of f and n are independently 0–4;
wherein each of g and m are independently 0–9;
wherein (n+f)=1–4; wherein (m+g)=0–9;
wherein each X and X' are independently CO, $SO_2$, $OSO_2$, $PO(O^-M^+)$;
wherein each M is independently H,
  an inorganic cation selected from the group consisting of $NH_4$, Li, Na, K, Cs, Mg, Ca, Ba, Fe, Ni, and Co;
  an organic cation selected from the group consisting of $RNH_3$, $RR'NH_2$, $RR'R''NH$; $RR'R''R*N$ and $RR'R''R*P$, where each of R, R', R'', R* are independently alkyl or substituted alkyl group selected from the group consisting of $CH_3$ $ClC_2H_4$, $HOC_2H_4$, and $C_2H_5-C_{10}H_{21}$, $C_6H_5CH_2$, a substituted phenyl or heteroaryl group, $YH-(CH_2-CH_2Y)_k-CH_2CH_2$ such that each Y is independently O or NH and such that k=0–10;
  a heteroaromatic cation selected from the group consisting of N-alkylpyridinium, N-alkylchinolinium, N-alkylimidazolinium, N-alkylthiazolinium; $K'SUR^+$, wherein each SUR is independently $KSUR^+$, $K'SUR^+$, or AmSUR, wherein $KSUR^+$ and $K'SUR^+$ are surface-active cations and wherein AmSUR is an amphoteric surfactant;
(iv) at least one associate of a dichroic cationic dye with a surface-active anion and/or an amphoteric surface-active dye having the general formula:

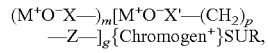

wherein {Chromogen} is a dye chromophore system;
each Z is independently $SO_2NH$, $SO_2$, CONH, CO, O, S, NH, or $CH_2$;
wherein each p is independently from 1–10; wherein each of g and m are independently 0–1; such that (m+g)=1;
wherein each of X is independently CO, $SO_2$, $OSO_2$, $PO(O^-M^+)$;
wherein each of M is independently H,
  an inorganic cation selected from the group consisting of $NH_4$, Li, Na, K, Cs, Mg, Ca, Ba, Fe, Ni, and Co;
  an organic cation selected from the group consisting of $RNH_3$, $RR'NH_2$, $RR'R''NH$; $RR'R''R*N$ and $RR'R''R*P$, wherein each of R, R', R'', and R* are independently alkyl or substituted alkyl group selected from the group consisting of $CH_3$ $ClC_2H_4$, $HOC_2H_4$, and $C_2H_5-C_{10}H_{21}$, $C_6H_5CH_2$, a substituted phenyl or heteroaryl group, $YH-(CH_2-CH_2Y)_k-CH_2CH_2$ such that each Y is independently O or NH and such that k=0–10; or
  a heteroaromatic cation selected from the group consisting of N-alkylpyridinium, N-alkylchinolinium, N-alkylimidazolinium, N-alkylthiazolinium and $KSUR^+$, wherein is $KSUR^+$ a surface-active cation, wherein $SUR=ASUR^-$, AmSUR, wherein $ASUR^-$ is surface active anion and AmSUR is an amphoteric surfactant;
(v) at least of one associate of a dichroic cationic dye with a surface-active cation and/or amphoteric surfactant having the general formula:

wherein {Chromogen} is a dye chromophore system;
wherein each Z is independently $SO_2NH$, $SO_2$, $CONH$, $CO$, $O$, $S$, $NH$, or $CH_2$;
wherein each p is independently from 1–10;
wherein each X is independently N or P;
wherein each R, R' and R" are independently an alkyl or substituted alkyl group selected from the group consisting of $CH_3$, $ClC_2H_4$, $HOC_2H_4$, $C_2H_5$ and $C_3H_7$;
wherein each SUR is independently $ASUR^-$, AmSUR, wherein $ASUR^-$ is a surface-active anion, wherein AmSUR is an amphoteric surfactant; and
wherein n=1–4;

(vi) at least one water-insoluble dichroic dye and/or a pigment that do(ts) not contain ionogenic or hydrophilic groups;

(vii) at least one low-molecular weight thermotropic liquid-crystal substance being a dichroic dye or containing, as a component, a liquid-crystal and/or a dichroic dye other than liquid-crystal dye, wherein the at least one low-molecular weight thermotropic liquid-crystal substance is vitrified;

(viii) at least on polymer material other than liquid-crystal polymer material having a controlled degree of hydrophilicity and having been dyed with a dichroic dye and/or an iodine compounds;

(ix) at least one polymer thermoptropic liquid-crystal and/or non-liquid crystal substance comprising solved in mass and/or chemically bonded with a polymer chain dichroic dyes;

(x) at least of one dichroic dye capable of forming a lyotropic liquid-crystal phase;

(xi) at least of one polymeric dichroic dye;

(xii) at least of one water-soluble organic dye capable of forming a stable lyotropic liquid-crystal phase of general formula:

$$\{Chromogen\}(SO_3M)_n,$$

wherein {Chromogen} is a dye chromophore system;
wherein each M is independently $H^+$ or an inorganic cation; and
wherein n=1 to 7;
and mixtures thereof.

2. The polarizer according to claim 1, wherein the polarizing means further comprises an optically isotropic layer whose refractive index coincides with or is proximate to the refractive index of the birefringent and anisotropically absorbing layer.

3. The polarizer according to claim 1, wherein the polarizing means further comprises a second birefringent layer having a second refractive index that coincides with or is proximate to the first refractive index of the bireflingent and anisotropically absorbing layer, wherein the second refractive index of the birefringent layer is different from the first refractive index of the birefringent and anisotropically absorbing layer.

4. The polarizer according to claim 1, wherein the at least one birefringent and anisotropically absorbing layer has a thickness such that an output of the polarizer coincides with an interference extremum of at least one linearly-polarized light component.

5. The polarizer according to claim 1, wherein the thickness of the birefringent and anisotropically absorbing layer is such that the output of the polarizer coincides with an interference minimum for a first linearly-polarized light component and with an interference maximum for a second linearly-polarized light component that is orthogonal to the first linearly-polarized light component.

6. The polarizer according to claim 1, wherein the first refractive index is directly proportional to the polarizable light wavelength for a range of wavelengths.

7. The polarizer according to claim 1,
wherein said polarizing means comprises at least one birefringent layer having constant directions of the optical axes across the layer thickness, and wherein said means for changing of the polarization and the direction of the light beams reflected from said polarizing means further comprises a quarter-wave plate positioned between said sectioned mirror and said polarizing means.

8. A liquid crystal display element comprising:
first and second plates;
a liquid crystal material between the first and second plates; and
a polarizer according to claim 1 disposed at least on one of said first and second plates.

* * * * *